United States Patent
Shimba et al.

(10) Patent No.: US 7,295,550 B2
(45) Date of Patent: Nov. 13, 2007

(54) DATA COMMUNICATION METHOD

(75) Inventors: Noriko Shimba, Nara-ken (JP); Masaru Matsui, Kyoto-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 971 days.

(21) Appl. No.: 10/388,358

(22) Filed: Mar. 13, 2003

(65) Prior Publication Data

US 2003/0217138 A1 Nov. 20, 2003

(51) Int. Cl.
*H04L 12/66* (2006.01)

(52) U.S. Cl. .................................. 370/352; 370/471

(58) Field of Classification Search ............... 370/352, 370/353, 354, 474, 229, 400, 468, 471, 401, 370/230, 235, 236, 252; 709/217, 218, 236, 709/219

See application file for complete search history.

(56) References Cited

U.S. PATENT DOCUMENTS

| | | | | |
|---|---|---|---|---|
| 5,459,455 A | * | 10/1995 | Sato ........................... | 370/410 |
| 5,467,472 A | * | 11/1995 | Williams et al. ............... | 707/1 |
| 5,621,894 A | | 4/1997 | Menezes et al. | |
| 5,940,592 A | | 8/1999 | Ioki et al. | |
| 6,128,657 A | * | 10/2000 | Okanoya et al. ............ | 709/224 |
| 6,205,156 B1 | * | 3/2001 | Watanabe et al. ........... | 370/474 |
| 6,349,352 B1 | | 2/2002 | Lea | |
| 6,452,943 B1 | * | 9/2002 | Furuya ........................ | 370/468 |
| 6,563,888 B1 | * | 5/2003 | Toriyama .................... | 375/340 |

| | | |
|---|---|---|
| 2002/0029277 A1 | 3/2002 | Simpson-Young et al. |
| 2002/0114323 A1 | 8/2002 | Chowdhury et al. |
| 2003/0158979 A1 | 8/2003 | Tateyama et al. |

FOREIGN PATENT DOCUMENTS

| | | |
|---|---|---|
| EP | 0 964 559 | 12/1999 |
| JP | 54-143005 | 11/1979 |
| JP | 63-300349 | 12/1988 |
| JP | 8-241287 | 9/1996 |
| JP | 9-244942 | 9/1997 |
| JP | 10-28187 | 1/1998 |
| JP | 10-322413 | 12/1998 |
| JP | 2000-310424 | 11/2000 |

(Continued)

OTHER PUBLICATIONS

D. Bursky, "Intelligent Device-to-Device Communications Scheme Lets Subsystems Form Seamless Links to Each Other", Electronic Design, Penton Publishing, vol. 45, No. 2, pp. 34, 36-37, Oct. 1997.

(Continued)

*Primary Examiner*—Chi Pham
*Assistant Examiner*—Alexander O. Boakye
(74) *Attorney, Agent, or Firm*—RatnerPrestia

(57) ABSTRACT

A data communication function table relating to communication functions is shared between devices. Whether a communication device can operate in an autonomous communication mode or request/response communication mode can be therefore determined, the data type can be determined, the data size and data identification information can be acquired, and a file can be divided to an optimum size for transmission. Network traffic is therefore reduced and the effective communication speed is improved for data communication between devices over a network.

8 Claims, 46 Drawing Sheets

FOREIGN PATENT DOCUMENTS

| | | |
|---|---|---|
| JP | 2001-236286 | 8/2001 |
| JP | 2002-55896 | 2/2002 |
| KR | 2001-52655 | 6/2001 |
| WO | WO 99/65188 | 12/1999 |
| WO | WO 00/16531 | 3/2000 |
| WO | WO 01/86509 | 11/2001 |

OTHER PUBLICATIONS

J. Callahan, "Moving Toward Effortless Networking", Computer, IEEE Computer Society, vol. 31, No. 11, pp. 12-14, Nov. 1998.

European Search Report corresponding to application No. EP 03 00 5565 dated Aug. 10, 2004.

\* cited by examiner

Fig. 1
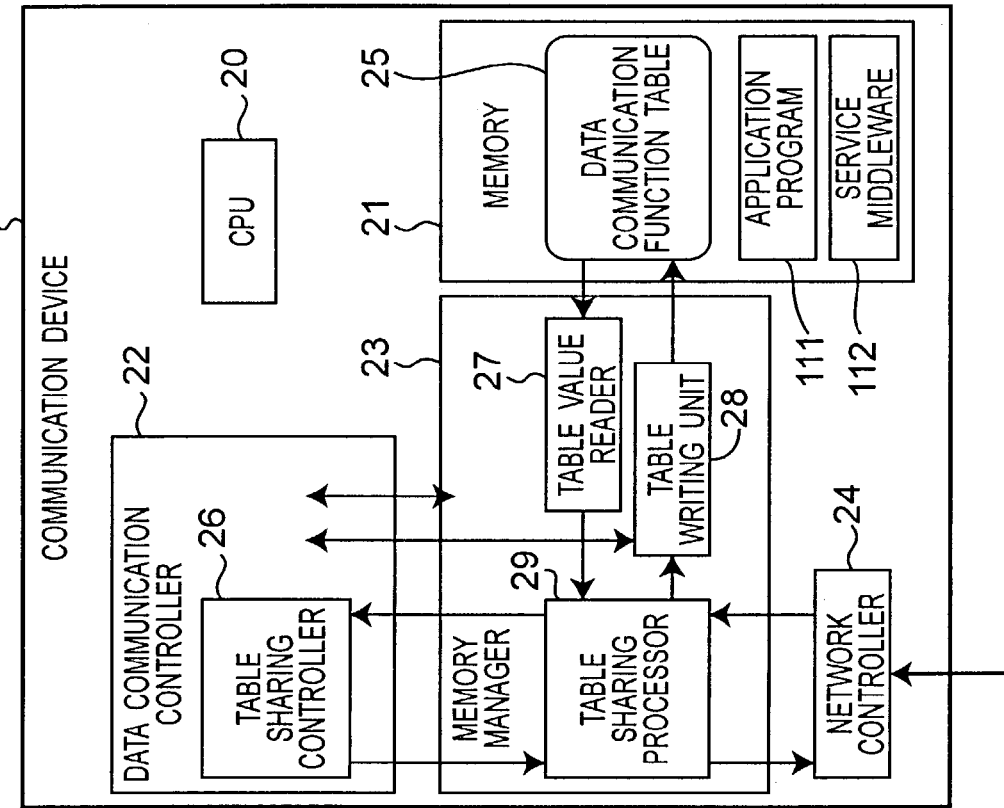
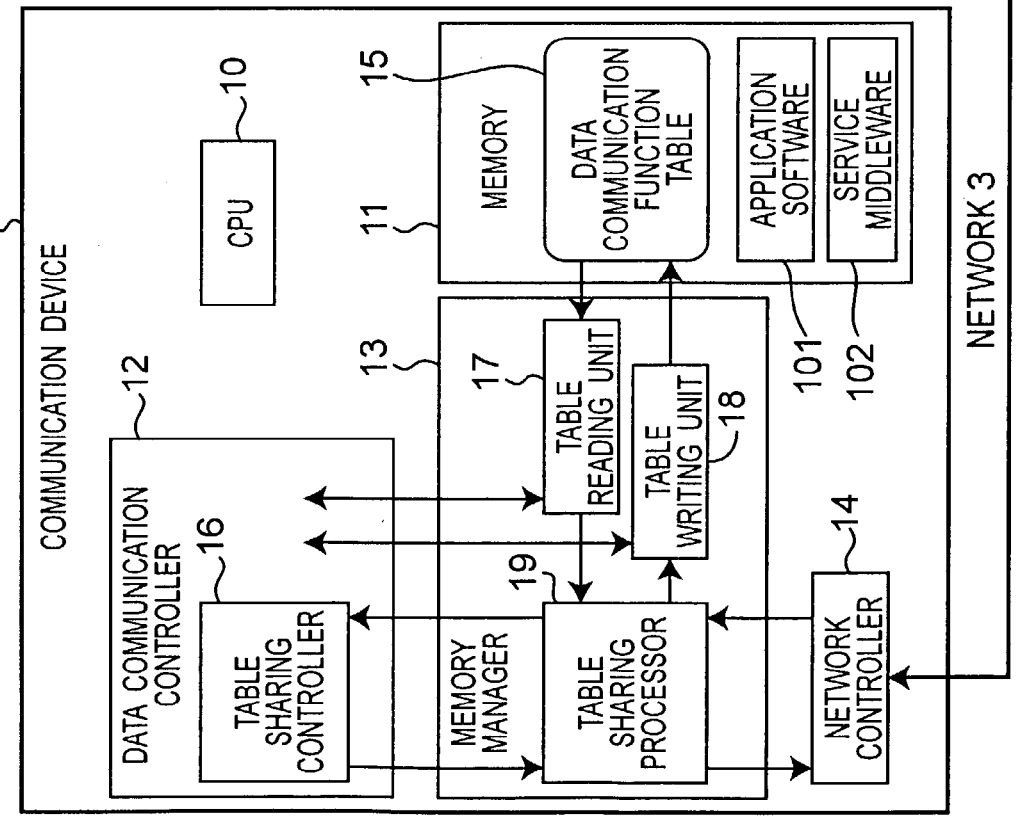

Fig.9

[A] DATA TRANSMISSION SERVICES (PART 1)

| PROPERTY | EPC | PARAMETERS | DATA TYPE | SIZE | ACCESS RULE | REQUIRED |
|---|---|---|---|---|---|---|
| DATA TYPES HANDLED FOR PUSH TYPE TRANSMISSION | 0xC0 | DEFINES THE DATA OBJECT INFORMATION HANDLED FOR TRANSMISSION BY THE TERMINAL | – | MAX 245 Byte | Get | IF PUSH TYPE TRANSMISSION IS POSSIBLE ○ |
| | | MAXIMUM BYTE SIZE<br>   : unsigned long *1<br>   +<br>NUMBER OF TYPES<br>   : unsigned char *1<br>   +<br>{TYPE<br>   : unsigned char *4<br>   +<br>MAXIMUM DATA COUNT<br>   : unsigned short}<br>   * TYPE COUNT | | | | |
| DATA TYPES HANDLED FOR PUSH TYPE TRANSMISSION | 0xC1 | DEFINES THE DATA OBJECT INFORMATION HANDLED FOR TRANSMISSION BY THE TERMINAL | – | MAX 245 Byte | Get | IF PULL TYPE TRANSMISSION IS POSSIBLE ○ |
| | | MAXIMUM BYTE SIZE<br>   : unsigned long *1<br>   +<br>NUMBER OF TYPES<br>   : unsigned char *1<br>   +<br>{TYPE<br>   : unsigned char *4<br>   +<br>MAXIMUM DATA COUNT<br>   : unsigned short}<br>   * TYPE COUNT | | | | |
| DATA COUNT PER TYPE FOR PULL TYPE COMMUNICATION | 0xC2 | DATA COUNT PER CURRENT DATA TYPE | – | MAX 122 byte | Get | |
| | | NUMBER OF TYPES<br>   : unsigned char *1<br>   +<br>{TYPE<br>   : unsigned char *4<br>   +<br>CURRENT DATA COUNT<br>   : unsigned short}<br>   * TYPE COUNT | | | | |

Fig.10

[A] DATA TRANSMISSION SERVICES (PART 2)

| PROPERTY | EPC | PARAMETERS | DATA TYPE | SIZE | ACCESS RULE | REQUIRED |
|---|---|---|---|---|---|---|
| TRANSMISSION DATA DESCRIPTION | 0xC3 | INFORMATION ABOUT EACH DATA OBJECT ACCESSIBLE AS A TRANSMISSION TARGET | – | 26 BYTES * DATA OBJECT COUNT | GetM | |
| | | ARRAY ELEMENT NUMBER (= DATA OBJECT NUMBER : unsigned short *1 + TYPE : unsigned char *4 + OBJECT NAME : unsigned char *8 + DATE : unsigned char *7 + BYTE LENGTH : unsigned long *1 + CHECK CODE : unsigned char *1 | | | AnnoM | ○ |
| DATA TRANSFER STATUS | 0xD0 | CURRENT DATA TRANSFER STATUS. IF SENDING, DATA NUMBER BEING SENT. | unsigned short | 2 byte | Set Get | ○ |
| | | SENDING (= DATA NUMBER) =0~0xEFFF WRITE-PROHIBITED=0xF000 NOT-PROCESSED, LAST TERMINATED NORMALLY =0xFFFF LAST-TERMINATED-DUE-TO-ERROR =0xFFFE | | | | |
| DATA TRANSFER | 0xD1 | TRANSFER DATA IN SEGMENTS | – | (8 + SEGMENT SIZE) * NUM_SEGMENTS | AnnoM GetM | ○ |
| | | ARRAY ELEMENT NUMBER : unsigned short *1 + TOTAL ARRAY SIZE : unsigned short *1 + SEGMENT SIZE : unsigned long *1 + DATA SEGMENTS : unsigned char *1 (SEGMENT SIZE) | | | | |

Fig. 11

[B] DATA RECEPTION SERVICE

| PROPERTY | EPC | PARAMETERS | DATA TYPE | SIZE | ACCESS RULE | REQUIRED |
|---|---|---|---|---|---|---|
| DATA TYPES HANDLED FOR PUSH TYPE RECEPTION | 0xC0 | DEFINES THE DATA OBJECT INFORMATION HANDLED FOR RECEPTION BY THE TERMINAL | - | MAX 245 Byte | Get | IF PUSH TYPE RECEPTION IS POSSIBLE ○ |
| | | MAXIMUM BYTE SIZE<br>: unsigned long *1<br>+<br>NUMBER OF TYPES (*1)<br>: unsigned char *1<br>+<br>TYPE<br>: unsigned char *4<br>* TYPE COUNT | | | | |
| DATA TYPES HANDLED FOR PULL TYPE RECEPTION | 0xC1 | DEFINES THE DATA OBJECT INFORMATION HANDLED FOR RECEPTION BY THE TERMINAL | - | MAX 245 Byte | Get | IF PULL TYPE RECEPTION IS POSSIBLE ○ |
| | | MAXIMUM BYTE SIZE<br>: unsigned long *1<br>+<br>NUMBER OF TYPES (*1)<br>: unsigned char *1<br>+<br>TYPE<br>: unsigned char *4<br>* TYPE COUNT | | | | |
| DATA SEGMENT INFORMATION | 0xC2 | MAXIMUM RECEIVABLE EDT BYTE COUNT | unsigned long | 4 byte | Anno | |
| | | 1~0xFFFFFFFF | | | | |

(*1): IF TYPE COUNT = 0, ALL DATA TYPES CAN BE RECEIVED.

Fig.13

SAMPLE MESSAGES USED FOR AUTONOMOUS COMMUNICATION (PUSH TYPE DATA COMMUNICATION)

<DATA TYPE INFORMATION REQUEST> ・・1

| OHD 1byte | SEOJ 3byte | DEOJ 3byte | EPC 1byte 0xC0 | ESV 1byte 0x62 |
|---|---|---|---|---|

<HANDLED TYPE INFORMATION RESPONSE> ・・2

| OHD 1byte | SEOJ 3byte | DEOJ 3byte | EPC 1byte 0xC0 | ESV 1byte 0x72 | DATA TYPE 1byte 0x03 |
|---|---|---|---|---|---|

| MAXIMUM BYTE LENGTH 4byte 0x00002000 | TYPE COUNT 1byte 0x03 | TYPE 1 4byte 0 ," CSV " | TYPE 2 4byte 1 ," ABC " | TYPE 3 4byte 1 ," XYZ " |
|---|---|---|---|---|

<TRANSMISSION DATA DESCRIPTION REPORT> ・・3

| OHD 1byte | SEOJ 3byte | DEOJ 3byte | EPC 1byte 0xC3 | ESV 1byte 0x77 |
|---|---|---|---|---|

| ARRAY ELEMENT # (= DATA #) 2byte 0x0000 | TYPE 4byte 0 ," TXT " | NAME 8byte " MSG_NOON " | DATE 7byte 20, 02, 01, 30, 10, 25,11 | DATA BYTE LENGTH 4byte 0x00000A00 | CHECK CODE 1byte 0xE5 |
|---|---|---|---|---|---|

<SEGMENT DATA DESCRIPTION REPORT> ・・4

| OHD 1byte | SEOJ 3byte | DEOJ 3byte | EPC 1byte 0xC2 | ESV 1byte 0x73 | MAX.EDT BYTE LENTGH 4byte 0x007F |
|---|---|---|---|---|---|

<SEND DATA SEGMENT> ・・5

| OHD 1byte | SEOJ 3byte | DEOJ 3byte | EPC 1byte 0xD1 | ESV 1byte 0x77 | ARRAY ELEMENT NUMBER 2byte 0x00 | TOTAL ARRAY SIZE 2byte 0x2F | DATA SEGMENT SIZE 4byte 0x7F | DATA SEGMENTS (※) |
|---|---|---|---|---|---|---|---|---|

<SPECIFIC DATA SEGMENT REQUEST> ・・6

| OHD 1byte | SEOJ 3byte | DEOJ 3byte | EPC 1byte 0xD1 | ESV 1byte 0x66 | ARRAY ELEMENT NUMBER 2byte 0x14 |
|---|---|---|---|---|---|

<SPECIFIED DATA SEGMENT TRANSMISSION> ・・7

| OHD 1byte | SEOJ 3byte | DEOJ 3byte | EPC 1byte 0xD1 | ESV 1byte 0x76 | ARRAY ELEMENT NUMBER 2byte 0x00 | TOTAL ARRAY SIZE 2byte 0x2F | DATA SEGMENT SIZE 4byte 0x7F | DATA SEGMENTS (※) |
|---|---|---|---|---|---|---|---|---|

< DATA TRANSFER COMPLETED> ・・8

| OHD 1byte | SEOJ 3byte | DEOJ 3byte | EPC 1byte 0xD0 | ESV 1byte 0x60 | TRANSFER STATUS 2byte 0xFFFF |
|---|---|---|---|---|---|

※TRANSFER STATUS = 0xFFFF IF COMPLETED NORMALLY; 0xFFFE IF TERMINATED DUE TO ERROR

Fig. 15 SAMPLE MESSAGES USED FOR REQUEST/RESPONSE COMMUNICATION (PULL TYPE DATA COMMUNICATION) (PART

<DATA TYPE INFORMATION REQUEST> ·· (1)

| OHD 1byte | SEOJ 3byte | DEOJ 3byte | EPC 1byte 0xC1 | ESV 1byte 0x62 |
|---|---|---|---|---|

< HANDLED TYPE INFORMATION RESPONSE> ·· (2)

| OHD 1byte | SEOJ 3byte | DEOJ 3byte | EPC 1byte 0xC1 | ESV 1byte 0x72 | MAXIMUM BYTE LENGTH 4byte 0x00002000 |
|---|---|---|---|---|---|

| TYPE COUNT 1byte 0x03 | TYPE 1 4byte 0 ,"CSV" | TYPE 1 MAXIMUM DATA UNIT COUNT 2byte 0x03 | TYPE 2 4byte 1 ,"ABC" | TYPE 2 MAXIMUM DATA UNIT COUNT 2byte 0x02 | TYPE 3 4byte 1 ,"XYZ" | TYPE 3 MAXIMUM DATA UNIT COUNT 2byte 0x01 |
|---|---|---|---|---|---|---|

< DATA TRANSFER STATUS REQUEST> ·· (3)

| OHD 1byte | SEOJ 3byte | DEOJ 3byte | EPC 1byte 0xD0 | ESV 1byte 0x62 |
|---|---|---|---|---|

<DATA TRANSFER STATUS RESPONSE> ·· (4)

| OHD 1byte | SEOJ 3byte | DEOJ 3byte | EPC 1byte 0xD0 | ESV 1byte 0x72 | TRANSFER STATUS (DATA UNIT NUMBER) 2byte 0xFFFF |
|---|---|---|---|---|---|

<WRITE-PROHIBIT> ·· (5)

| OHD 1byte | SEOJ 3byte | DEOJ 3byte | EPC 1byte 0xD0 | ESV 1byte 0x60 | TRANSFER STATUS 2byte 0xF000 |
|---|---|---|---|---|---|

<DATA COUNT PER TYPE REQUEST> ·· (6)

| OHD 1byte | SEOJ 3byte | DEOJ 3byte | EPC 1byte 0xC2 | ESV 1byte 0x62 |
|---|---|---|---|---|

<DATA COUNT PER TYPE RESPONSE> ·· (7)

| OHD 1byte | SEOJ 3byte | DEOJ 3byte | EPC 1byte 0xC2 | ESV 1byte 0x72 |
|---|---|---|---|---|

| TYPE COUNT 1byte 0x02 | TYPE 1 4byte 0 ,"CSV" | TYPE 1 MAXIMUM DATA UNIT COUNT 2byte 0x03 | TYPE 3 4byte 1 ,"XYZ" | TYPE 3 MAXIMUM DATA UNIT COUNT 2byte 0x01 |
|---|---|---|---|---|

<SPECIFIC TRANSMISSION DATA DESCRIPTION REQUEST> ·· (8)

| OHD 1byte | SEOJ 3byte | DEOJ 3byte | EPC 1byte 0xC3 | ESV 1byte 0x66 | ARRAY ELEMENT NUMBER(=DATA UNIT NUMBER) 2byte 0x0003 |
|---|---|---|---|---|---|

Fig.16

SAMPLE MESSAGES USED FOR REQUEST/RESPONSE COMMUNICATION
(PULL TYPE DATA COMMUNICATION) (PART 2)

<SPECIFIC TRANSMISSION DATA DESCRIPTION RESPONSE> · · (9)

| OHD 1byte | SEOJ 3byte | DEOJ 3byte | EPC 1byte 0xC3 | ESV 1byte 0x76 | ARRAY ELEMENT NUMBER (= DATA UNIT NUMBER) 2byte 0x0003 |
|---|---|---|---|---|---|

| TYPE 4byte 0 ," TXT " | NAME 8byte " MSG_NOON " | DATE 7byte 20, 02, 01, 30, 10, 25,11 | DATA BYTE LENGTH 4byte 0x00000A00 | CHECK CODE 1byte 0xE5 |
|---|---|---|---|---|

<START DATA TRANSFER TRIGGER> · · (10)

| OHD 1byte | SEOJ 3byte | DEOJ 3byte | EPC 1byte 0xD0 | ESV 1byte 0x60 | TRANSFER STATUS (DATA UNIT NUMBER) 2byte 0x0005 |
|---|---|---|---|---|---|

Fig.17

Data Communication Function Table for Communication Device 1 (901)

| Field | Value |
|---|---|
| AUTONOMOUS TRANSMISSION DATA TYPE (911) | "HTM", "TXT" |
| AUTONOMOUS RECEPTION DATA TYPE (912) | "TXT", "CSV" |
| RESPONSE TRANSMISSION DATA TYPE (913) | "CSV", "TXT" |
| REQUEST RECEPTION DATA TYPE (914) | "HTM", "TXT" |
| TRANSMISSION DATA DESCRIPTION (915) | (UNDEFINED) |
| DATA TRANSFER STATUS (916) | (UNDEFINED) |
| DATA COUNT PER TYPE (917) | 10,5 |
| DATA SEGMENT DESCRIPTION (918) | 1024 |
| TRANSFER DATA (919) | (UNDEFINED) |
| SELF(a) | |
| DESTINATION(b) | (UNDEFINED) |

Data Communication Function Table for Communication Device 2 (902)

| Field | Value |
|---|---|
| AUTONOMOUS TRANSMISSION DATA TYPE (921) | "HTM", "TXT" |
| AUTONOMOUS RECEPTION DATA TYPE (922) | "HTM", "CSV" |
| RESPONSE TRANSMISSION DATA TYPE (923) | "CSV", "TXT" |
| REQUEST RECEPTION DATA TYPE (924) | "CSV", "TXT" |
| TRANSMISSION DATA DESCRIPTION (925) | (UNDEFINED) |
| DATA TRANSFER STATUS (926) | (UNDEFINED) |
| DATA COUNT PER TYPE (927) | 20,10,5 |
| DATA SEGMENT DESCRIPTION (928) | 512,1024 |
| TRANSFER DATA (929) | (UNDEFINED) |
| SELF(a) | |
| DESTINATION(b) | (UNDEFINED) |

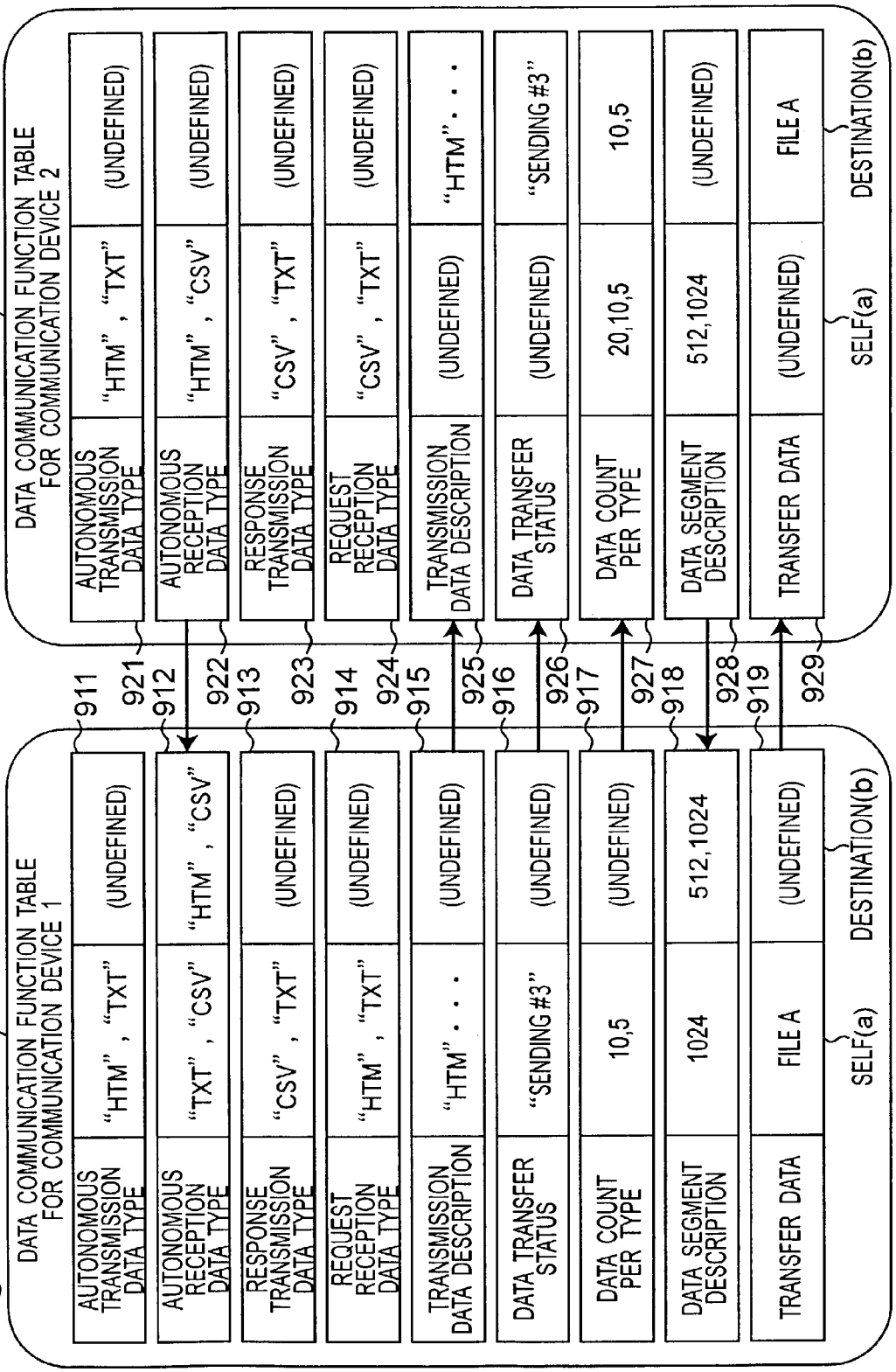

Fig.20

| PROPERTY | EPC | PARAMETERS<br>VALUE RANGE (DECIMAL) | DATA TYPE | SIZE | UNIT | ACCESS RULE | REQUIRED | STATE CHANGE ANNOUNCED | NO |
|---|---|---|---|---|---|---|---|---|---|
| OBJECT INFORMATION HANDLED FOR PUSH TYPE RECEPTION | 0xC0 | DEFINES THE RECEIVABLE OBJECT INFORMATION THAT IS HANDLED IN PUSH TYPE RECEPTION<br><br>MAXIMUM FILE BYTE SIZE<br>: unsigned short *1<br>+<br>FILE-PROVIDING DEVICE OBJECT/PROPERTY COUNT(=N)<br>: unsigned char *1<br>+<br>{FILE-PROVIDING DEVICE OBJECT/PROPERTY : unsigned char *4<br>+<br>FILE COUNT : unsigned short} * N | - | MAX 243 Byte | - | Get | ※ | | (2) |
| OBJECT INFORMATION HANDLED FOR PULL TYPE RECEPTION | 0xC1 | DEFINES THE RECEIVABLE OBJECT INFORMATION THAT IS HANDLED IN PULL TYPE RECEPTION<br><br>MAXIMUM FILE BYTE SIZE<br>: unsigned short *1<br>+<br>FILE-PROVIDING DEVICE OBJECT/PROPERTY COUNT(=N)<br>: unsigned char *1<br>+<br>{FILE-PROVIDING DEVICE OBJECT/PROPERTY : unsigned char *4<br>+<br>FILE COUNT : unsigned short} * N | - | MAX 243 Byte | - | Get | | | (3) |
| DATA SEGMENT INFORMATION | 0xD0 | MAXIMUM EDT BYTE SIZE RECEIVABLE BY THE RECEPTION-SIDE<br>1~247 | unsigned long | 2 byte | - | Get | | (4) | |

※THE OBJECT INFORMATION HANDLED FOR PUSH TYPE RECEPTION MUST BE PROVIDED IF FILES ARE TO BE RECEIVED IN THE PUSH TYPE.

Fig.21

| PROPERTY | EPC | PARAMETERS VALUE RANGE (DECIMAL) | DATA TYPE | SIZE | UNIT | ACCESS RULE | REQUIRED | STATE CHANGE ANNOUNCED | NO |
|---|---|---|---|---|---|---|---|---|---|
| OBJECT INFORMATION HANDLED FOR PUSH TYPE TRANSMISSION | 0xC0 | DEFINES THE TRANSMITTABLE OBJECT INFORMATION THAT IS HANDLED IN PUSH TYPE TRANSMISSION | - | MAX 243 Byte | - | Get | | | (2) |
| | | MAXIMUM FILE BYTE SIZE : unsigned short *1 + FILE-PROVIDING DEVICE OBJECT/PROPERTY COUNT(=N) : unsigned char *1 + {FILE-PROVIDING DEVICE OBJECT/PROPERTY : unsigned char *4 + FILE COUNT : unsigned short} * N | | | | | | | |
| OBJECT INFORMATION HANDLED FOR PULL TYPE TRANSMISSION | 0xC1 | DEFINES THE TRANSMITTABLE OBJECT INFORMATION THAT IS HANDLED IN PULL TYPE TRANSMISSION | - | MAX 243 Byte | - | Get | ※ | | (3) |
| | | MAXIMUM FILE BYTE SIZE : unsigned short *1 + FILE-PROVIDING DEVICE OBJECT/PROPERTY COUNT : unsigned char *1 + {FILE-PROVIDING DEVICE OBJECT/PROPERTY : unsigned char *4 + FILE COUNT : unsigned short} * N | | | | | | | |

Fig.22

| PROPERTY | EPC | PARAMETERS / VALUE RANGE (DECIMAL) | DATA TYPE | SIZE | UNIT | ACCESS RULE | REQUIRED | STATE CHANGE ANNOUNCED | NO |
|---|---|---|---|---|---|---|---|---|---|
| TRANSMISSION STATUS | 0xD0 | DESCRIBES THE CURRENT TRANSMISSION STATUS.<br>READY/LAST ENDED NORMALLY=0<br>START SENDING=0x01<br>WRITE-PROHIBITED=0x10<br>LAST-TERMINATED-DUE-TO-ERROR=0xFF | unsigned char | 1 byte | - | Get<br>Set | ○ | | (4) |
| TRANSMISSION TARGET INFORMATION | 0xD1 | INFORMATION IDENTIFYING OBJECT TO BE SENT<br>FILE-PROVIDING DEVICE OBJECT/PROPERTY<br>: unsigned char *4<br>+<br>FILE NUMBER<br>: unsigned short | - | 6 Byte | - | Anno<br>Get<br>Set | | | (5) |
| TRANSMISSION FILE INFORMATION | 0xD2 | INFORMATION ABOUT EACH FILE TO BE SENT<br>FILENAME : unsigned char *8<br>+<br>ATTRIBUTES : unsigned char *3<br>+<br>DATE : unsigned char *7<br>+<br>FILE BYTE LENGTH<br>: unsigned short *1<br>+<br>CHECK CODE<br>: unsigned char *1 | - | 21 Byte | - | AnnoM<br>GetM | ○ | | (6) |
| TRANSMISSION DATA | 0xD3 | SEGMENT AND SEND TRANSMISSION FILE DATA<br>{ARRAY ELEMENT NUMBER<br>: unsigned short *1<br>+<br>TOTAL ARRAY SIZE<br>: unsigned short *1<br>+<br>SEGMENT SIZE<br>: unsigned short *1<br>+<br>DATA SEGMENTS<br>: unsigned char<br>*(SEGMENT SIZE)}<br>* SEGMENT COUNT | - | (6 + SEGMENT SIZE) × NUM_ SEGMENTS | - | GetM<br>AnnoM | ○ | | (7) |

※TYPE INFORMATION HANDLED FOR PULL TYPE TRANSMISSION MUST BE PROVIDED IF FILES ARE TO BE TRANSMITTED IN THE PULL TYPE.

Fig.27

| PROPERTY | EPC | PARAMETERS | | DATA TYPE | SIZE | UNIT | ACCESS RULE | REQUIRED | STATE CHANGE ANNOUNCED | NOTES |
|---|---|---|---|---|---|---|---|---|---|---|
| | | VALUE RANGE (DECIMAL) | | | | | | | | |
| OPERATING STATUS | 0x80 | DEFINES THE SERVICE OPERATING STATUS | | unsigned char | 1 Byte | - | Get /Set | ○ | | |
| | | SERVICE OPERATING=0x30 SERVICE INTERRUPTED=0x31 | | | | | | | | |
| OBJECT INFORMATION HANDLED FOR PUSH TYPE RECEPTION | 0xC0 | DEFINES THE RECEIVABLE OBJECT INFORMATION THAT IS HANDLED IN PUSH TYPE RECEPTION | | - | MAX 243 Byte | - | Get | ※ | | |
| | | MAXIMUM FILE BYTE SIZE : unsigned short *1 + FILE-STORING DEVICE CLASS/PROPERTY COUNT(=N) : unsigned char *1 + {FILE-STORING DEVICE CLASS/PROPERTY : unsigned char *3 + FILE COUNT : unsigned short } * N | | | | | | | | |
| DATA SEGMENT INFORMATION | 0xD0 | MAXIMUM EDT BYTE SIZE RECEIVABLE BY THE RECEPTION-SIDE | | unsigned short | 2 byte | - | Get | | | |
| | | 1~247 | | | | | | | | |

※THE OBJECT INFORMATION HANDLED FOR PUSH TYPE RECEPTION MUST BE PROVIDED IF FILES ARE TO BE RECEIVED IN THE PUSH TYPE

Fig.28

| PROPERTY | EPC | PARAMETERS VALUE RANGE (DECIMAL) | DATA TYPE | SIZE | UNIT | ACCESS RULE | REQUIRED | STATE CHANGE ANNOUNCED | NOTES |
|---|---|---|---|---|---|---|---|---|---|
| OPERATING STATUS | 0x80 | DEFINES THE SERVICE OPERATING STATUS<br><br>SERVICE OPERATING=0x30<br>SERVICE INTERRUPTED=0x31 | unsigned char | 1 Byte | - | Get /Set | ◯ | | |
| OBJECT INFORMATION HANDLED FOR PULL TYPE TRANSMISSION | 0xC1 | DEFINES THE TRANSMITTABLE OBJECT INFORMATION THAT IS HANDLED IN PULL TYPE TRANSMISSION<br><br>MAXIMUM FILE BYTE SIZE<br>　: unsigned short *1<br>　+<br>FILE-PROVIDING<br>DEVICE OBJECT/PROPERTY COUNT<br>　: unsigned char *1<br>　+<br>{FILE-PROVIDING DEVICE OBJECT/PROPERTY<br>　: unsigned char *4<br>　+<br>DATA TYPE : unsigned short} * N | - | MAX 243 Byte | - | Get | ※ | | |

Fig.29

| PROPERTY | EPC | PARAMETERS | DATA TYPE | SIZE | UNIT | ACCESS RULE | REQUIRED | STATE CHANGE ANNOUNCED | NOTES |
|---|---|---|---|---|---|---|---|---|---|
| | | VALUE RANGE (DECIMAL) | | | | | | | |
| SEND/ RECEIVE SETTING | 0xD0 | DESCRIBES THE TRANSMISSION TRIGGER AND WRITE DESTINATION OF SEND/RECEIVE RESULTS. | unsigned char | 1 byte | - | Set | ○ | | |
| | | NORMAL COMPLETION=0x00 FORCED TERMINATION=0x01 WRITE-PROHIBIT SETTING=0x10 TRANSMISSION START=0x20 | | | | | | | |
| TRANSMISSION STATUS | 0xD1 | CURRENT TRANSMISSION STATUS | unsigned char | 1 byte | - | Get | ○ | | |
| | | READY=0x00 WRITE-PROHIBITED=0x10 SENDING=0x20 | | | | | | | |
| TRANSMISSION TARGET INFORMATION | 0xD2 | INFORMATION ABOUT OBJECT TO BE SENT | - | 6 byte | - | Anno Get Set | | | |
| | | FILE-PROVIDING DEVICE OBJECT/PROPERTY : unsigned char *4 + FILE NUMBER : unsigned short | | | | | | | |
| TRANSMISSION FILE INFORMATION | 0xD3 | INFORMATION ABOUT EACH FILE TO BE SENT | - | 21 byte | - | Anno Get | ○ | | |
| | | FILENAME : unsigned char *8 + ATTRIBUTES : unsigned char *3 + DATE : unsigned char *7 + FILE BYTE LENGTH : unsigned short *1 + CHECK CODE : unsigned char *1 | | | | | | | |
| TRANSMISSION DATA | 0xD4 | SEGMENT AND SEND TRANSMISSION FILE DATA | - | (6 + SEGMENT SIZE) X SEGMENT COUNT | - | GetM AnnoM | ○ | | |
| | | {ARRAY ELEMENT NUMBER : unsigned short *1 + TOTAL ARRAY SIZE : unsigned short *1 + SEGMENT SIZE : unsigned short *1 + DATA SEGMENTS : unsigned char *(SEGMENT SIZE)} * SEGMENT COUNT | | | | | | | |

※HANDLED TYPE INFORMATION FOR PULL TYPE TRANSMISSION MUST BE PROVIDED TO SEND FILES IN THE PULL TYPE.

Fig.34

| PROPERTY | EPC | PARAMETERS<br>VALUE RANGE (DECIMAL) | DATA TYPE | SIZE | UNIT | ACCESS RULE | REQUIRED | STATE CHANGE ANNOUNCED | NOTES |
|---|---|---|---|---|---|---|---|---|---|
| OPERATING STATUS | 0x80 | DEFINES THE SERVICE OPERATING STATUS<br><br>SERVICE OPERATING=0x30<br>SERVICE INTERRUPTED=0x31 | unsigned char | 1 Byte | - | Get /Set | ○ | | |
| OBJECT INFORMATION HANDLED FOR PUSH TYPE RECEPTION | 0xC0 | DEFINES THE RECEIVABLE OBJECT INFORMATION THAT IS HANDLED IN PUSH TYPE RECEPTION<br><br>MAXIMUM FILE BYTE SIZE<br>: unsigned short *1<br>+<br>FILE STORAGE INFORMATION COUNT(=N)<br>: unsigned char *1<br>+<br>{FILE STORAGE DEVICE INFORMATION<br>: unsigned char *3<br>+<br>FILE COUNT : unsigned short} * N | - | 243 Byte | - | Get | ※ | | |
| DATA SEGMENT INFORMATION | 0xD0 | MAXIMUM EDT BYTE SIZE RECEIVABLE BY THE RECEPTION-SIDE<br><br>1~247 | unsigned short | 2 byte | - | Get | | | |

※THE OBJECT INFORMATION HANDLED FOR PUSH TYPE RECEPTION PROPERTY MUST BE PROVIDED IF FILES ARE TO BE RECEIVED IN THE PUSH TYPE.

Fig.35

| PROPERTY | EPC | PARAMETERS | | DATA TYPE | SIZE | UNIT | ACCESS RULE | REQUIRED | STATE CHANGE ANNOUNCED | NOTES |
|---|---|---|---|---|---|---|---|---|---|---|
| | | VALUE RANGE (DECIMAL) | | | | | | | | |
| OPERATING STATUS | 0x80 | DEFINES THE SERVICE OPERATING STATUS | | unsigned char | 1 Byte | - | Get /Set | ○ | | |
| | | SERVICE OPERATING=0x30 | | | | | | | | |
| | | SERVICE INTERRUPTED=0x31 | | | | | | | | |
| OBJECT INFORMATION HANDLED FOR PULL TYPE TRANSMISSION | 0xC1 | DEFINES THE TRANSMITTABLE OBJECT INFORMATION THAT IS HANDLED IN PULL TYPE TRANSMISSION | | - | 243 Byte | - | Get | ※1 | | |
| | | MAXIMUM FILE BYTE SIZE<br>: unsigned short *1<br>+<br>FILE-PROVIDER INFORMATION COUNT<br>: unsigned char *1<br>+<br>{FILE-PROVIDER DEVICE INFORMATION<br>: unsigned char *4<br>+<br>FILE COUNT : unsigned short} | * N | | | | | | | |

※THE OBJECT INFORMATION HANDLED FOR PULL TYPE TRANSMISSION PROPERTY MUST BE PROVIDED IF FILES ARE TO BE SENT IN THE PULL TYPE.

*Fig.36*

| PROPERTY | EPC | PARAMETERS / VALUE RANGE (DECIMAL) | DATA TYPE | SIZE | UNIT | ACCESS RULE | REQUIRED | STATE CHANGE ANNOUNCED | NOTES |
|---|---|---|---|---|---|---|---|---|---|
| SEND/ RECEIVE SETTING | 0xD0 | DESCRIBES THE TRANSMISSION TRIGGER AND WRITE DESTINATION OF SEND/RECEIVE RESULTS. | unsigned char | 1 byte | - | Set | ○ | | |
| | | NORMAL COMPLETION=0x00 FORCED TERMINATION=0x01 TRANSMISSION START=0x20 | | | | | | | |
| TRANSMISSION STATUS | 0xD1 | CURRENT TRANSMISSION STATUS | unsigned char | 1 byte | - | Get | ○ | | |
| | | READY=0 SENDING=0x20 | | | | | | | |
| TRANSMISSION TARGET INFORMATION | 0xD2 | INFORMATION ABOUT OBJECT TO BE SENT | - | 6 Byte | - | Anno | ○ | | |
| | | FILE-PROVIDING DEVICE INFORMATION : unsigned char *4 + FILE NUMBER : unsigned short | | | | Set | ※2 | | |
| TRANSMISSION FILE INFORMATION | 0xD3 | INFORMATION ABOUT EACH FILE TO BE SENT | - | 21 Byte | - | Anno | ○ | | |
| | | FILENAME : unsigned char *8 + ATTRIBUTES : unsigned char *3 + DATE : unsigned char *7 + FILE BYTE LENGTH : unsigned short *1 + CHECK CODE : unsigned char *1 | | | | | | | |
| TRANSMISSION DATA | 0xD4 | SEGMENT AND SEND TRANSMISSION FILE DATA | - | (6 + SEGMENT SIZE) × SEGMENT COUNT | - | AnnoM GetM | ○ | | |
| | | {ARRAY ELEMENT NUMBER : unsigned short *1 + TOTAL ARRAY SIZE : unsigned short *1 + SEGMENT SIZE : unsigned short *1 + DATA SEGMENTS : unsigned char *(SEGMENT SIZE)} * SEGMENT COUNT | | | | | | | |

※THE TRANSMISSION TARGET INFORMATION PROPERTY MUST HAVE THE ACCESS RULE SET TO SEND FILES IN THE PULL TYPE.

Fig.42

<(6) TRANSMISSION FILE INFORMATION REPORT RESPONSE>

| OHD 1byte 0x83 | SEOJ 3byte 0x0D,0x02 | DEOJ 3byte 0x0D,0x03 | EPC 1byte 0xD3 | ESV 1byte 0x7A |
|---|---|---|---|---|

<((7) DATA SEGMENT TRANSMISSION>

| OHD 1byte 0x83 | SEOJ 3byte 0x0D,0x03 | DEOJ 3byte 0x0D,0x02 | EPC 1byte 0xD4 | ESV 1byte 0x77 |
|---|---|---|---|---|

| ARRAY ELEMENT NUMBER 2byte | TOTAL ARRAY SIZE 2byte | DATA SEGMENT SIZE 2byte | DATA SEGMENTS (DATA SEGMENT SIZE) byte |
|---|---|---|---|

<(8) SPECIFIED DATA SEGMENT REQUEST>

| OHD 1byte 0x83 | SEOJ 3byte 0x0D,0x02 | DEOJ 3byte 0x0D,0x03 | EPC 1byte 0xD4 | ESV 1byte 0x66 | SPECIFIC ARRAY ELEMENT NUMBER 2byte |
|---|---|---|---|---|---|

<(9) SPECIFIED DATA SEGMENT TRANSMISSION>

| OHD 1byte 0x83 | SEOJ 3byte 0x0D,0x03 | DEOJ 3byte 0x0D,0x02 | EPC 1byte 0xD4 | ESV 1byte 0x76 |
|---|---|---|---|---|

| ARRAY ELEMENT NUMBER 2byte | TOTAL ARRAY SIZE 2byte | DATA SEGMENT SIZE 2byte | DATA SEGMENTS (DATA SEGMENT SIZE)) byte |
|---|---|---|---|

<(10) TRANSMISSION COMPLETION SETTING>

| OHD 1byte 0x83 | SEOJ 3byte 0x0D,0x02 | DEOJ 3byte 0x0D,0x03 | EPC 1byte 0xD0 | ESV 1byte 0x60 | SEND/RECEIVE SETTING 1byte |
|---|---|---|---|---|---|

Fig.44

<(5) TRANSMISSION STATUS REQUEST>

| OHD<br>1byte<br>0x83 | SEOJ<br>3byte<br>0x0D,0x02 | DEOJ<br>3byte<br>0x0D,0x03 | EPC<br>1byte<br>0xD1 | ESV<br>1byte<br>0x62 |
|---|---|---|---|---|

<(6) TRANSMISSION STATUS RESPONSE>

| OHD<br>1byte<br>0x83 | SEOJ<br>3byte<br>0x0D,0x03 | DEOJ<br>3byte<br>0x0D,0x02 | EPC<br>1byte<br>0xD1 | ESV<br>1byte<br>0x72 | TRANSMISSION<br>STATUS<br>1byte<br>0x00 |
|---|---|---|---|---|---|

<(7) START SENDING TRIGGER>

| OHD<br>1byte<br>0x83 | SEOJ<br>3byte<br>0x0D,0x02 | DEOJ<br>3byte<br>0x0D,0x03 | EPC<br>1byte<br>0xD0 | ESV<br>1byte<br>0x60 | SEND/RECEIVE<br>SETTING<br>1byte<br>0x20 |
|---|---|---|---|---|---|

Fig.48

| FILENAME | ATTRIBUTES | DATE | FILE BYTE SIZE | CHECK CODE |
|---|---|---|---|---|
| 8 byte | 3 byte | 7 byte | 2 byte | 1 byte |

Fig.49

| ARRAY ELEMENT NUMBER 2 byte | TOTAL ARRAY SIZE 2 byte | DATA SEGMENT SIZE 2 byte | DATA SEGMENTS (DATA SEGMENT SIZE) -BYTES |
|---|---|---|---|
| ... | | | |
| ARRAY ELEMENT NUMBER 2 byte | TOTAL ARRAY SIZE 2 byte | DATA SEGMENT SIZE 2 byte | DATA SEGMENTS (DATA SEGMENT SIZE) -BYTES |

} TO SIZE OF ARRAY

DATA COMMUNICATION METHOD

BACKGROUND OF THE INVENTION

1. Field of the Invention

The present invention relates to a communication method for data transfers between two communication devices connected over a network.

2. Description of the Background Art

Even if a network connection is established between two communication devices, data communication between the devices is not possible or the transferred data will be invalid unless two conditions are met. First, data sending and receiving between the devices needs to be enabled, second, both devices need to handle the desired data types, data formats, data size, and other parameters. Communication between devices has conventionally been handled with proprietary communication methods defined by the equipment manufacturers. Examples of these communication methods include the device on the data transmission side determining whether it can transmit data or whether it can send the requested data; comparing the types of data that can be sent by the transmission-side device and the types of data that are valid on the reception-side device to determine whether the data types are compatible between the sending and receiving sides; and acquiring the type and size of data that can be transmitted by the transmission-side device and data identification information for communication. Parts of these different methods can be omitted or combined together to build a desirable communication system and method for executing a specific communication sequence. This is described, for example, in Japanese Patent Laid-Open Publication (kokai) H9-244942.

When data communication is attempted using various combinations of data types, formats, and size, communication traffic increases and the data transmission rate decreases due to the increased traffic resulting from sending and receiving invalid data and the communication devices sending data back and forth to report and confirm the communication format.

Furthermore, when data is communicated according to a defined communication sequence between the same communication devices over plural occasions, previously communicated information must be exchanged again, thus increasing the transmitted data (traffic) and lowering the data transmission rate.

In a communication environment in which a large file, for example, must be divided for sending and receiving, how files are divided, the size of each divided data, and other parameters are individually defined by application vendor with the above-described communication techniques, and devices running different applications cannot communicate with each other.

SUMMARY OF THE INVENTION

A data communication method according to an exemplary embodiment of the present invention is useful for data communication between two communication devices connected to a network. A data communication function table for storing functions relating to data communication and a data communication control unit are disposed in memory in the communication devices, and data communication between the communication devices is accomplished by the data communication control unit writing and reading to the data communication function table. This method effectively reduces network traffic because it is not necessary to send the same data. Furthermore, because data communication is completed in less time, this data communication method has from the perspective of the communication devices the same effect as increasing the data communication rate.

By sharing a function table related to communication, a data communication method according to an exemplary embodiment of the present invention as described above makes it possible to identify communication devices capable of data communication by means of autonomous communication or request/response communication, identify the type of transmitted data, get the data size and various data identification information, and divide the data to an optimal size for communication, and can thereby reduce traffic and effectively increase data communication throughput.

The data communication function table could contain codes indicating the types of data that can be transmitted or the types of data that can be received. Network traffic can be reduced by eliminating requests for data that cannot be transmitted and transmissions of data that cannot be received or is invalid.

These data communication function tables could contain a field indicating whether a communication device has an autonomous communication function or a request/response communication function. Network traffic can be reduced by sending data only to communication devices that can operate in an autonomous communication mode, or sending data only to communication devices that can respond to request/response communication requests.

Furthermore, the data communication function table could have a field denoting a divisional size enabling maximum data communication efficiency. This enables data communication at the communication rate that is most efficient for a network configured from a desired communication media.

The communication device stores the data communication function table for storing functions related to data communication in memory, and has a data communication controller for communicating data with other communication devices by writing and reading the data communication function table.

The data communication function table contains at least one of the following: autonomous transmission data type, autonomous reception data type, response transmission data type, and request reception data type.

The data communication function table also stores at least one of the following: transmission data description, data transfer status, data unit count per data type, divisional data count, and transfer data.

The data communication function table of the destination device stores at least one of the following: autonomous transmission data type, autonomous reception data type, response transmission data type, request reception data type, transmission data description, data transfer status, data unit count per data type, divisional data count, and transfer data.

The transmission-side and reception-side devices can also share this information. By sharing information it is not necessary to send the same data again, and network traffic can therefore be reduced. Because less data communication time is needed, the effect for each communication device is the same as increasing the data communication rate.

The communication device stores the data communication function table for storing functions related to data communication in memory, and has a data communication controller for communicating data with other communication devices by writing and reading the data communication function table.

The data communication function table contains at least one of the following: autonomous transmission data type, autonomous reception data type, response transmission data type, and request reception data type.

The data communication function table of the destination device stores at least one of the following: autonomous transmission data type, autonomous reception data type, response transmission data type, and request reception data type.

The transmission-side and reception-side devices can also share this information. By sharing information it is not necessary to send the same data again, and network traffic can therefore be reduced. Because less data communication time is needed, the effect for each communication device is the same as increasing the data communication rate.

An exemplary embodiment of the present invention also provides a data communication method recording medium for storing a program enabling a computer to execute the data communication method of the invention. This program can be recorded to any computer-readable medium.

An exemplary embodiment of the present invention can also be provided as a computer-executable program enabling a computer to execute the data communication method of the invention.

The communication device stores the data communication function table for storing functions related to data communication in memory, and has a data communication controller for communicating data with other communication devices by writing and reading the data communication function table.

The data communication function table contains at least one of the following: autonomous transmission data type, autonomous reception data type, response transmission data type, and request reception data type.

The data communication function table also stores at least one of the following: transmission data description, data transfer status, data unit count per data type, divisional data count, and transfer data.

The data communication function table of the destination device stores at least one of the following: autonomous transmission data type, autonomous reception data type, response transmission data type, request reception data type, transmission data description, data transfer status, data unit count per data type, divisional data count, and transfer data.

The transmission-side and reception-side devices can also share this information.

The communication device stores the data communication function table for storing functions related to data communication in memory, and has a data communication controller for communicating data with other communication devices by writing and reading the data communication function table.

The data communication function table contains at least one of the following: autonomous transmission data type, autonomous reception data type, response transmission data type, and request reception data type.

The data communication function table of the destination device stores at least one of the following: autonomous transmission data type, autonomous reception data type, response transmission data type, and request reception data type.

The transmission-side and reception-side devices can also share this information.

Other objects and attainments together with a fuller understanding of the invention will become apparent and appreciated by referring to the following description and claims taken in conjunction with the accompanying drawings.

BRIEF DESCRIPTION OF THE DRAWINGS

This and other objects and features of the present invention will become clear from the subsequent description of a preferred embodiment thereof made with reference to the accompanying drawings in which like parts are designated by like reference numerals and in which.

FIG. 1 shows the configuration of a communication system for sending and receiving data based on a communication method according to an exemplary embodiment of the present invention;

FIG. 9 and FIG. 10 show properties related to data transmission services;

FIG. 11 shows properties related to data reception services;

FIG. 13 shows sample messages used in an autonomous communication sequence;

FIG. 15 shows sample messages used in a request/response communication sequence;

FIG. 16 shows sample messages used in a request/response communication sequence;

FIG. 17 shows another data communication function table before data communication;

FIG. 18 shows another data communication function table after data communication;

FIGS. 20 to 22 show properties related to data reception services;

FIG. 27 shows properties related to a data reception service;

FIG. 28 and FIG. 29 show properties related to data transfer services;

FIG. 34 shows properties related to a data reception service;

FIG. 35 and FIG. 36 show properties related to data transfer services;

FIG. 41 and FIG. 42 show messages used in an autonomous communication sequence;

FIG. 43 and FIG. 44 show messages used in a request/response communication sequence;

FIG. 48 shows the format of transmission file information;

FIG. 49 shows the format of transmission data; and

DETAILED DESCRIPTION OF THE PREFERRED EMBODIMENTS

Preferred embodiments of the present invention are described below with reference to the accompanying figures. A basic concept of the present invention is described first below.

Figure 50:
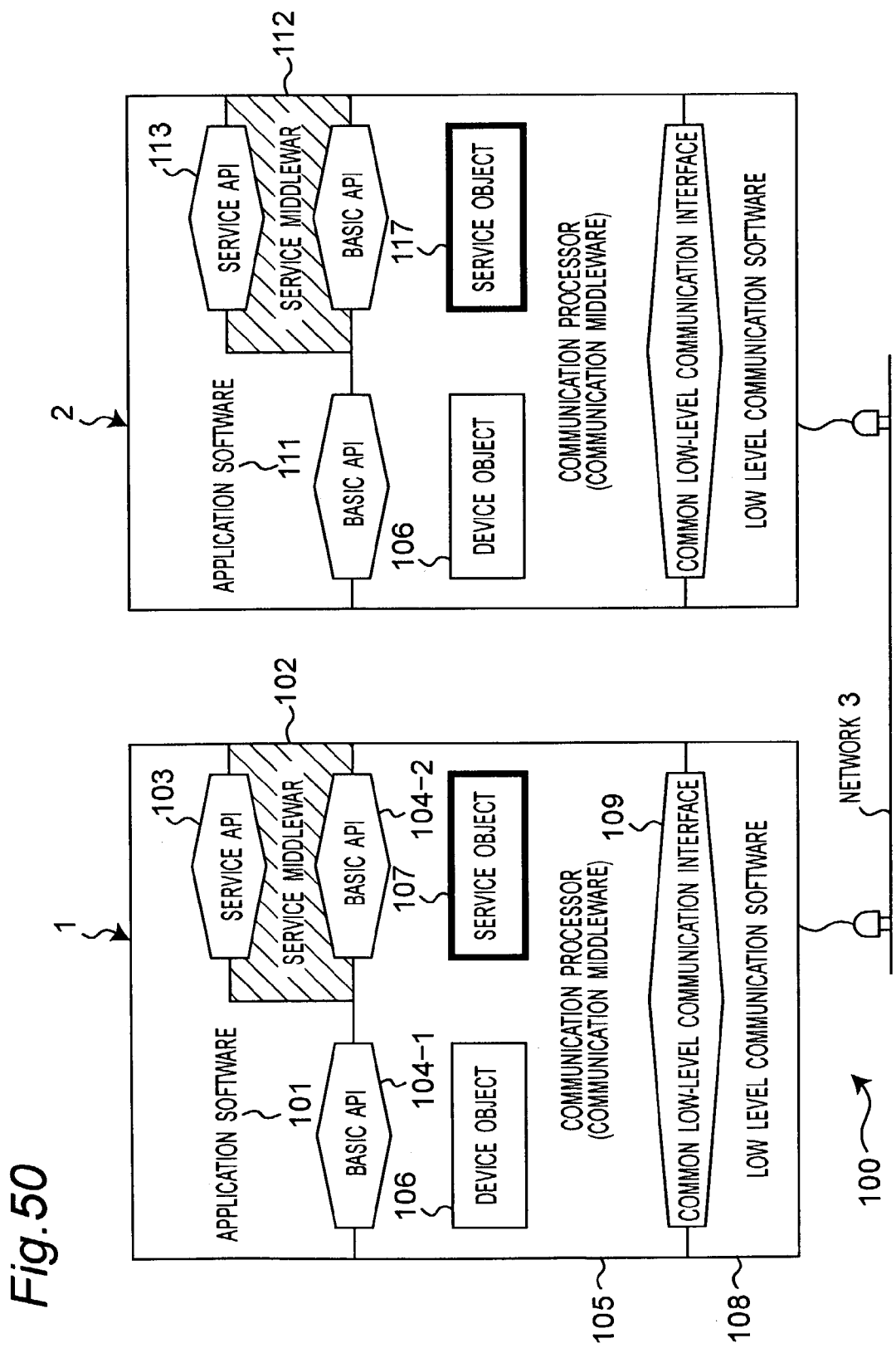
FIG. 50 shows the configuration of a communication system 100 for sending and receiving data based on the communication method of an exemplary embodiment of the present invention.

FIG. 50 shows the configuration of a communication system 100 for sending and receiving data based on a communication method according to an exemplary embodiment of the present invention. This communication system 100 includes two communication devices 1 and 2 connected via a network 3.

As an example of a communication system 100 according to an exemplary embodiment of the present invention, a local area network in the home ("home LAN") for interconnecting home appliances so that they can communicate with each other is used herein. The communication devices 1 and 2 are appliances having basically the same communication functions and configuration. An air conditioning system, refrigerator, microwave oven, and exterior security cameras are exemplary of such appliances. The electrical lines used to supply power to the appliances are used for the network 3. By using the electrical lines for the network 3, the communication rate of the network 3 is relatively slow at a maximum 9600 bps typically. A wireless network with an even slower communication rate of a maximum 2400 bps, for example, could also be used in place of this home LAN. In either case, however, no new wiring is required to construct the network 3. It will also be obvious that the network 3 could be a normal communication network.

It is assumed in the following description that communication device 1 sends a data file to communication device 2, and communication device 2 processes the received file. For example, if the communication device 1 is a security camera for monitoring visitors and communication device 2 is a control terminal (simply a controller below) with a monitor, then an image data file captured by the security camera is sent from communication device 1 over the network 3 to communication device 2 for display on the controller's monitor.

It should be noted that "data file" is also used herein with reference to data communicated without having a filename assigned thereto.

This communication device 1 has application software 101, service middleware 102, a service API (Application Programming Interface) 103, basic API 104-1 and 104-2, communication processor (communication middleware) 105, service object 107, low-level communication software 108, and common low-level communication interface 109. As will be apparent from the "software" labels used here, the configuration of the communication device 1 shown in FIG. 50 is a conceptual model of communication function layers in the communication device 1. A block diagram of a corresponding physical configuration is described further below with reference to FIG. 1.

One of important feature of the exemplary embodiment of the present invention is that service middleware 102 and service object 107 are disposed to both communication devices 1 and 2 of the communication system 100, and a uniform procedure is followed for communication. Because different functions are required in the communication device 1 on the data file transmission-side and in the communication device 2 on the side receiving the data file, the specific content of the service middleware 102 and service object 107 is also different on the sending and receiving sides. However, by predefining the data required to receive the data file and following a defined procedure for communication, communication data can be posted and confirmed and an efficient communication system can be achieved. Valid data and the device with which data is to be communicated can thus be easily determined. Sufficient practical utility can thus be assured even on a network 3 with a relatively slow data transmission rate.

The application software 101 is a program for running major processes on the communication devices. In the case of communication device 1 the application software 101 is a program for capturing and encoding images with the exterior security camera. For communication device 2 it is a program for decoding and displaying the received images. The application software 101 can be a single program or it could be a set of multiple programs each performing specific processes.

The service middleware 102 is a program for handling the shared basic operations of the application software 101. More specifically, the service middleware 102 handles sending and receiving relatively large data files, that is, managing the data file transmission sequence and reassembling (decoding) received divisional data files. The service middleware 102 is part of a specific application program. The service middleware 102 therefore uses basic API 104-2 when using the functions of the communication middleware 105 in internal processes. From the perspective of the communication middleware 105, the service middleware 102 therefore operates as application software 101.

Using the service middleware 102 to define shared processes makes application development easier, enables software vendors to focus on developing the essential functions and performance of the system and devices, and therefore makes it possible to provide system peripherals and devices that are more beneficial for the user. This service middleware 102 is therefore described more fully below.

The service API 103 is an API for accessing the service middleware 102 from the application software 101. The service API 103 is provided by the service middleware 102. By using the service API 103, the application software 101 can pass requests to the service middleware 102, or the application software 101 can receive process results from the service middleware 102.

An application programming interface (API) generally refers to an interface enabling an application to call specific functions provided by the OS. API specifications are generally publicly available so that the API can be used as a tool enabling efficient application development.

Basic API 104-1 and 104-2 are interfaces used for the application software 101 to exchange data files with the communication middleware 105. Because the service middleware 102 is part of the application program from the perspective of the communication middleware 105, the basic APIs are shared by both. For easier understanding, however, basic API 104-1 is used to communicate with the application software 101, and basic API 104-2 is used to communicate with the service middleware 102.

The communication middleware 105 runs the communication process for sending and receiving data files using device object 106 and service object 107. More specifically, the communication middleware 105 runs frame processes for interpreting messages received over the network 3, processes determined by the properties of the service object 107, and writing to and reading from the service object 107. These data files include files received from the application software 101 and/or service middleware 102, and files received from the network 3.

The device object 106 part of the communication middleware 105 is described next. A device object 106 defines various parameters related to a particular device. Parameters of the device object 106 include the device's network class, properties, and property values. If the device is a camera, for example, the device object 106 defines the ID number identifying a particular camera, a flag indicating the current operation status of the camera, the camera's shutter speed, lens aperture, and exposure parameters, and where captured images are stored. Based on the class and the instance, a memory area of the device object 106 is specified to retrieve information.

The service object 107 is an object model describing the functions and settings of service middleware 102 available to the network. More specifically, the service object 107 is an object model of class specifications defining the specific functions, services, and properties of the service middleware 102. The purpose of defining the service object 107 is to efficiently construct a system by accessing the service middleware 102 over the network 3. The service object 107 defines a code denoting the types of data files that can be sent and received, and flags denoting an autonomous communication function or request/response communication function. Examples of specific configurations of the service object 107 are shown in the function tables in FIGS. 2 to 8 and FIGS. 17 to 19, and are described more fully in the embodiments below.

The low-level communication software 108 runs a process enabling access to the network 3. More specifically, the low-level communication software 108 absorbs differences between protocols of various transmission medium to receive/send data from/to common low-level communication interface 109 commonly defined. The common low-level communication interface 109 mediates data file transmission. Conversely, when a data file to be sent to the network 3 is received from the communication middleware 105, the low-level communication software 108 receives the data file through the common low-level communication interface 109 and sends the data file over the network 3 using a specific protocol.

The configuration of the communication device 1 with respect to its communication functions is described above. The basic configuration of communication device 2 is substantially identical to communication device 1, except that because it functions as a controller it must also communicate with devices other than communication device 1. This means that communication device 2 may have multiple service objects 117, one for each device it communicates with.

The service middleware 102, which is an important feature of an exemplary embodiment of the present invention, is next described in detail. The service middleware 102 supports file transfers for sending and receiving data files over a network 3 with a relatively small transmission capacity. This file transfer process is called a "file transfer service."

The data file transmission sequence managed by the service middleware 102 can be divided into two major parts. First is the communication sequence whereby the communication device 1 autonomously sends a data file. This type of communication is referred to as "autonomous communication" or "PUSH type data communication." More specifically, this communication sequence is used when a camera (communication device 1) autonomously sends an image data file to the controller (communication device 2).

Second is a sequence whereby communication device 2 asks communication device 1 to send a data file, and communication device 1 sends the requested data file in response. This type of communication is called "request/response communication" or "PULL type data communication." A specific example of this sequence is when the user wants to see the image captured by the camera (communication device 1) and operates the controller (communication device 2) to request the image data file from the camera (communication device 1). The camera (communication device 1) receiving the request then captures an image and sends the image data file to the controller (communication device 2).

Both of these communication sequences are further described in detaile in the embodiments below.

The service middleware 102 divides data files based on the transmission capacity of the network 3 and the data size that can be handled in a single communication by the destination communication device 2. The service middleware 102 of the camera (communication device 1) may detect the current transmission capacity of the network 3 based on information from the low-level communication software 108 when the power turns on. When the destination communication device 2 is identified, it also gets the data size that can be handled in a single communication by the destination communication device 2 by polling a service object 117 of the communication device 2. If the data file to be sent is larger than the indicated data size, the data file is divided and sent in blocks that are a size within the transmission capacity of the network 3.

Assume that the data size that can be sent and received at one time on the network 3 is a maximum 131 bytes, and the size of image data captured by the camera is 5 k bytes (approximately 5000 bytes). In this case the service middleware 102 of the camera considers the size of data that can be handled by the controller (communication device 2) and divides the image data into 131 byte blocks for transmission to the controller (communication device 2). The service middleware 102 sets the data division information required for sending data in the service object 107. This data division information includes the size of the data blocks that can be handled in a single communication by the camera (communication device 1) on the data transmission side. Other information contained in the service object 107 includes a unique ID, the order and the number identifying each of the divided image data.

The controller (communication device 2) on the receiving side receives each of the divided image data. The service middleware 112 of the communication device 2 polls the service object 107 of the camera (communication device 1) to confirm whether all of the divided data were received. If not, the service middleware 112 asks the camera (communication device 1) to resend the remaining divided data. If all the divided data were received, the service middleware 112 reassembles the divided data based on the data division information set in the service object 107 of the camera (communication device 1) to get the image data file. The service middleware 112 supplies the image data file through the service API 113 in response to a request from the application program 111.

Service objects 107 and 117 as they relate to the above-noted file transfer service are described in further detail below.

In order to transmit data files the transmission-side communication device 1 has a service object 107 relating to sending files (i.e., a file transmission service object 107). The reception-side communication device 2 has a service object 117 relating to receiving files (i.e., file reception service object 117). Both file transmission and file reception service objects store the properties required for the file transfer method (i.e., PUSH or PULL type transfers). These properties are respective expressions on attributes and functions of the service itself, such as operational condition, transmission condition, and transmitted content of the file transfer service.

The file transmission service object 107 posts the transmission settings, transmission conditions, and transmission content. The specific content is shown in FIG. 21, FIG. 22, FIG. 35 and FIG. 36.

The file reception service object 117 is the object for receiving data files. The specific content of this service object 117 is shown in FIG. 20 and FIG. 34.

It should be noted that the object data for push transmission/reception describes the types of data that can be sent and received in the PUSH mode, and the object data for PULL type transmission/reception describes the types of data that can be sent and received in the PULL type.

Embodiment 1

FIG. 1 shows the configuration of a communication system 100 for sending and receiving data based on a communication method according to the present invention. Similarly to the configuration shown in FIG. 50, this communication system 100 has a communication device 1 and another communication device 2 connected via a network 3.

Communication device 1 has a central processing unit (CPU) 10, memory 11, data communication controller 12, memory manager 13, and network controller 14.

The CPU 10 handles overall control of operations of communication device 1. The other components (i.e., memory 11, data communication controller 12, memory manager 13, and network controller 14) operate at appropriate timing as controlled by the CPU 10 to perform various processes.

A data communication function table 15 is stored in memory 11. The data communication function table 15 stores information defining data communication functions and information relating to communication procedures. The memory 11 also stores the software programs run on the communication device 1, that is, the application software 101 and service middleware 102. The memory 11 also stores middleware (not shown in the figure) for operating the communication middleware 105.

The data communication controller 12 has a table sharing controller 16 and controls the table sharing process described further below.

The memory manager 13 has a table reading unit 17, table writing unit 18, and table sharing processor 19, and based on the content of the data communication function table 15 runs a sharing process with another communication device 2.

The network controller 14 controls communications with other communication devices.

Communications device 2 could also be configured identically to communication device 1. In the embodiment shown in FIG. 1 the communication device 2 has a CPU 20, memory 21, data communication controller 22, memory manager 23, and network controller 24. Data communication function table 25, application program 111, and service middleware 112 are stored in memory 21. It should be noted that while the components of the communication device 2 are identified by different reference numerals, parts having the same name in communication device 1 and communication device 2 have the same configuration and function. Further description of the individual components of the communication device 2 is therefore omitted below.

Referring again to FIG. 50, the correlation between elements in the model communication device 1 shown in FIG. 50 and specific elements shown in FIG. 1 is described next.

The application software 101 and service middleware 102 are stored to memory 11 as shown in FIG. 1. The service middleware 102 is read from memory 11 (FIG. 1) and run by the CPU 10 (FIG. 1). Based on the instructions in service middleware 102, the CPU 10 accesses the device object 106 and service object 107 stored to memory 11 (FIG. 1) and runs the processes. The application software 101 is also read from memory 11 (FIG. 1) and run by the CPU 10 (FIG. 1). When processing the application software 101, the CPU 10 uses the process results from the service middleware 102 by way of the service API 103, or sends requests to the service middleware 102, based on the instructions of the application software 101.

The device object 106 and service object 107 correspond to the data communication function table 15 (FIG. 1), and are both stored in a table format.

The communication middleware 105 is stored to memory 11 (FIG. 1). Based on middleware (not shown in the figure) for managing communication by the communication device 1, CPU 10 controls operation of the data communication controller 12 (FIG. 1) and memory manager 13 (FIG. 1) while appropriately accessing the data communication function table 15 (FIG. 1) in memory 11.

The low-level communication software 108 and common low-level communication interface 109 correspond to the network controller 14 (FIG. 1). The network controller 14 (FIG. 1) is a communication module such as an interface card or board having an RS-232C or other serial interface. The low-level communication software 108 is stored in memory (such as EEPROM) in the communication module and is run by a separate CPU on the module to communicate according to a specific protocol.

The correlation between elements in FIG. 50 and FIG. 1 for communication device 2 is the same as for communication device 1. This means that the device objects and service objects of the communication device 2 correspond to the data communication function table 25 (FIG. 1). Note, however, that the data communication function table 15 in communication device 1 and the data communication function table 25 in communication device 2 store different device objects and service objects. If communication device 1 is a node on the data transmission side and communication device 2 is a node on the data receiving side, the service object 107 of the communication device 1 (FIG. 50) is a file transmission service object, and the service object 117 of communication device 2 is a file reception service object.

Data communication by the present embodiment is described next referring first to an autonomous data transfer from a terminal device to the controller. In this example the communication device 1 connected to the network is assumed to be an air conditioner with an autonomous transmission function, and the other communication device 2 is a controller with a function for receiving autonomous transmissions, i.e., an autonomous reception function, for centrally controlling equipment such as an air conditioner. Communication through such autonomous transmission and autonomous reception is referred to herein as "autonomous communication."

When a network connection is established or data communication is to start, the data communication controller 12 of the air conditioner 1 sends a command to confirm whether or not the other (destination) communication device is a device with a data communication function table. This confirmation is accomplished by sending a predefined communication message to the destination device and getting a response from the destination device.

When confirming whether the device has a data communication function table or not it is also possible to determine if the destination device has an autonomous reception function by querying specific information in the data communication function table.

This confirmation could be done between the controller 2 and each of the connected devices either before data communication or at some regular interval.

Furthermore, by querying specific information in the data communication function table of the destination communication device, the controller 2 can detect whether a particular device has an autonomous transmission function.

Figure 2:
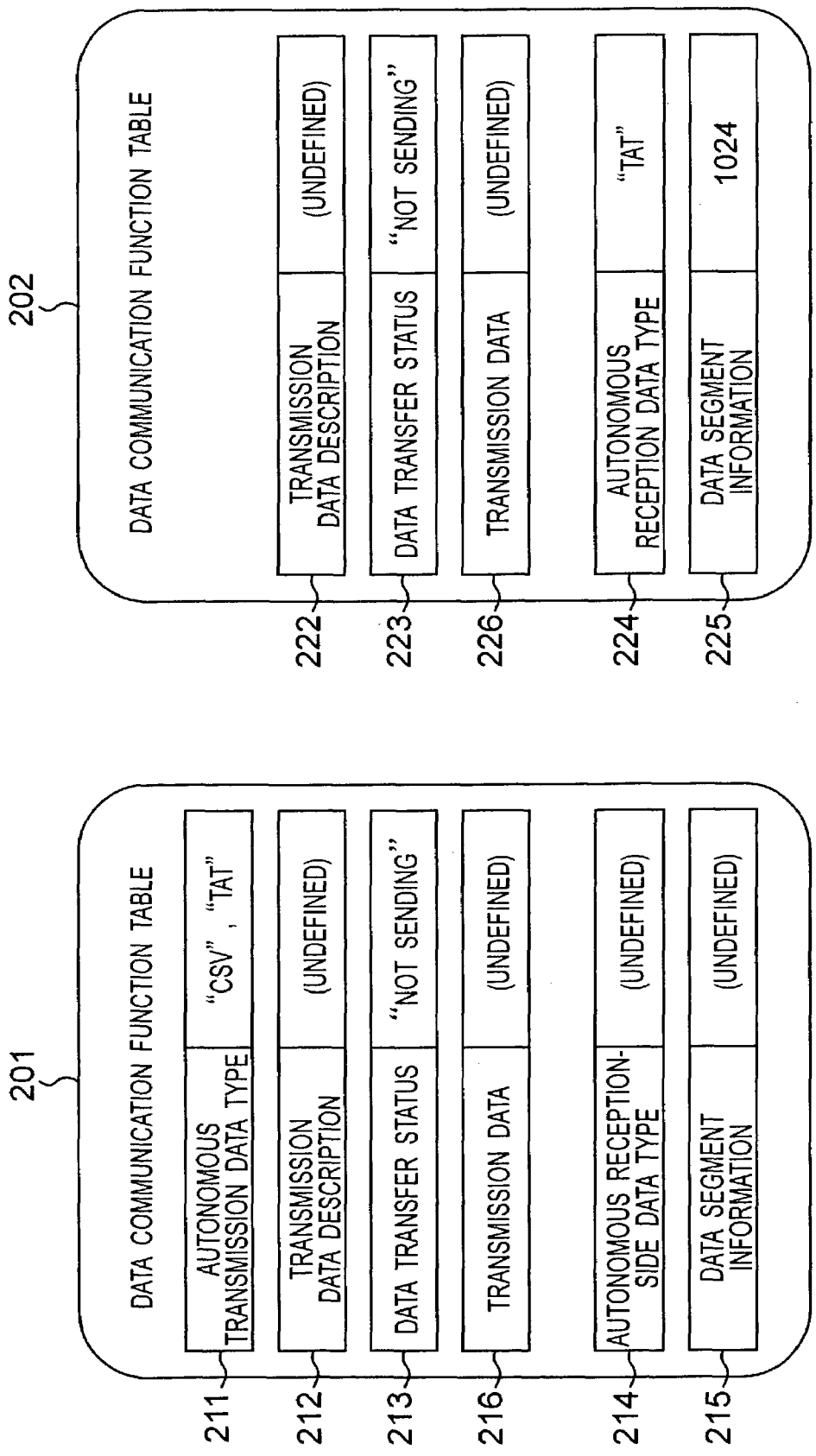
FIG. 2 shows the data communication function tables of the air conditioner controller before data communication.
Figure 3:
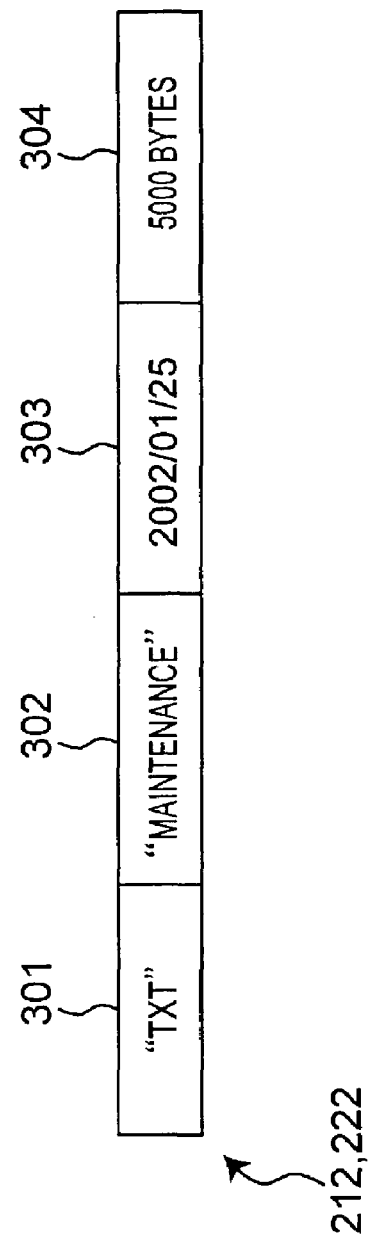
FIG. 3 shows an example of the transmitted data signal.
Figure 4:
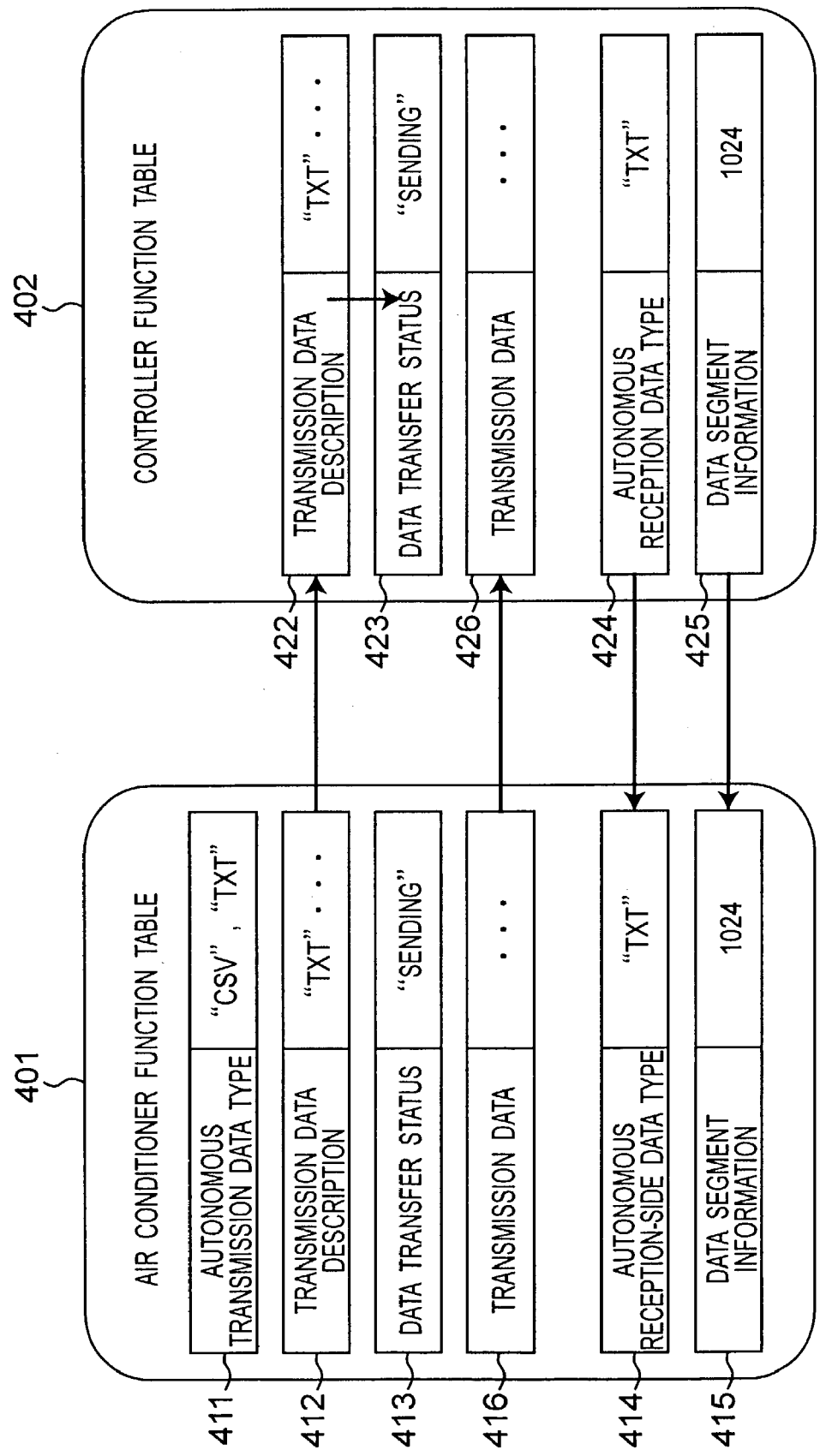
FIG. 4 shows the data communication function tables of the air conditioner and controller after data communication.

FIG. 2 shows the data communication function table 15 of the air conditioner 1 and the data communication function table 25 of the controller 2 before data communication. FIG. 3 shows an example of the transmitted data signal, and FIG. 4 shows the data communication function tables 15 and 25 of the air conditioner 1 and controller 2, respectively, after data communication ends.

The following information is stored in the data communication function table 201 of the air conditioner 1 before data communication, that is, before the fields are filled.

The autonomous transmission data type 211 is a value denoting the types of data that can be autonomously transmitted by the air conditioner 1. There are two types in this embodiment, CSV meaning table format data, and TXT meaning text data.

The autonomous reception-side data type 214 denotes the data types that can be handled by the destination device receiving the autonomous transmission. This field is initially blank because the capabilities of the destination device are unknown.

The transmission data description 212 is the data format as shown in FIG. 3 that is used when the air conditioner 1 autonomously transmits data. As shown in FIG. 3 this includes the data type, data title, date, and size. This field is also initially blank.

The data transfer status 213 indicates whether transmission is in progress, and is initially set to NOT-SENDING.

The data division information 215 denotes the size of divided data that can be handled by the autonomous reception side, and is initially unknown and therefore undeclared.

The transmission data 216 is the data that is actually sent. This field is also initially blank.

The following information is initially stored to the data communication function table 202 of the controller 2.

The autonomous reception data type 224 is a value denoting the type of data that can be handled by the controller 2 receiving an autonomous transmission, and is initially set to TXT.

The transmission data description 222 is the data format as shown in FIG. 3 that is used when the air conditioner 1 autonomously transmits data. As shown in FIG. 3 this includes the data type, data title, date, and size. This field is also initially blank because the message format that will be received is unknown.

The data transfer status 223 indicates whether transmission is in progress, and is initially set to NOT-SENDING.

The data division information 225 denotes the size of divided data that can be handled by the autonomous reception side, that is, by the controller 2, and is set to 1024.

The transmission data 226 stores the received data and is initially blank because no data has been transmitted (received).

The air conditioner 1 confirms whether the controller 2 is a communication device that could be a destination device for autonomous transmissions as follows.

The table sharing controller 16 of the air conditioner 1 sends a command to share the autonomous reception-side data type 214 data to the table sharing processor 19. The table sharing processor 19 receiving the command instructs the network controller 14 to send to a message for sharing the autonomous reception-side data type to a communication device, in this example the controller 2, that has already been confirmed to be configured with a data communication function table.

The controller 2 that received the message sends the received information from the network controller 24 to the table sharing processor 29. The table sharing processor 29 reads the data communication function table 25 by means of the table value reader 27, that is, reads the TXT value in the autonomous reception data type 224 field of the data communication function table 202 shown in FIG. 2, and returns it to the table sharing processor 29. The table sharing processor 29 then instructs the network controller 24 to send the read value (TXT) to the device from which the query message was received.

When the air conditioner 1 gets this response it sends the information from the network controller 14 to the table sharing processor 19. The table sharing processor 19 then instructs the table writing unit 18 to write the acquired value to the data communication function table 15. The value TXT is thus written to the autonomous reception-side data type 214 field of the data communication function table 15 in the air conditioner 1 as shown in field 414 in FIG. 4 so that the same value is recorded in the data communication function tables of the sending and receiving devices.

The table sharing processor 19 of the air conditioner 1 then notifies the data communication controller 12 that the autonomous reception-side data type 214 is set to the same value as the autonomous reception data type 224 of the autonomous reception-side device. The data communication controller 12 then compares the TXT value written to the autonomous reception-side data type 214 with the values (CSV and TXT) in the autonomous transmission data type 211 field, and thus knows that transmission is possible because there is a matching data type. If there is not a matching data type, the air conditioner 1 knows that an autonomous transmission cannot be addressed to the queried destination device. If a value denoting "all types" is written to the autonomous reception data type 224 in the data communication function table 25 of the controller 2, the air conditioner 1 knows that all data types recorded in its autonomous transmission data type 211 field can be transmitted.

In order to autonomously transmit data, the data communication controller 12 of the air conditioner 1 sets the value of the data transfer status 213 in the data communication function table 15 to SENDING as shown in field 413 in FIG. 4 by issuing a command to the table reading unit 17. It then issues another command to the table reading unit 17 to set the transmission data description 212 in the data communication function table 15 to the most recent values, that is, the data type 301, data title 302, date 303, and byte size 304, as shown in FIG. 3. This transmission data description 212 is for reporting the format of the data to be transmitted to the autonomous reception side. The transmission data 216, i.e., the data to be sent, is also updated to the most recent data. These settings are indicated in fields 412 and 416 in FIG. 4.

The data communication controller 12 then shares the transmission data description 212 using the table sharing controller 16. More specifically, the table sharing processor 19 tells the table reading unit 17 to read the set transmission data description 412, passes it to the network controller 14, and sends it to the controller 2. The table sharing processor 29 of the controller 2 that received the transmission data description 412 then writes the transmission data description 412 to the transmission data description 422 in the data communication function table 25 by way of the table writing unit 28.

The data communication controller 22 is then informed that the transmission data description has been shared. The data communication controller 22 then determines if data can be received from the data type and block size in the description in the transmission data format, and if it can set the data transfer status 423 of the data communication function table 25 to SENDING by means of the table writing unit 28. The table sharing controller 26 of the data communication controller 22 then instructs the table sharing processor 29 to read the data division information 425 from the data communication function table 25, and sends the retrieved divided size (1024 in this embodiment) from the network controller 24 to the air conditioner 1.

The air conditioner 1 then stores the received data division information 425 (1024) to the data division information 415 field of the data communication function table 15 and thus shares the same value with the controller 2.

This completes preparations for autonomous data transmission. The data communication controller 12 therefore instructs the table sharing controller 16 to share the transmission data 216 (416) in the data communication function table 15. More specifically, it divides the transmission data 216 (416) into 1024-byte blocks and autonomously sends the data from the air conditioner 1 to the controller 2. The controller 2 then writes the data received from the air conditioner 1 to the transmission data 226 (426) field in the data communication function table 25 on the controller 2 side.

Finally, when the data communication controllers 12, 22 of the air conditioner 1 and controller 2, respectively, determine that sharing the transmission data is completed, the data transfer status 413, 423 is rewritten to STANDBY, NOT-SENDING, or UNDECLARED to restore the state shown in fields 213, 223. The shared values set to fields other than the data transfer status field are kept. Further communication to share the same information is therefore unnecessary.

It should be noted that the data division information 225 could be sent simultaneously to or immediately after sending the autonomous reception data type 224.

Embodiment 2

Request/response communication in which the controller asks a terminal device to send data is described as a second embodiment of the present invention. This embodiment considers data communication between a lighting fixture and a controller for centrally controlling the lighting fixture and other devices. The configuration shown in FIG. 1 and described above can also be used in this embodiment. In this embodiment the communication device 1 shown in FIG. 1 is a lighting fixture 1, and communication device 2 is the controller 2. In this example the controller 2 requests a data transmission from the lighting fixture 1, the lighting fixture 1 responds, and the controller 2 receives the response. This data communication mode is referred to herein as "request/response communication."

Figure 5:
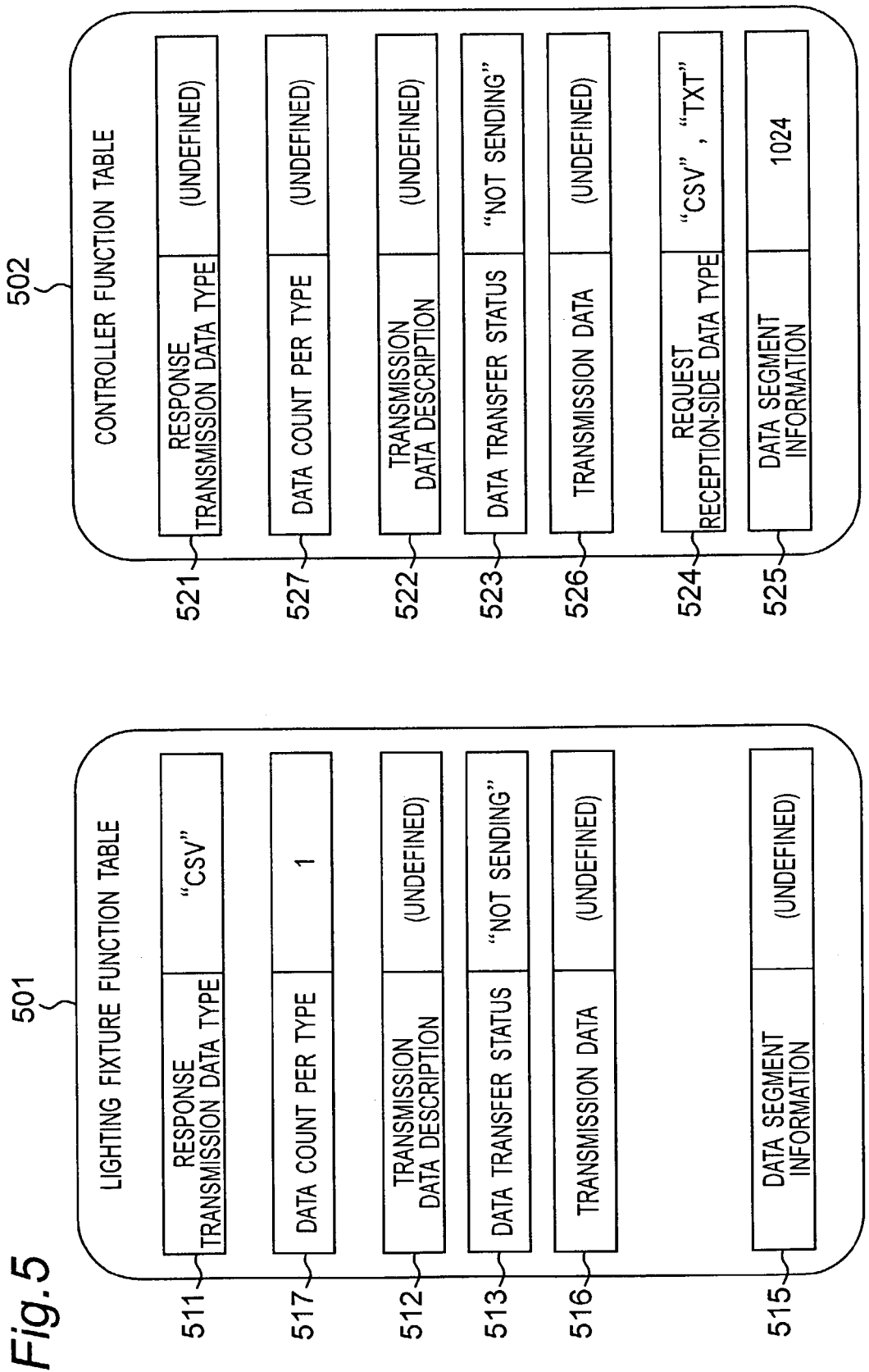
FIG. 5 shows the data communication function tables of the lighting fixture and controller before data communication.
Figure 6:
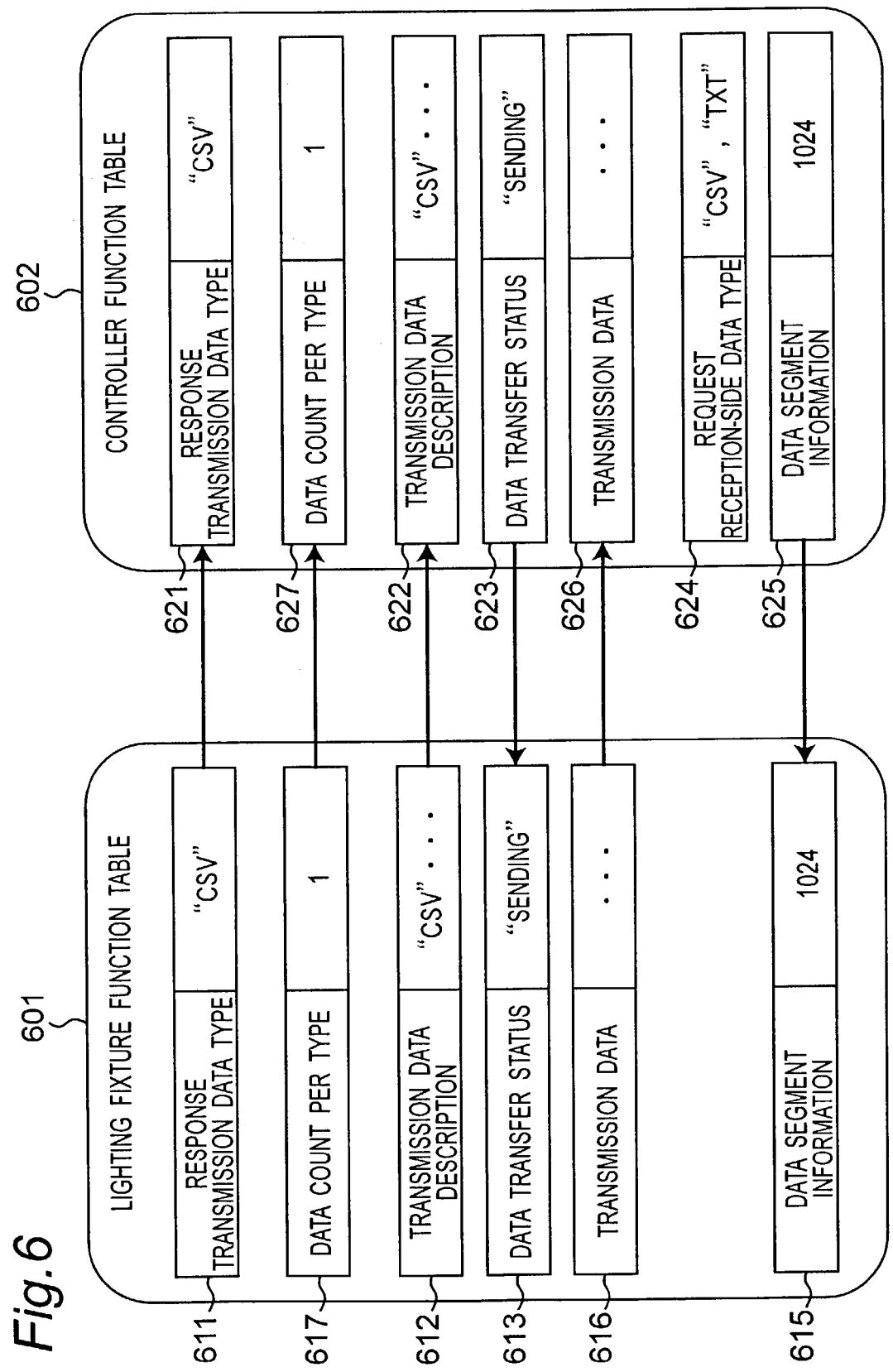
FIG. 6 shows the data communication function tables of the lighting fixture and controller after data communication.

FIG. 5 shows the data communication function tables 15 and 25 of the lighting fixture 1 and controller 2 before data communication, and FIG. 6 shows the tables 15 and 25 just before data communication is completed.

As shown in table 501 in FIG. 5, the data communication function table 15 of the lighting fixture 1 initially stores the following information.

The response transmission data type 511 stores a value indicating the type of data that the lighting fixture 1 can transmit. In this embodiment the lighting fixture 1 can transmit CSV data, meaning data in a table format.

The transmission data description 512 is the data format as shown in FIG. 3 that is used when the lighting fixture 1 sends a data response. As shown in FIG. 3 this includes the data type, data title, date, and size. This field is initially blank.

The data transfer status 513 indicates whether transmission is in progress, and is initially set to NOT-SENDING.

The data division information 515 denotes the size of divided data that can be handled by the request reception side (i.e., the side that requested the data), and is initially unknown and therefore undeclared.

The transmission data 516 is the data that is actually sent. This field is also initially blank.

The data count per type 517 field declares the number of units of each data type (CSV or TXT) that is transmitted. The unit could be a file or other unit of data. Note that in this embodiment the response transmission data type 511 is initially set to CSV and the data count per type 517 is set to 1 as shown in FIG. 5.

As shown in table 502 in FIG. 5, the data communication function table 25 of the controller 2 initially stores the following information.

The response transmission data type 521 stores a value indicating the type of data sent by the responding device (i.e., the device transmitting a response to a received request). This data type is initially unknown and the response transmission data type 521 is therefore undeclared.

The transmission data description 522 is the data format as shown in FIG. 3 that is used when the responding device, i.e., lighting fixture 1 in this embodiment, transmits data. As shown in FIG. 3 this includes the data type, data title, date, and size. This field is also initially blank because the message format that will be received is unknown.

The data transfer status 523 indicates whether transmission is in progress, and is initially set to NOT-SENDING.

The data division information 525 denotes the size of divided data that can be handled by the reception side, that is, by the device (controller) 2 that sent the request and receives the response, and is set to 1024 in this embodiment.

The transmission data 526 field is where the requested data is stored and is initially blank because no data has been transmitted by (received from) the responding terminal.

The data count per type 527 field declares the number of units of each data type (CSV or TXT) that is transmitted. This value is initially unknown and the field is therefore blank.

The request reception-side data type 524 is a value denoting the type of data that can be handled by the controller 2. As shown in the function table 502, the controller 2 can receive both CSV and TXT data types in this embodiment.

Data communication in this embodiment of the invention is described next.

When a network connection is established or data communication is to begin, the data communication controller 12 of the controller 2 first sends a command to confirm if the destination communication device is a device with a data communication function table as described above. This confirmation is accomplished by sending a predefined communication message to the destination device and getting a response from the destination device.

When confirming whether the device has a data communication function table or not it is also possible to determine if the destination device is a device with a response transmission function by querying specific information in the data communication function table.

This confirmation could be done between lighting fixture 1 and each of the connected devices either before data communication or at some regular interval.

The lighting fixture 1 can also confirm if the requesting device has a request reception function by querying specific information in the data communication function table of the destination communication device.

When a network connection is established or data communication is to begin, the controller 2 having a transmission request function determines whether transmission can be requested from the communication device by means of a command from the data communication controller 22 as follows.

Using the table sharing controller 26 of the data communication controller 22, the controller 2 copies the response transmission data type 511, which is set to CSV, from the function table 501 shown in FIG. 5 in the data communication function table 15 of the lighting fixture 1 to the response transmission data type 521 in the data communication function table 25 of the controller 2. To do this the table sharing processor 29 instructs the network controller 24 to create and send to the lighting fixture 1 a message requesting response transmission type data.

The network controller 14 of the lighting fixture 1 interprets the received message, and passes the requested content to the table sharing processor 19. The table sharing processor 19 gets the value of the response transmission data type 511, i.e., CSV, through the table reading unit 17, stores it to the response message and returns it to the controller 2 by means of the network controller 14, that is, responds to the request. The controller 2 gets the value of the response transmission data type 511 (CSV) from the received response message, and writes it to the data communication function table 25 as the response transmission data type 621 shown in FIG. 6. The table sharing controller 26 of the controller 2 then compares the written response transmission data type (CSV) with the request reception-side data type 524 values CSV and TXT. Because there is a matching data type, the table sharing controller 26 knows the response transmission can be received. If a matching data type is not detected, the request response cannot be received.

To get information about the requestable data types, the table sharing controller 26 of controller 2 requests sharing the data count per type 517 information, and sets the value (i.e., 1) of the data count per type 517 as the data count per type 527 value in the data count per type 527 field of the controller 2. This information can be shared using a message exchange similar to that for writing the response transmission data type 511, 521 to fields 611, 621. Because the data count is 1, the number of data units that can be requested is 1.

To request data, the table sharing controller 26 of the controller 2 sets the data transfer status 523 in the data communication function table 25 to SENDING as shown in field 623, FIG. 6, and then sets the data transfer status 613 of the lighting fixture 1 to SENDING. Sharing this value can also be accomplished with a message exchange as described above. This assembles the information needed to set the newest values 616, 612 to the transmission data 516 and transmission data description 512 fields in the data communication function table 15 of the lighting fixture 1.

The same procedure described in the first embodiment above can thereafter be used to send data from the lighting fixture 1 to the controller 2.

Once the data communication controllers 12, 22 of the lighting fixture 1 and controller 2 determine that sharing the transmission data 616, 626 has been completed, the data transfer status 613, 623 fields are set to COMPLETED. The shared values set to fields other than the data transfer status field are kept. Further communication to share the same information is therefore unnecessary.

Embodiment 3

Request/response communication in which a terminal device asks a controller to send data is described as a third embodiment of the present invention. In this embodiment communication device 1 shown in FIG. 1 is a controller 1 for centrally controlling a group of terminal devices, and communication device 2 is a microwave oven 2.

Figure 7:
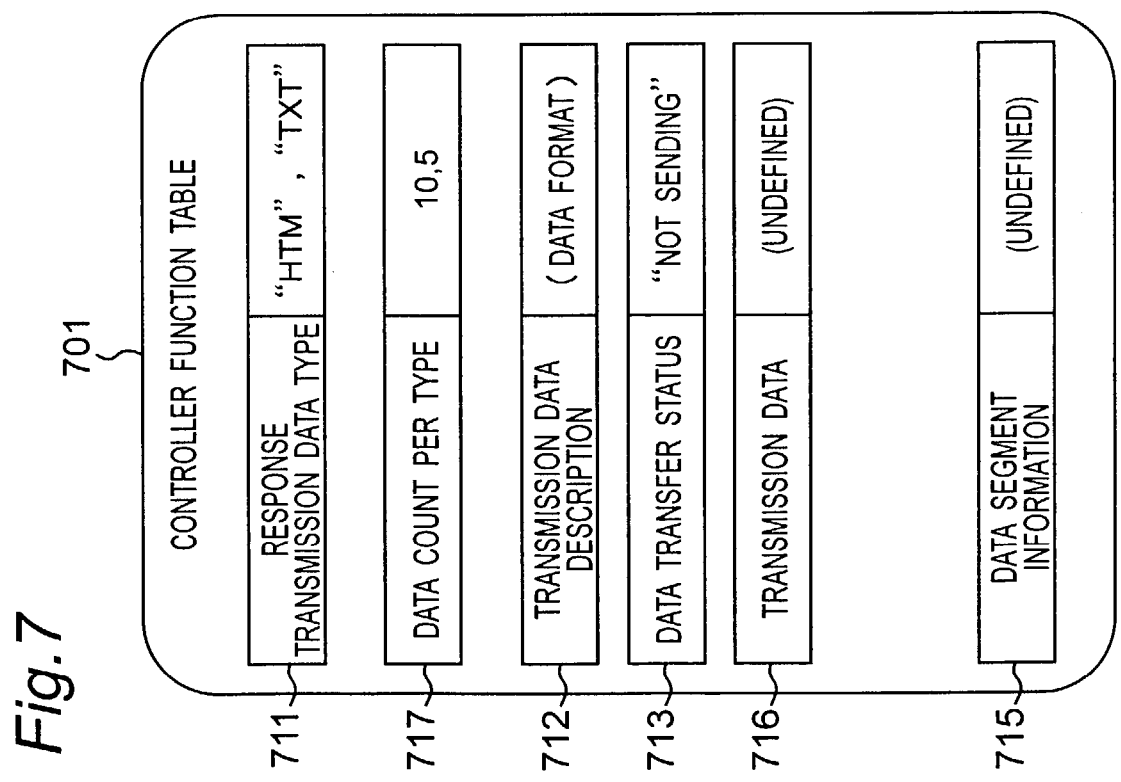
FIG. 7 shows the data communication function tables of the controller and microwave oven before data communication.
Figure 8:
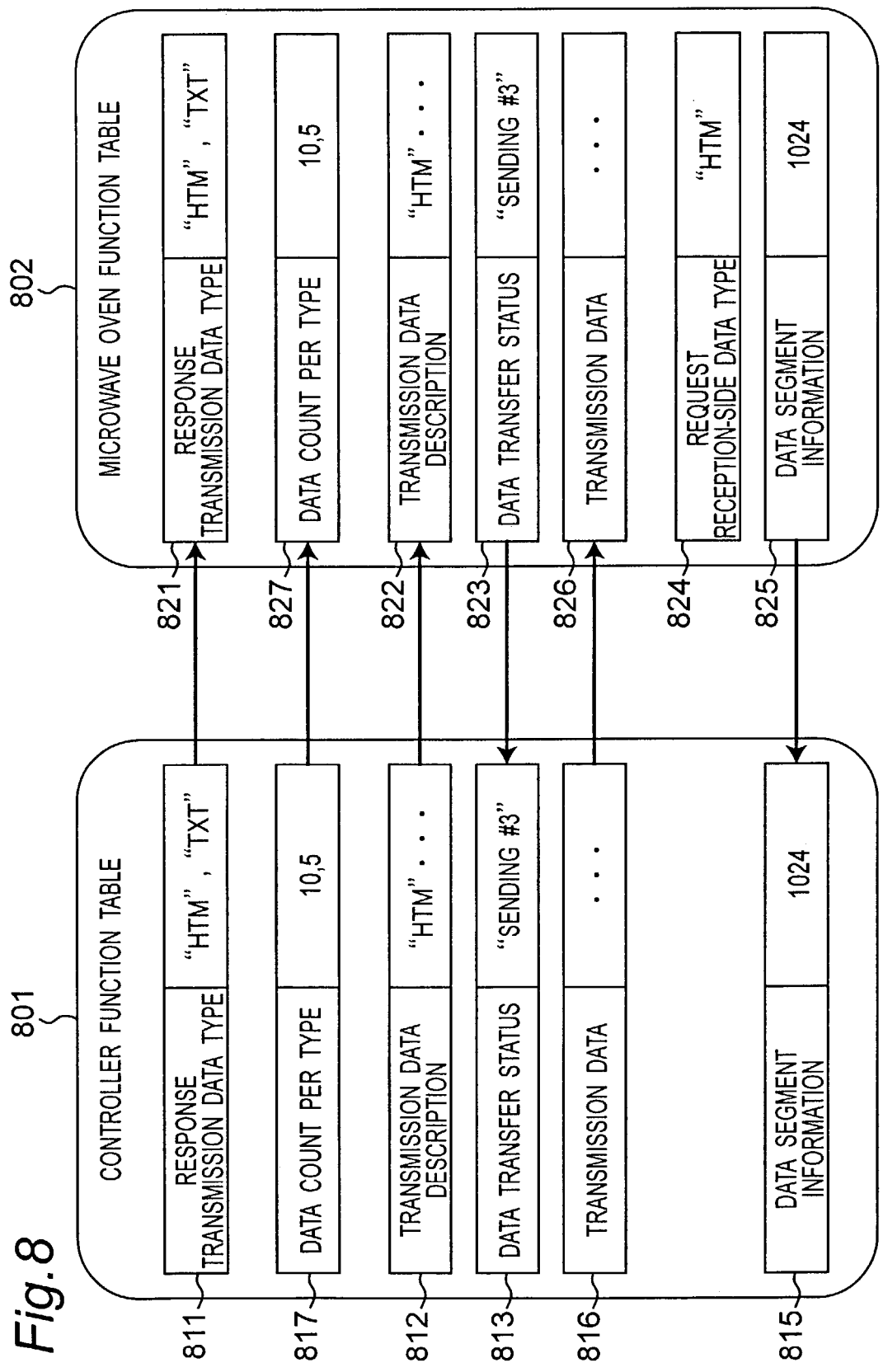
FIG. 8 shows the data communication function tables of the controller and microwave oven after data communication.

FIG. 7 shows the data communication function tables 15 and 25 of the controller 1 and microwave oven 2 before data communication, and FIG. 8 shows the tables 15 and 25 just before data communication is completed.

As shown in table 701 in FIG. 7, the data communication function table 15 of the controller 1 initially stores the following information.

The response transmission data type 711 stores a value indicating the type of data that the controller 1 can transmit. In this embodiment the controller 1 can transmit HTM and TXT data types, respectively denoting HTML data and text data.

The transmission data description 712 is the data format as shown in FIG. 3 that is used when the controller 1 sends a data response. As shown in FIG. 3 this includes the data type, data title, date, and size. The transmission data description shown in FIG. 3 is stored for each data type (HTM and TXT) that the controller 1 can return.

The data transfer status 713 indicates whether transmission is in progress, and is initially set to NOT-SENDING.

The data division information 715 denotes the size of divided data that can be handled by the request reception side (i.e., the side that requested the data), and is initially unknown and therefore undeclared.

The transmission data 716 is the data that is actually sent. This field is also initially blank.

The data count per type 717 field declares the number of units of each data type (HTM or TXT) that is transmitted. The unit could be a file or other unit of data. Note that in this embodiment the data count per type 717 is set to 10 for HTM data, and 5 for TXT data.

As shown in table 702 in FIG. 7, the data communication function table 25 of the microwave oven 2 initially stores the following information.

The response transmission data type 721 stores a value indicating the type of data sent by the responding device (i.e., the device transmitting a response to a received request). This data type is initially unknown and the response transmission data type 721 is therefore undeclared.

The transmission data description 722 is the data format as shown in FIG. 3 that is used when the responding device, i.e., controller 1 in this embodiment, transmits data. As shown in FIG. 3 this includes the data type, data title, date, and size. This field is also initially blank because the message format that will be received is unknown.

The data transfer status 723 indicates whether transmission is in progress, and is initially set to NOT-SENDING.

The data division information 725 denotes the size of divided data that can be handled by the reception side, that is, by the device (microwave oven) 2 that sent the request and receives the response, and is set to 1024 in this embodiment.

The transmission data 726 field is where the requested data is stored and is initially blank because no data has been transmitted by (received from) the responding terminal.

The data count per type 727 field declares the number of units of each data type (HTM or TXT) that is transmitted. This value is initially unknown and the field is therefore blank.

The reception-side data type 724 is a value denoting the type of data that can be handled by the microwave oven 2. As shown in the function table 702, the microwave oven 2 can receive only HTM data in this embodiment.

Data communication in this embodiment of the invention is described next.

When a network connection is established or data communication is to begin, the microwave oven 2 with a transmission request function first confirms if it can operate as a transmission request device as follows. Specifically, using the table sharing processor 29, the microwave oven 2 acquires the response transmission data type 711 from the data communication function table 15 of the 1 and stores the acquired HTM and TXT values as the response transmission data type in field 821. It them compares these values with the value (HTM) of the request reception-side data type 724, and thus knows that it can receive data when the controller 1 transmits HTM data.

Next, using the table sharing processor 29, the microwave oven 2 stores the data count per type 717 values (10 and 5) from the data communication function table 15 of the controller 1 to the corresponding field 827. To select the data to be acquired from the target data, the controller 2 shares the transmission data description 712 information from the data communication function table of the controller 1 using the table sharing processor 29. Because the controller 1 stores the transmission data description for all data that can be transmitted as shown in field 712, the microwave oven 2 can get the transmission data description 712 for all target data and store it to the data communication function table 25 as transmission data description 822. It is therefore possible to select the requested data from among plural available transmission data descriptions. However, because only HTM data can be received in this embodiment, it is only possible to select and request HTM data.

Next, if multiple subfiles or segments are being transmitted and the third file or segment is being sent, for example, the data communication controller 22 of the microwave oven 2 sets the data transfer status 723 in the data communication function table 25 to SENDING #3 as shown in field 823 in FIG. 8 to request the third HTM data file or segment from the data types acquired in the transmission data description 822. Then using the table sharing controller 26 it sets the data transfer status 713 of the controller 1 to SENDING #3 as shown in field 813 in FIG. 8. The data communication controller 12 of the controller 1 can thus update the transmission data 716 and transmission data description 712 to the most recent data.

The specified data can thereafter be sent from the controller to the microwave oven using the same control process described in the first embodiment.

Furthermore, if the data in the controller is variable, that is, if the data count per type, the transmission data format for each data type, and the transmission data values are variable, writing is disabled while the data transfer status is SENDING. Writing can also be disabled separately from when the data transfer status is SENDING so that the data count per type, the transmission data format for each data type, and the transmission data values cannot be changed.

Once the data communication controllers 12, 22 of the controller 1 and microwave oven 2 determine that sharing the transmission data has been completed, the data transfer status is set to COMPLETED. The shared values set to fields other than the data transfer status field are kept. Further communication to share the same information is therefore unnecessary.

The configuration, operation, and procedure of the present invention enabling a communication device on an initiation side requiring data transmission (the trigger side) and a destination device that the trigger-side communication device communicates with to share information in their respective data communication function tables have been described in the above three embodiments. In the first embodiment the autonomous transmission side of an autonomous communication matches the data type of the autonomous reception-side device. In the second and third embodiments the request-reception side of a request/response communication transaction matches the data type of the response-transmission side (i.e., the device responding to the request).

Because data transmission is not possible if both sides cannot handle the same data type, one or both of the communication devices could also report that data transmission is not possible.

Alternatively, a separate communication device with a function for converting data types could be connected to the network and data transmissions could be routed through this conversion device. If the data types of the communicating devices do not match but this conversion function is provided in one or both of the communication devices, data could be converted to an accessible data type for transmission and reception.

Furthermore, a separate communication device that can receive the desired data type could receive and then forward the transmission data.

Yet further, if the data types do not match, a separate communication device could be queried for a transmission sequence matching the desired data type or a program able to process transmission data of the desired data type, the queried transmission sequence or program could be downloaded from the separate communication device to the communication device 1 or communication device 2 that is incompatible with the data type so that the incompatible device can handle the desired data type according to the desired type data count and divided data.

On the other hand, if the two communication devices share multiple common data types, data can be communicated using any desirable data type. Because the transmission data types are normally predefined, such as TXT, CSV, and HTM, the data type must be set to a type matching the content of the desired data file. It is therefore also possible to determine the data type of the required file and then select and share the corresponding type from among the multiple available data types.

The data communication function table used in the present invention works to define a procedure, that is, an object, for data communication, and the table itself is handled as an object. Negotiations between both communication devices starting a data communication session are smoothed and unnecessary communication traffic can be reduced by sharing information relating to data communication as a transmission task object, that is, by sharing an object rather than sharing each data field.

The autonomous transmission data type, transmission data description, data transfer status, transmission data, autonomous reception-side data type, response transmission data type, request-reception data type, data divisional size, and data count per type information described above are parameters known as "properties" for determining the type of data communication service. Various methods can be used to determine these parameters, and one specific method is described below with reference to FIG. 9, FIG. 10, and FIG. 11. FIG. 9 and FIG. 10 show properties related to [A] Data transmission services.

(1) Data Types Handled for PUSH Type Transmissions (Autonomous Transmission Data Type)

<Parameter Description>

This property defines the maximum byte size, number of types, data types, and maximum data unit count for data handled in PUSH type data transmissions.

Maximum byte size: maximum number of bytes that can be transmitted in one data unit Number of types: number of data types that can be handled; if set to 0, all data types can be used.

Maximum data count: maximum number of data units of each data type.

<Read, Write, Notification Timing>

This value is normally readable regardless of the data transfer status.

Handled Type Information for PULL Type Transmissions (Response Transmission Data Type)

<Parameter Description>

This property defines the maximum byte size, number of types, data types, and maximum data unit count for data handled in PULL type data transmissions.

Maximum byte size: maximum number of bytes that can be transmitted in one data unit Number of types: number of data types that can be handled; if set to 0, all data types can be used.

Maximum data count: maximum number of data units of each data type.

<Read, Write, Notification Timing>

This value is normally readable regardless of the data transfer status.

(3) Number of Data Units Per Date Type for PULL Type Transmissions (Data Count Per Type)

<Parameter Description>

Current number of data units per data type

The type order is the same as the handled type information for PULL type transmissions, but data types with a data count of 0 can be omitted.

The data counts specified in the data transfer status are also arranged in this type order.

<Read, Write, Notification Timing>

The data count cannot be changed when the data transfer status is set to SENDING or when writing is blocked.

This value is normally readable regardless of the data transfer status.

(4) Transmission Data Description

<Parameter Description>

This property describes the type, title, date, and byte size of the transmission data.

The properties defined for one data transmission block are used to handle all data blocks in the transmission sequence, and the transmission sequence element number is the data number. The data number sequence is the same as the type sequence specified in the handled type information for PULL type transmissions.

Date information: The data date is written as XX:YY:DD:HH:MM:SS where the respective value ranges are (20-99):(0-99):(1-12):(1-31):(0-23):(0-59):(0-59). If an object does not have date info, each of these date value bytes is set to 0.

Data byte count: total number of bytes in the transmission data.

Check code: twos complement of the total of each byte in the transmission data.

<Read, Write, Notification Timing>

The data count cannot be changed when the data transfer status is set to SENDING or when writing is blocked.

The transmission data description can always be read by addressing a specific format field.

(5) Data Transfer Status

<Parameter Description>

Denotes the current data transfer status; if data is being transmitted, it denotes the number of data units.

Writing can be prohibited to prevent changing the transmission type information, the specified data type count, and each data value.

<Read, Write, Notification Timing>

If the data transfer status is set to write-prohibited or sending, it is necessary to write the data count again and start data transfers, or reset a NORMAL TERMINATION or TERMINATED DUE TO ERROR status.

If a request for dropped data or a data transfer status setting is not received within a specified time after data transmission, the terminal sets its data transfer status to TERMINATED DUE TO ERROR.

If the data transfer status is set to write-prohibited or sending, this value cannot be written from any terminal other than the terminal running the data transfer process.

This value can be read at any time.

(6) Data Transfers

<Parameter Description>

If the data count is specified in the data transfer status, the data is divided to the size obtained from the data division information, and transmitted as a continuous sequence.

Total sequence count: denotes the number of divided data in the data sequence

Divisional size: the number of bytes in one data frame.

<Read, Write, Notification Timing>

After the data division information is received, the main data is transferred from the transmission side.

FIG. 11 shows the properties relating to the [B] data types handled for receiving PUSH type transmissions.

(1) Data Types Handled for Receiving PUSH Type Transmissions (Data Types on the Autonomous Reception Side)

<Parameter Description>

This property defines the maximum byte size, number of types, and data types for data handled when receiving PUSH type transmissions.

Maximum byte size: maximum number of bytes that can be received in one data unit Number of types: number of data types that can be handled; if set to 0, all data types can be received.

<Read, Write, Notification Timing>

This value is normally readable regardless of the data transfer status.

(2) Data Types Handled for PULL Type Reception (Data Types on the Request-Receiving Side)

<Parameter Description>

This property defines the maximum byte size, number of types, and data types of data handled for PULL type reception.

Maximum byte size: maximum number of bytes that can be received in one data unit Number of types: number of data types that can be handled; if set to 0, all data types can be received.

<Read, Write, Notification Timing>

This value is normally readable regardless of the data transfer status.

(3) Data Division Information

<Parameter Description>

Maximum number of bytes in data packets optimal for reception by receiving side

Maximum byte count of data packets set; maximum byte count of data packets that can be transmitted at one time by the terminal The transmission data is divided and the data transfer process run so that the data packets for transmission can be generated using the lowest byte count possible within the maximum data packet byte count.

<Read, Write, Notification Timing>

This value cannot be written when the data transfer status is set to SENDING.

Exemplary messages using the properties shown in FIG. 9, FIG. 10, and FIG. 11 for executing the data communication methods and procedures of the three embodiments described above are described next below.

Figure 12:
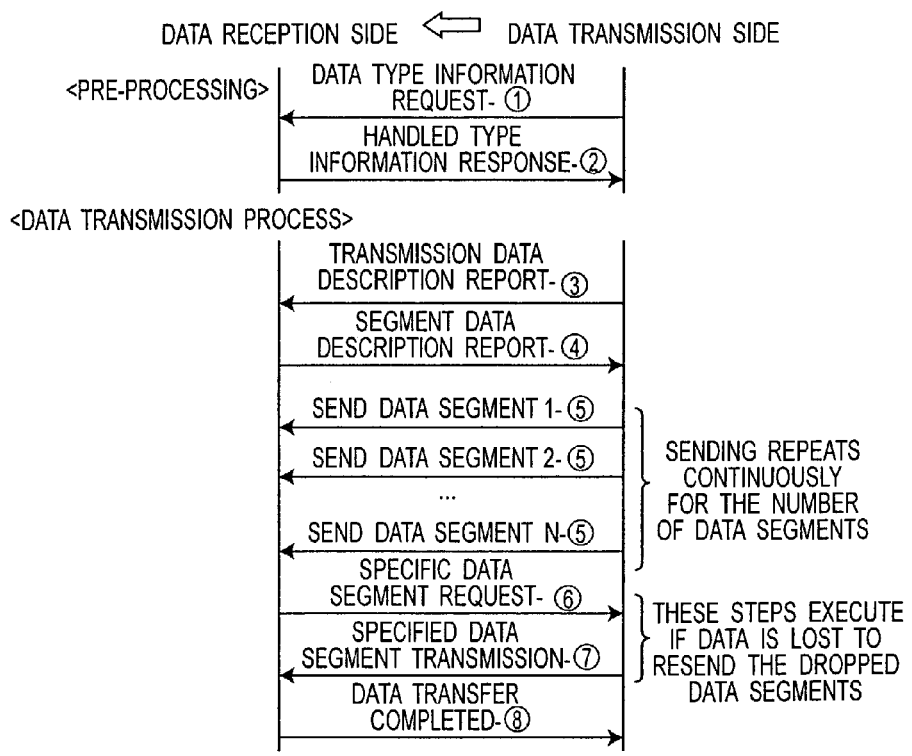
FIG. 12 shows a typical autonomous communication sequence.

When data is transferred by autonomous transmission from the transmission-side in an autonomous communication process for PUSH type data communication, the data types for PUSH type reception handled on the reception-side are requested and the transmission data type is confirmed. The transmission data description is then reported, the data transfer, i.e., response, from the reception-side is confirmed, and the data is then transferred from the transmission-side by means of a divided data transmission. A typical communication sequence for autonomous communication (PUSH type data communication) is shown in FIG. 12. In this process data is transmitted automatically by means of an internal trigger on the transmission-side. Summary of processing of autonomous communication (PUSH type data communication) is now described.

<Pre-processing>

(1) Data Type Information Requested (Transmission-side→Reception-side)

The transmission-side sends a read request to the reception-side for the data types handled for PUSH type reception.

(2) Handled Type Information Response (Reception-side→Transmission-side)

The reception-side sends the requested data types handled for PUSH type reception to the transmission-side.

<Data Transmission Process>

(3) Transmission data Description Report (Transmission-side→Reception-side)

The transmission-side writes the transmission data count and sets the data transfer status field to SENDING, and then reports the transmission data size, checksum, and other transmission data to the reception-side. The reception-side determines if data reception is possible from the transmission data description; if it is not, the reception-side sets the data transfer status to TERMINATED DUE TO ERROR.

(4) Divided Data Information Report (Reception-side→Transmission-side)

If the reception-side decides that reception is possible, it sends the maximum byte count per data packet that it can receive.

(5) Divided Data Transfer (Transmission-side→Reception-side)

The transmission-side divides and continuously transmits the data to the reception-side.

(6) Specified Data Divisional Request (Reception-side→Transmission-side)

After the reception-side receives the last divided data, or if there is a divided data that could not be normally received when a time-out occurs while waiting for a divided data, a transmission request specifying a particular divisional data number is sent from the reception-side to the transmission-side.

(7) Specified Divided Data Transmission (Transmission-side→Reception-side)

If a request for a particular divided data is received from the reception-side, the transmission-side sends the requested divided data.

(8) Data Transfer Completed (Reception-side→Transmission-side)

If the data is correctly received, or if the data transfer process is terminated for some reason, the reception-side sends data setting the data transfer status to COMPLETED to the transmission-side.

There are also cases in which this frame is not sent. Therefore, the data transmission side runs a process for inserting a timeout in the process waiting for a specific divided data request and data transfer completion setting frame, and changing the data transfer status from SENDING to COMPLETED.

FIG. 13 (1) to (8) are examples of the messages used in the above sequence. In FIG. 13 OHD is the object header, SEOJ is the sender object, DEOJ is the destination object, EPC is the property name code, and ESV is the property service content. The ESV packet is followed by additional data packets as needed. These messages can be sent and received between network controller 14 and 15 by adding the address of communication devices 1 and 2 as either the sender address or destination address.

When there is a data communication request from the reception-side In a request/response communication process (PULL type data communication), after the PUSH type transmission data type is requested from the transmission-side and the transmission data is confirmed, a data collection process is run as needed and the reception-side then sends a start data transfer trigger. When the data transmission side receives this trigger, it reports the transmission data description for the specified data and then runs the same data transfer process used with PUSH type transmissions.

Figure 14:
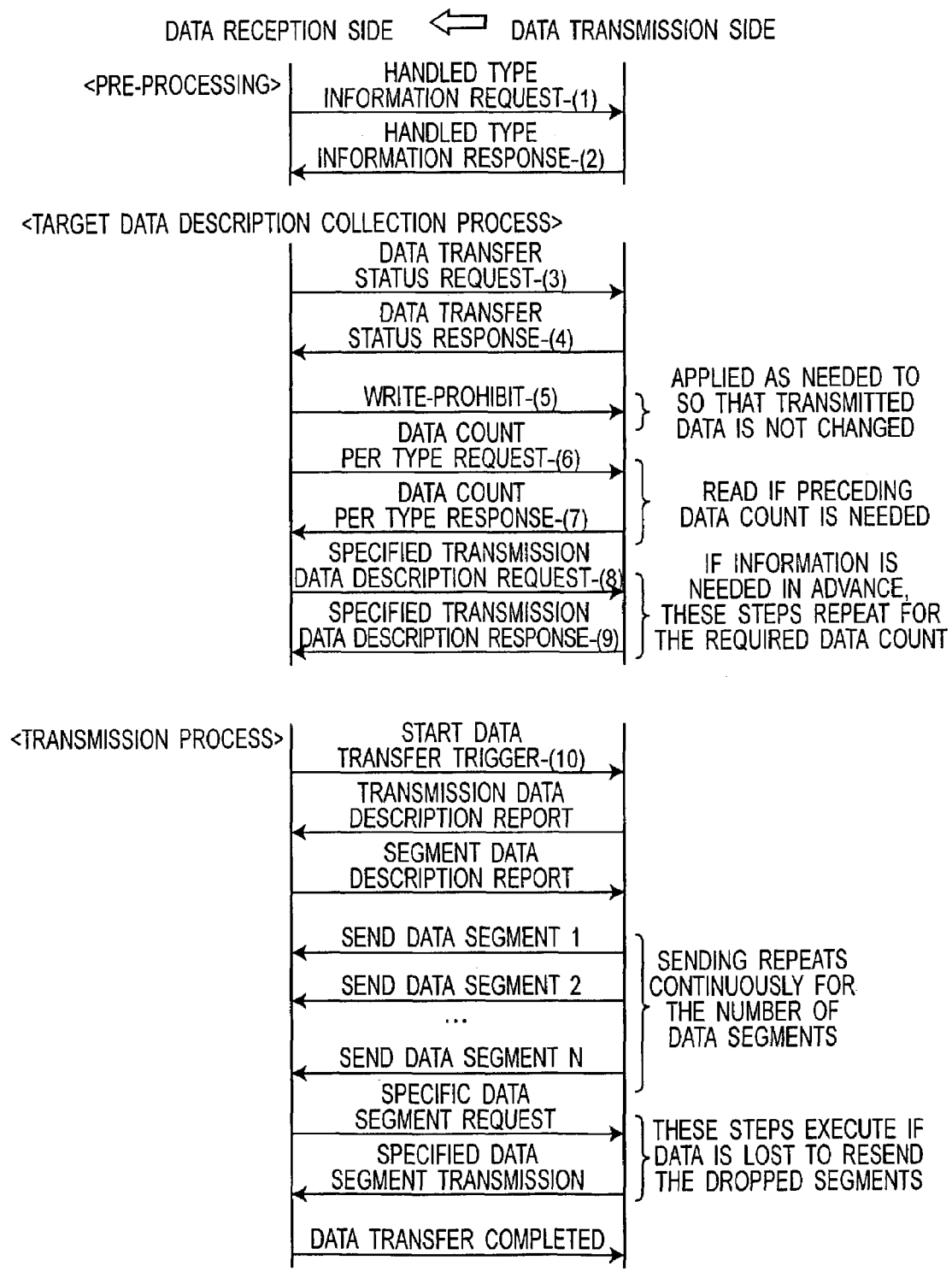
FIG. 14 shows a typical request/response communication sequence.

A typical communication sequence for request/response communication (PULL type data communication) is shown in FIG. 14, and the messages used therein are described below.

<Pre-processing>

(1) Handled Type Information Request (Reception-side→Transmission-side)

The transmission-side sends a read request to the reception-side for the data types handled for PULL type transmission.

(2) Handled Type Information Response (Transmission-side→reception-side)

The reception-side sends the requested data types handled for PULL type transmission to the transmission-side.

<Target Data Description Collection Process>

The data selection process is described below. Each of the following processes are run as needed. The processes can also be run independently of data transfers.

(3) Data Transfer Status Request (Reception-side→Transmission-side)

The reception-side requests the data transfer status from the transmission-side. The transmission-side responds to the request by sending the data transfer status.

(4) Data Transfer Status Response (Transmission-side→Reception-side)

The transmission-side sends a data transfer status response to the reception-side. If the data transfer status is unprocessed or data transfer is completed, the reception-side sends a write-prohibit or start data transfer trigger.

(5) Write-Prohibit (Reception-side→Transmission-side)

The data transfer status is set to a write-prohibit state so that the transmission-side cannot rewrite the current data type or data. A write-prohibit is applied as needed. After a write-prohibit state is set it is necessary to either set the data count to the data transfer status and start data transfer, or set the data transfer status to COMPLETED.

(6) Data Count Per Type Request (Reception-side→Transmission-side)

The data count for each transmitted data type is requested as needed to collect information immediately before data transfer starts.

(7) Data Count Per Type Response (Transmission-side→Reception-side)

The data count per data type is returned per the request.

(8) Specified Transmission Data Description Request (Reception-side→Transmission-side)

To get the data that will be sent before the data transfer process, a data number is specified and sent to request the transmission data description.

(9) Specified Transmission Data Description Response (Transmission-side→Reception-side)

The transmission-side returns the specified transmission data description as requested.

<Transmission Process>

(10) Start Data Transfer Trigger (Reception-side→Transmission-side)

The reception-side sends a start data transfer trigger to the transmission-side by sending a frame setting the data transfer status to PROCESSING. The transmission-side runs the following process after receiving this trigger (frame).

The subsequent process is the same as described in the PUSH type data transfer process.

FIG. 15 and FIG. 16 show examples of the communication messages in the above PULL type sequence.

Another embodiment of the data communication function table according to the present invention is described next with reference to FIG. 17 and FIG. 18. In FIG. 17 and FIG. 18 the data communication function table 901 of communication device 1 has the following fields: autonomous transmission data type 911, autonomous reception data type 912, response transmission data type 913, request reception data type 914, transmission data description 915, data transfer status 916, data count per type 917, divisional data count 918, and transfer data 919.

The data communication function table 902 of communication device 2 likewise has the following fields: autonomous transmission data type 921, autonomous reception data type 922, response transmission data type 923, request reception data type 924, transmission data description 925, data transfer status 926, data count per type 927, divisional data count 928, and transfer data 929.

Each data area is divided into (a) and (b) where each communication device stores its own information in (a) and data for the other communication device in (b). Of the data stored in (a), the data types, data unit count per data type, and divisional data number that the communication device can handle is stored to autonomous transmission data type 911, 921; autonomous reception data type 912, 922; response transmission data type 913, 923; request reception data type 914, 924; data count per type 917, 927; and divisional data count 918, 928, respectively. Furthermore, the values stored for the following fields are determined during the data communication process and are therefore initially blank: transmission data description 915, 925, and data transfer status 916, 926, respectively. "Undeclared" with reference to the data transfer status 916, 926 means "not transmitted." Because the values of the destination device are initially unknown, each of the values in data area (b) is initially null.

Autonomous communication initiated by communication device 1 is described first. First, communication device 1 sends a message to send the autonomous reception data type 922(a) and divisional data count 928(a) information to communication device 2, and communication device 2 then sends data in response. Communication device 1 stores the received autonomous reception data type 922(a) and divisional data count 928(a) to 912(b) and 918(b), respectively, and compares the values with autonomous transmission data type 911(a) and divisional data count 918(a) to detect common values. It then selects the desired data type from among the common types and writes to transmission data description 915(a). In the example shown in FIG. 18 the HTM type is common to both fields 911(a) and 912(b), and 1024 is common to both fields 918(a) and 918(b).

Communication device 1 thus knows to autonomously transmit an HTM format file A, sets data type HTM, filename A, date 2002/3/10, and byte count 5500 to the transmission data description 915(*a*) according to the format shown in FIG. 3, and sends this information to the communication device 2. Communication device 2 then stores the received data to transmission data description 925(b). Communication device 1 also prepares file A in the transfer data 919(*a*) field, sets the data transfer status 916(*a*) to SENDING and sends the data transfer status 916 to communication device 2 to notify communication device 2 of the start of transmission. Communication device 2 then stores the received data transfer status 916(*a*) to 926(*b*), and prepares to receive a file.

Next, communication device 1 divides file A in transfer data 919(*a*) into 1024 byte segments and transmits the divided data. Communication device 2 stores the file A received in segments in the order received to transfer data 929(*b*). If file A consists of plural subfiles, the transfer status and subfile numbers can be managed by changing the data transfer status 916(*a*) according to the subfile number. For example, when sending subfile number 3, the data transfer status could be set to SENDING #3. Communication device 2 could also manage the data transfer status and subfile numbers using field 926(*b*). If when sending the transmission data description 915(*a*) the data count per type 917(*a*) is also sent either simultaneously or separately, the communication device 2 will know in advance the number of files to be sent and can therefore determine when transmission is completed.

As thus described communication device 1 or 2 obtains the data types, divisional data count, data unit count per data type, and other information from the other device and compares this information with its own processing capabilities so that both communication devices share the same processing capabilities. Furthermore, when a file or other transmission data is selected and sent, the data type, filename; and other information related to the transmission data is also shared between the terminals. The transmission data is then shared between the devices by sending the data.

By thus using a data communication function table and sharing information about each communication device with the other communication device, negotiations between the communication devices 1, 2 can be completed with less network traffic.

The data communication function tables shown in FIG. 17 and FIG. 18 assume that both communication devices 1 and 2 can operate in autonomous transmission, autonomous reception, response transmission, and request reception modes, but if a communication device can only operate in some subset of these operating modes unnecessary data areas, that is, (a) or (b) or both (a) and (b), can be omitted. Embodiments 1, 2, and 3 above are equivalent to such cases.

It is preferable for the transmission-side device to match its communication capabilities, that is, the data types handled, data divisional information, and data unit count per type, for example, to the specifications of the other device, but the reception could also prepare to receive data by adjusting its operation to the capabilities of the transmission side. This is particularly applicable when the reception-side adapts to the attributes and status of the transmission data received.

In the data communication function tables shown in FIG. 17 and FIG. 18 the autonomous transmission data type 911 and response transmission data type 913 could be combined as a single transmission data type 911, the autonomous reception data type 912 and request reception data type 914 could be combined as a single reception data type 912, and fields 913 and 914 could be omitted. In autonomous communication in this case the reception data type of the destination is acquired, and the transmission-side device compares the transmission data type with the reception data type. Furthermore, in request/response communication the transmission data type of the destination is acquired, and the initiating device compares its reception data type with the transmission data type of the destination device.

As also described above the data communication function table could be sent as a single object to share the data therein instead of sending and sharing the individual properties according to a defined procedure. In this case the values in the data communication function table that the communication device needs to acquire are left blank (undeclared) in the table object sent to the other device. While a single transmission may be sufficient in some cases, it generally necessary to send the tables back and forth plural times between communication devices 1 and 2.

Embodiment 4

An autonomous data transmission from a terminal device to the controller is described in this embodiment with reference to a terminal device and controller configured as shown in FIG. 1. In this example an air conditioner 1 is the terminal device autonomously transmitting data, the controller 2 is on the reception-side. The air conditioner 1 accumulates maintenance data for a specified period of time and then autonomously sends the accumulated data to the controller 2.

Figure 19:
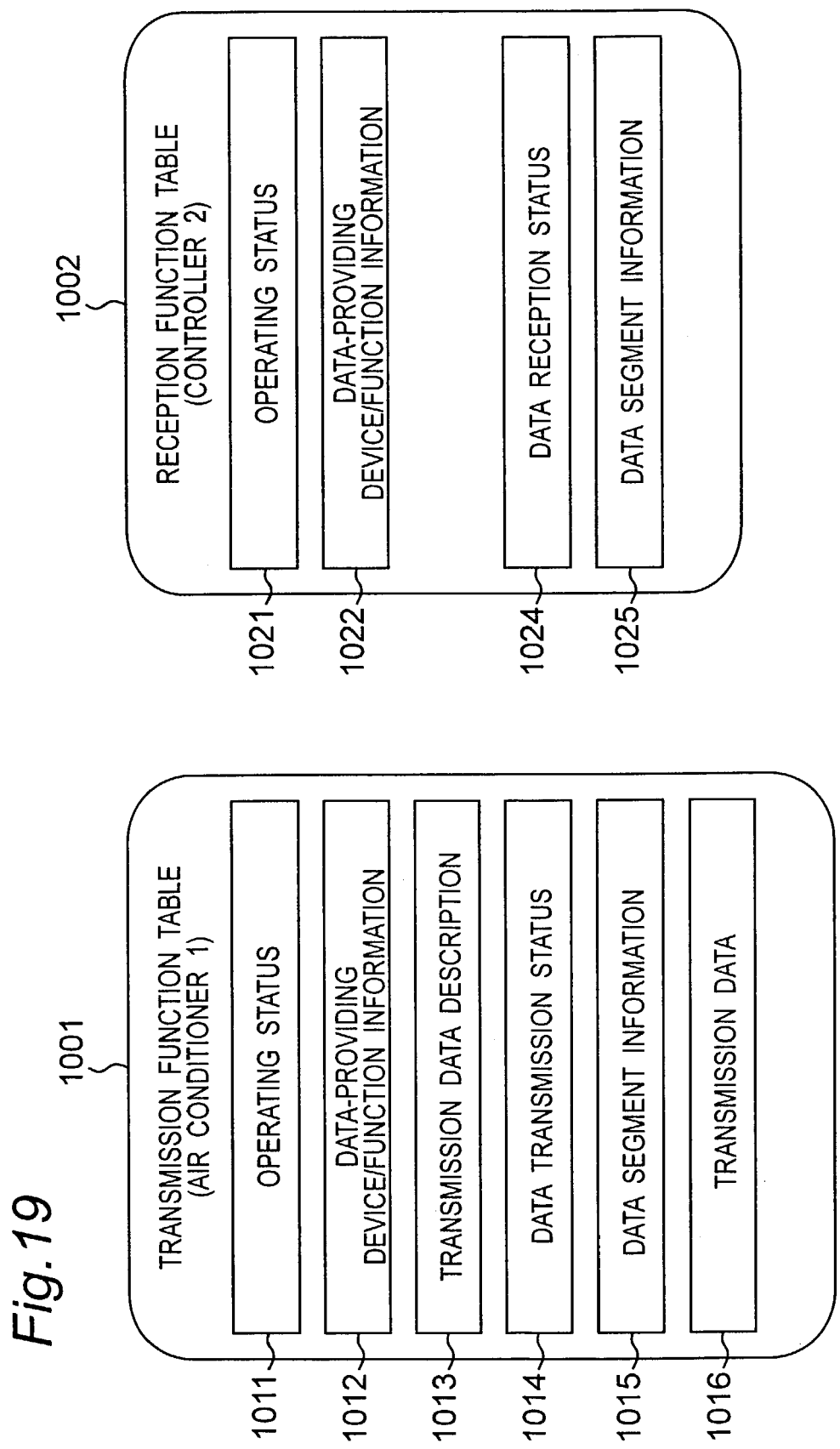
FIG. 19 shows a communication device transmission function table and a controller reception function table.

As shown in FIG. 19 the air conditioner 1 stores transmission function table 1001 and the controller 2 stores a reception function table 1002. Both terminal devices send and receive data by reading and writing the tables of the other device over a communication network. This transmission function table and reception function table are collectively referred to below as communication function tables.

The transmission function table 1001 stores the following information.

The operation status 1011 is a binary value indicating whether the transmission function table 1001 is valid or not; 0x30 denotes the table is valid (ON) and 0x31 denotes the table is not valid (OFF).

The data-providing device/function information 1012 is a code denoting the type and functions of the device providing the transmission data. If the device is an air conditioner that sends maintenance data at a regular interval, the value 0x013001F0 combining the air conditioner code 0x013001 and maintenance data code 0xF0 is stored to field 1012 in this example. It should be noted that all codes shown herein are by way of example only. The combination of device and function codes generates a unique code.

The transmission data description 1013 describes the data format as shown in FIG. 3, including a data type (bitmap or text, for example), data title (filename), data date, and data size.

The data transmission status 1014 indicates whether transmission is in progress.

The data division information 1015 denotes the size of data that can be handled by the reception side controller 2.

The transmission data 1016 is the data that is actually sent.

The following information is stored to the reception function table 1002.

The operation status 1021 is a binary value indicating whether the reception function table 1002 is valid or not; 0x30 denotes the table is valid (ON) and 0x31 denotes the table is not valid (OFF).

The data-providing device/function information 1022 is the same as the data-providing device/function information 1012, i.e., a code denoting the type and functions of the device providing the transmission data.

The data reception status 1024 indicates whether reception is in progress.

The data division information 1025 denotes the size of divided data that can be handled by the reception side device.

The operation of this embodiment is described next.

First, the air conditioner 1 and controller 2 must recognize each other. More particularly, the transmission-side device, i.e., air conditioner 1, must first recognize the presence of the transmission destination, i.e., controller 2, before it can send data to the controller 2. This confirmation sequence must therefore be run by the air conditioner 1 as described below.

The air conditioner 1 and controller 2 are designed so that they automatically broadcast information from their own communication function tables as soon as the power turns on. If the air conditioner 1 turns on after the controller 2 and the controller 2 thus receives the transmission function table 1001 report from the air conditioner 1, the controller 2 sends a message to write ON to the operation status 1011 field of the transmission function table 1001 in the air conditioner 1. This write message to the air conditioner 1 contains the address of the 2 and information indicating that the reception function table 1002 is available. The air conditioner 1 recognizes the presence of a device with a reception function table when it receives this message.

If the controller 2 turns on after the air conditioner 1, the air conditioner 1 can recognize a transmission destination device because it can receive the reception function table 1002 availability report from the controller 2. Furthermore, after the air conditioner 1 receives the reception function table 1002 report from the controller 2, it sends a write ON message to the operation status 1021 field of the reception function table 1002 in the controller 2, and thus causes the controller 2 to recognize the air conditioner 1.

Alternatively, after the power turns on the air conditioner 1 and controller 2 could broadcast their own communication function table data to the network, send a message to read and report the operation status of the other device's communication function table, and thus recognize the other device by means of the received response to this message.

For example, when an air conditioner 1 with a transmission function table turns on, it sends an operation status read/report request message to all devices that have a reception function table on the network. A controller 2 receiving this message reads the operation status 1021 from the reception function table 1002 of the controller 2, and creates and sends a response message to the air conditioner 1. The air conditioner 1 can thus confirm the presence of the reception function table 1002 in the controller 2.

It is therefore possible for the air conditioner 1 to recognize the controller 2 as a destination for autonomous transmissions in a process preceding actual data transmission.

Sending and receiving data between the air conditioner 1 and controller 2 is described next. When maintenance data for a specified period of time is accumulated, for example, the air conditioner 1 generates and sends the data-providing device/function information 1012 to the controller 2. The controller 2 then interprets this information received from the air conditioner 1, and to get the maintenance data sends to the air conditioner 1 a message to write SENDING to the data transmission status 1014 field of the transmission function table 1001 in the air conditioner 1.

If the controller 2 decides not to get the maintenance data, it sends to the air conditioner 1 a message to write a code denoting TERMINATED DUE TO ERROR to the data transmission status 1014 field in the transmission function table 1001 of the air conditioner 1. In this case the controller 2 writes nothing to the data reception status 1024 field of its own reception function table 1002.

The write SENDING message received from the controller 2 acts as a trigger causing the air conditioner 1 to read the transmission data description 1013 from the transmission function table 1001 and send it to the controller 2. It then reads and divides the transmission data 1016 to the divisional size defined in the data divisional information 1015 field, and autonomously transmits the data to the controller 2. When the controller 2 receives all of the transmitted divided data, it reassembles the data, links it to the previously received transmission data, and stores the received data.

When the air conditioner 1 sends the data-providing device/function information 1012 to the controller 2, it could also append the transmission data description 1013. In this case the air conditioner 1 could immediately begin sending the divided transmission data after it receives the write SENDING message from the controller 2.

Because a terminal device having a function for autonomously transmitting data sends information describing the terminal device and terminal device functions to the controller before the terminal device transmits data to the controller in this fourth embodiment of the invention, the controller receiving autonomous transmissions can get data from the terminal device after first recognizing the device providing the information and the functions of that device.

Embodiment 5

This embodiment of the invention describes a controller requesting data from a terminal device using a controller and terminal device configured as shown in FIG. 1. This embodiment describes a method for sending and receiving data between a camera 1 used as the terminal device for capturing still images, and a controller 2 on the reception-side. The controller 2 requests still image data from the camera 1.

The camera 1 and controller 2 respectively store the transmission function table 1001 and reception function table 1002 shown in FIG. 19. These tables are as described above in the fourth embodiment and further description thereof is therefore omitted. It should be noted that the code stored to the data-providing device/function information 1012 in the transmission function table 1001 in this example is 0x06C001F1 combining the code 0x06C001 denoting a camera 1 and the code 0xF1 denoting still image data. As above, these codes are used by way of example only.

The operation of this embodiment is described next.

First, the controller 2 must recognize the camera 1. This is accomplished as follows.

As in the fourth embodiment, the camera 1 and controller 2 are designed so that they automatically broadcast information from their own communication function tables as soon as the power turns on. If the controller 2 turns on after the camera 1 and the camera 1 thus receives the reception function table 1002 report from the controller 2, it writes ON to the operation status 1021 of the reception function table 1002 in the controller 2. This write message sent to the controller 2 contains the camera 1 address and information indicating that the transmission function table 1001 is available. The controller 2 thus knows when it receives this message that there is a device with a transmission function table on the network.

Conversely, if the camera 1 power turns on after the controller 2, the controller 2 can receive the transmission function table 1001 availability report from the camera 1 and thereby recognize the data request destination. After the controller 2 gets the transmission function table 1001 availability report from the camera 1, the controller 2 could also send a write ON message to the operation status 1011 in the transmission function table 1001 of the camera 1 so that camera 1 recognizes the controller 2.

After the camera 1 and controller 2 turn on, each device could also broadcast their own communication function table information to the network as described in the fourth embodiment, send a read/report request message to access the operation status from the communication function table of the other device, and recognize the other communication devices from the responses to these request messages.

It is therefore possible for the controller 2 to recognize the camera 1 as a data request destination as a preprocess to data transmission.

Sending and receiving data between the camera 1 and controller 2 is described next.

The controller 2 sends to the camera 1 a read request message to get information about the data-providing device and functions from the data-providing device/function information 1012 field of the transmission function table 1001 in the camera 1. From the camera 1 response message the controller 2 gets information about the functions and device supplying data, i.e., the camera 1, and more specifically in this embodiment information indicating "a still image from the camera," and determines whether the controller 2 is to get data from the camera 1.

To get data from the camera 1, the controller 2 first sends to the camera 1 a request message to read the data transmission status 1014 from the transmission function table 1001 of the camera 1. The controller 2 then receives a response message from the camera 1 and confirms the transmission status of the camera 1. If the transmission status is READY, the controller 2 then sends to the camera 1 a write request message to write the SENDING code to the data transmission status 1014 of the transmission function table 1001 in the camera 1. The controller 2 also writes a code denoting RECEIVING in the data reception status 1024 field of its own reception function table 1002.

After the camera 1 writes the SENDING code to the data transmission status 1014 of its transmission function table 1001 from the controller 2, it generates and sends the transmission data description 1013 to the controller 2. It then reads and divides the transmission data 1016 to the divisional size stored in the data division information 1015 field, and autonomously transmits the divided data to the controller 2. When the controller 2 receives all transmitted data, it reassembles the data, links it to the previously received transmission data, and stores the received data.

Because a controller able to request data from a terminal device storing the data gets information relating to the terminal device and the functions of the terminal device before it requests data from the terminal device in this fifth embodiment of the invention, the controller is able to get data from the terminal device after clearly recognizing the device providing the data and the function of the device.

Embodiment 6

Specific examples of the properties for achieving the data communication method and procedure described in the above fourth and fifth embodiments are shown in FIG. 20, FIG. 21, and FIG. 22 and described below.

FIG. 20 shows properties related to the data reception service.

(1) Object Information Handled for PUSH Type Reception

<Parameter Description>

Maximum file byte size: maximum byte size of a push-receivable file after it is reassembled File provider object/property count: number of properties of the self-node or other-node providing push-receivable files; maximum=40.

File provider object/property: combined object code and property code of the self-node or other-node providing push-receivable files File count: number of files that can be received and stored per device object/property; 0–0xFFFE=number of files; 0xFFFF=no defined limit.

<Read, Write, Notification Timing>

This property is always readable.

(2) Object Information Handled for PULL Type Reception

<Parameter Description>

Maximum file byte size: maximum byte size of a pull-receivable file after it is reassembled File provider object/property count: number of properties of the self-node or other-node providing pull-receivable files; maximum=40.

File provider object/property: combined object code and property code of the self-node or other-node providing pull-receivable files File count: number of files that can be received and stored per device object; 0–0xFFFE=number of files; 0xFFFF=no defined limit.

<Read, Write, Notification Timing>

This property is always readable.

(3) Data Division Information

<Parameter Description>

Denotes maximum EDT byte count optimal for reception.

<Read, Write, Notification Timing>

The property is read before the transmission-side sends a transmission data report.

This property is always readable.

FIG. 21 shows part of the properties related to the data transmission service.

(1) Object Information Handled for PUSH Type Transmission

<Parameter Description>

Maximum file byte size: maximum byte size of a push-transmittable file after it is divided.

File provider object/property count: number of properties of the self-node or other-node providing push-transmittable files; maximum=40.

File provider object/property: combined object code and property code of the self-node or other-node providing push-receivable files File count: number of files per device object/property <Read, Write, Notification Timing>

This property is readable regardless of the transmission status.

The file count field of this property cannot be changed when the transmission status is SENDING or a write-prohibit is applied.

(2) Object Information Handled for PULL Type Transmission

<Parameter Description>

Maximum file byte size: maximum byte size of a pull-transmittable file before it is divided File provider object/property count: number of properties of the self-node or other-node providing pull-transmittable files; maximum=40.

File provider object/property: combined object code and property code of the self-node or other-node providing pull-receivable files File count: number of files per device object/property <Read, Write, Notification Timing>

This property is readable regardless of the transmission status.

The file count field of this property cannot be changed when the transmission status is SENDING or a write-prohibit is applied.

FIG. 22 shows part of the properties related to the data transmission service.

(3) Transmission Status

<Parameter Description>

READY/last-terminated-normally=0: standby state prior to transmission or after a previous transmission was finished normally Transmission start=0x01: transmission process started (or during transmission)

Write-prohibit=0x10: a mode in which the transmission target information, transmission file information, and transmission data cannot be changed.

Last-terminated-due-to-error=0xFF: standby mode after the last transmission attempt ended due to error <Read, Write, Notification Timing>

This property is always readable.

If the transmission status is set to SENDING or WRITE-PROHIBIT, this property cannot be written from any node other than the file reception-side not that write the transmission status.

The transmission process can be interrupted by writing NORMAL TERMINATION or TERMINATED DUE TO ERROR code to this property during data transmission.

If the transmission status is set to SENDING or WRITE-PROHIBIT, it is necessary to reset a NORMAL TERMINATION or TERMINATED DUE TO ERROR status, to start transmission by writing START TRANSMISSION again.

(4) Transmission target information

<Parameter Description>

File provider object/property: device object/property information in the handled object information that will be transmitted File number: number of each file when multiple files are handled <Read, Write, Notification Timing>

For PUSH type transmission the transmission target information is reported from the transmission-side node to the reception-side node.

For pull-mode transmission the transmission target information is written from the reception-side node to the transmission-side node.

This property is not changed when the transmission status is SENDING or WRITE-PROHIBIT.

This property is readable when the transmission status is SENDING or WRITE-PROHIBIT.

(5) Transmission File Information

<Parameter Description>

Defines the filename, date, byte size of the file, and a check code.

Filename: filename of eight ASCII characters

Attributes: file attributes denoted with three ASCII characters

Date: file date in the format Y1Y2/MN/DD HH:MM: SS where

Y1=0x13–0x63 (19-99),

Y2=0x00–0x63 (00-99),

MN=0x01–0x0C (1-12),

DD=0x01–0x1F (1-31),

HH=0x00–0x17 (0-23),

MM=0x00–0x3B (0-59),

SS=0x00–0x3B (0-59).

If the file has no date, each date byte is set to 0.

File byte size: total number of bytes in the transmission file

Check code: twos complement of the total of each byte in the transmission file

<Read, Write, Notification Timing>

For pull-mode transmission, the transmission-side node writes SENDING to the transmission state property from the reception-side node, and returns this property value to the reception-side node.

For PUSH type transmission, the transmission-side node changes the transmission state property to SENDING and then sends this property value to the reception-side node.

This property is not changed when the transmission status is SENDING or WRITE-PROHIBIT.

This property is readable when the transmission status is SENDING or WRITE-PROHIBIT.

(6) Transmission Data

<Parameter Description>

Total array size: size of the array transmitted in segments divisional size: byte length of each divided data. Except for the last array element where the total array size is 2 or more, the size of each divided is the same, and (divisional size +6) is equal to the EDT size.

divided data: the data of the divided file. The last array element is padded to the same EDT size as other arrays, and the divisional size and later data is not padded.

<Read, Write, Notification Timing>

After the data division information is received from the reception-side, the transmission data is sent from the transmission-side node.

If the transmission status is not SENDING, these property values cannot be read or reported.

Next, the data communication methods and procedures described in embodiments 4 and 5 above are described below with reference to a sequence using the properties shown in FIGS. 20, 21, and 22.

Using the change-instance class report in the startup sequence of each node, the device startup process running on the transmission-side device gets the address (EA) of the reception-side node for PUSH type file transmissions, and for pull-mode file transmissions the reception-side gets the address (EA) of the transmission-side node.

Figure 23:
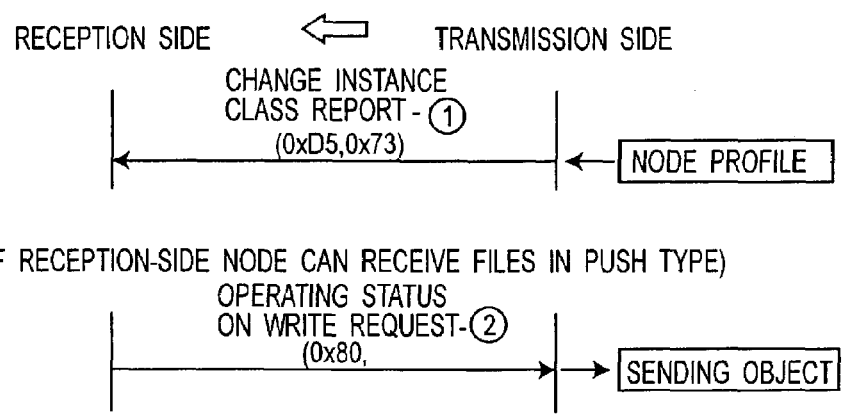
FIGS. 23 and 24 show typical node startup sequences related to data communication.

FIG. 23 shows a sequence for when the reception-side starts up before the transmission-side node.

<Process when the Reception-side Node Starts First and the Transmission-side Node Starts Later>

(1) Change instance class report (transmission-side→reception-side)

A change instance class report is sent to the reception-side during the startup sequence. The reception-side node receiving this report can get the address (EA) of a device having a transmission service object.

(2) Write Operation Status ON Request (Reception-side→Transmission-side)

When the reception-side node can receive files in the PUSH mode, it receives the change instance class report, and the reception-side node sends a write request to set the operation status of the transmission service object ON. The transmission-side node receiving this request can get the address (EA) of the device having a reception service object.

Figure 24:
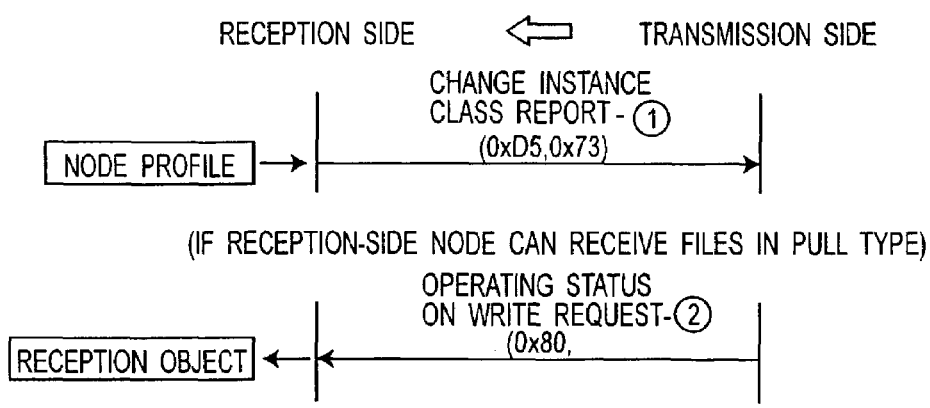

FIG. 24 is a sequence used when the transmission-side node starts up first and then the reception-side node starts up.

<Process when the Transmission-side Node Starts First and the Reception-side Node Starts Later>

(1) Change Instance Class Report (Reception-side→Transmission-side)

A change instance class report is sent to the transmission-side node during the startup sequence. The transmission-side node receiving this report can get the address (EA) of a device having a reception service object.

(2) Write Operation Status ON Request (Transmission-side→Reception-side)

When the transmission-side node can transmit files in the PULL type, it receives the change instance class report, and the transmission-side node sends a write request to set the operation status of the reception service object ON. The reception-side node receiving this request can get the address (EA) of the device having a transmission service object.

To transfer a file by means of autonomous transmission from the transmission-side node in an autonomous communication process (PUSH type data communication), the handled object information for PUSH type reception is requested from the reception-side node, the transmission target information is sent as needed, the transmission file information is sent, and the file is then transmitted by sending the divided data from the transmission-side node.

Figure 25:
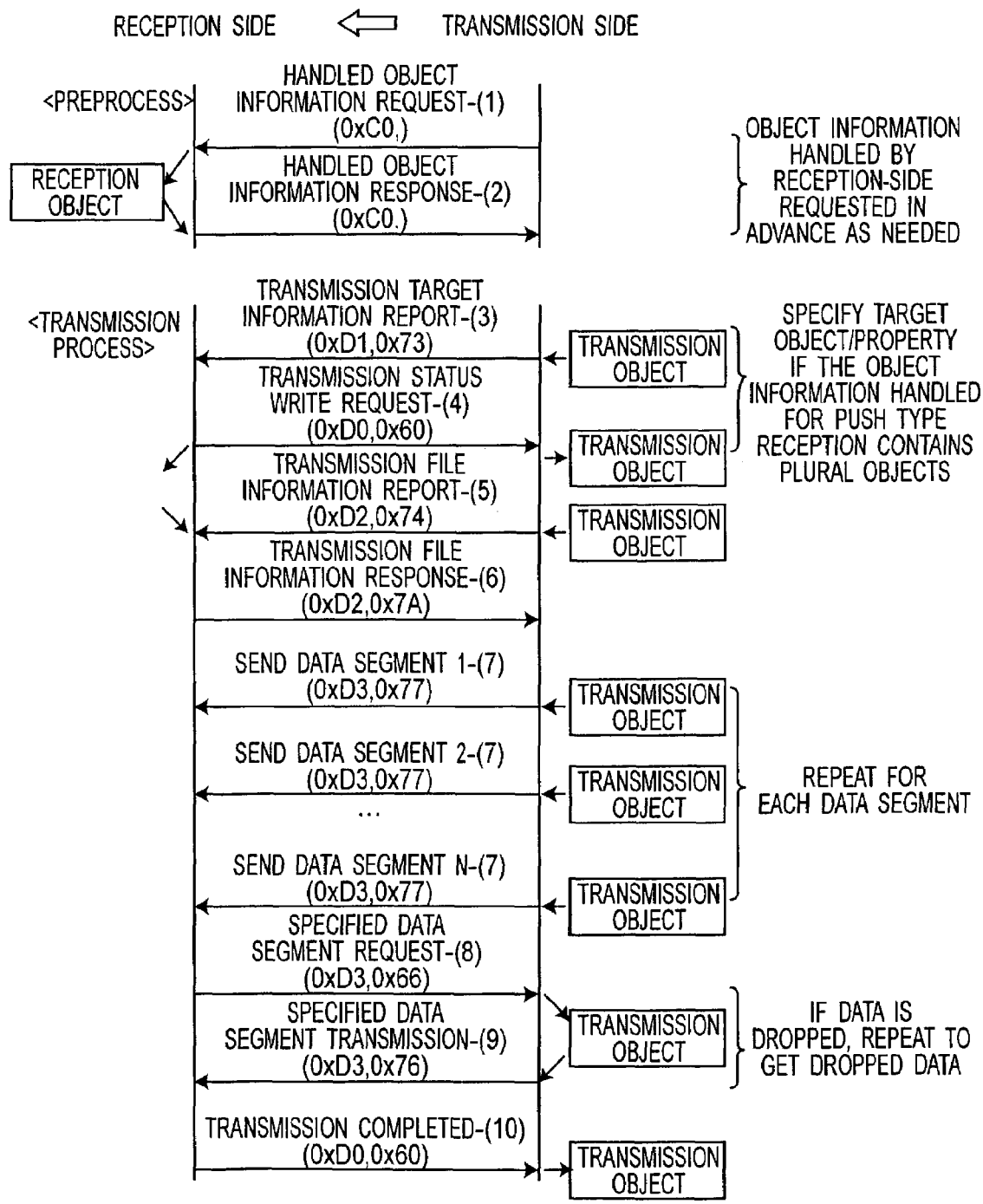
FIG. 25 shows a typical autonomous communication sequence.

FIG. 25 is a typical communication sequence for autonomous communication.

<Preprocess>

(1) Handled Object Information Request (Transmission-side→Reception-side)

The transmission-side node sends to the reception-side node a read request for the handled object information for PUSH type reception.

(2) Handled Object Information Response (Reception-side→Transmission-side)

The reception-side node receiving the request responds by sending the handled object information for PUSH type reception. It should be noted that steps (1) and (2) above could be omitted.

<Transmission Process>

(3) Transmission Target Information Report (Transmission-side→Reception-side)

If there are multiple objects on the reception-side, the transmission-side sends the transmission target information to identify the device object to which data will be sent.

(4) Transmission Status Write Request (Reception-side→Transmission-side)

If the reception-side node receives the transmission target information report and is able to receive the data to be transmitted, it issues a write request to set the transmission status of the transmission service object to START SENDING. If the data to be transmitted cannot be received, it issues a write request to set the transmission status to LAST-TERMINATED-DUE-TO-ERROR.

(5) Transmission File Information Report (Transmission-side→Reception-side)

After the transmission-side node sets the transmission status to START SENDING, it sends the transmission file information, including transmission file size and checksum, to the reception-side node. The reception-side node determines from the transmission file information if reception is possible, and if reception is not possible sets the transmission completion setting to TERMINATED DUE TO ERROR.

(6) Transmission File Information Response (Reception-side→Transmission-side)

The reception-side node returns a response to the transmission-side node.

(7) Divided Data Transmission (Transmission-side→Reception-side)

The transmission-side node divides the file and sends divided data in a continuous stream to the reception-side node.

(8) Specified Divided Data Request (Reception-side→Transmission-side)

If there is a divided data that was not correctly received either after the last divided data is received or when a timeout occurs while waiting for a divided data, the reception-side node sends a transmission request specifying the array element number of the desired divided data.

(9) Specified Divided Data Transmission (Transmission-side→Reception-side)

When the transmission-side node receives a request for a specific divided data from the reception-side node, it sends the specified array element.

It should be noted that steps (8) and (9) above could be omitted.

(10) Transmission Completed Setting (Reception-side→Transmission-side)

If the file is correctly received or if the transmission process is ended for some reason, the reception-side node sets the transmission status to COMPLETED and returns it to the transmission-side node.

There are also cases where the transmission completion setting is not returned. The transmission-side node therefore runs a process to insert a timeout in the process waiting for the specific divided data request and transmission completion setting frame, and change the data transfer status from SENDING to LAST-TERMINATED-DUE-TO-ERROR.

If file transmission is requested from the reception-side node in a request/response communication process (PULL type data communication), the object information handled for PUSH type transmission is requested from the transmission-side node to check the transmission file, transmission file information is gotten as needed, and the reception-side node sends a start transmission trigger. When the transmission-side node receives this trigger it returns the transmission file information for the specified target object, and then runs the same transmission process as for a PUSH type transmission.

Figure 26:
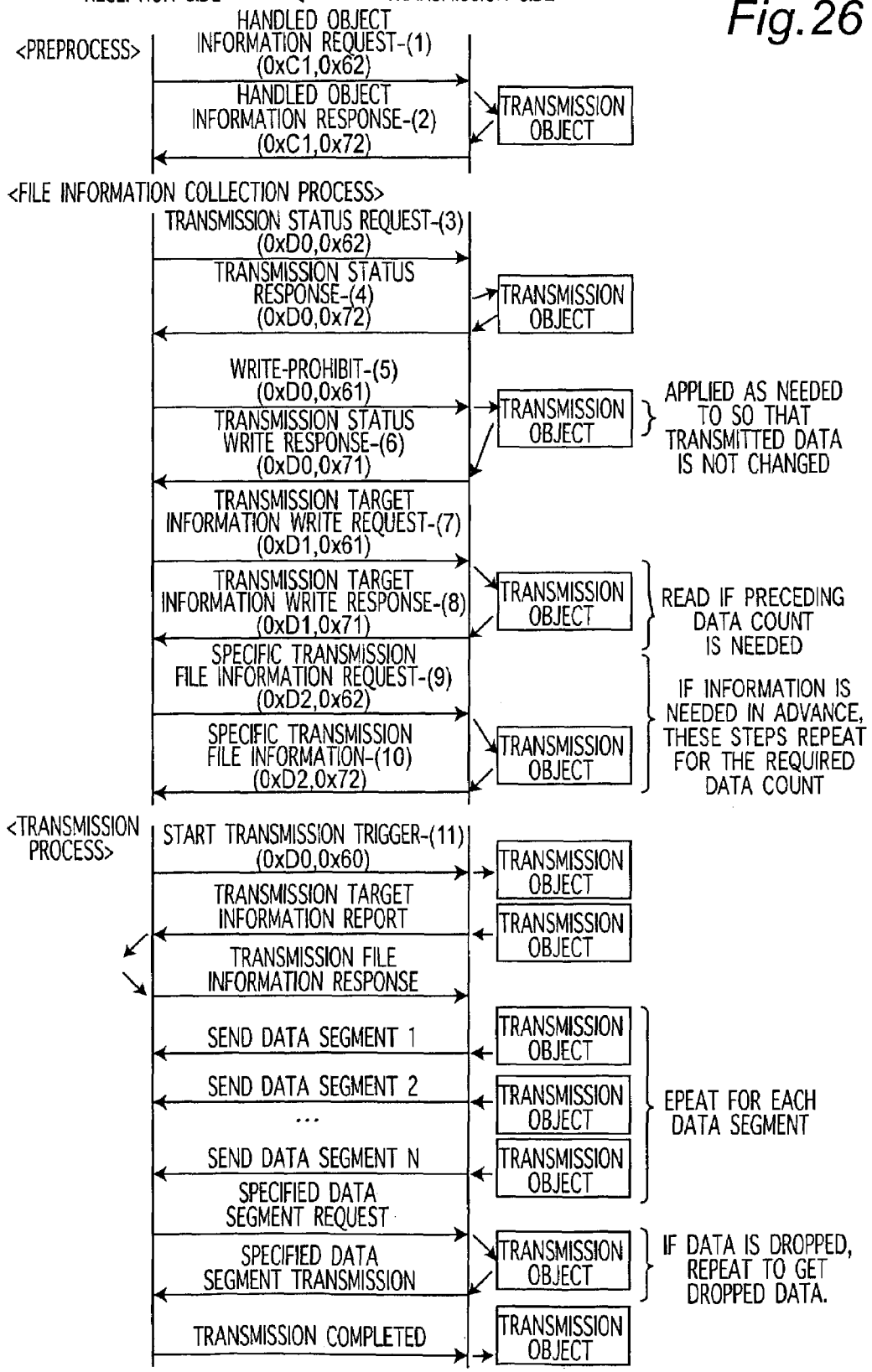
FIG. 26 shows a typical request/response communication sequence.

FIG. 26 shows a typical communication sequence for request/response communication.

<Preprocess>

(1) Handled Object Information Request (Reception-side→Transmission-side)

The transmission-side node sends to the reception-side node a read request for the handled object information for PULL type transmission.

(2) Handled Object Information Response (Transmission-side→Reception-side)

The transmission-side node receiving the request responds by sending the handled object information for PULL type transmission.

<File Information Collection Process>

(3) Transmission Status Request (Reception-side→Transmission-side)

The reception-side node requests the transmission status from the transmission-side node. The transmission-side node responds by sending the transmission status.

(4) Transmission Status Response (Transmission-side→Reception-side)

The transmission-side node sends a transmission status response to the reception-side node. If the transmission status is unprocessed or completed, the reception-side node sends a WRITE-PROHIBIT or START SENDING trigger.

(5) Write-Prohibit (Reception-side→Transmission-side)

To prevent the transmission-side node from changing the transmission file information, the reception-side node requests setting the transmission status to WRITE-PROHIBIT. In response to the request the transmission-side node sets the transmission status to WRITE-PROHIBIT. This write-prohibit state is applied as needed. After the transmission status is set to write-prohibit, it must be set to START SENDING to start transmission or to COMPLETED.

(6) Transmission Status Write Response (Transmission-side→Reception-side)

The transmission-side node responds to the write request.

(7) Transmission Target Information Write Request (Reception-side→Transmission-side)

A transmission target information write request is asserted to collect file information as needed.

(8) Transmission Target Information Write Response (Transmission-side→Reception-side)

The transmission-side node responds to the write request.

(9) Specific Transmission File Information Request (Reception-side→Transmission-side)

The transmission file information is requested before the transmission process to get the transmission file information for the target file.

(10) Specific Transmission File Information Response (Transmission-side→Reception-side)

The transmission-side node returns the specified transmission file information as requested.

<Transmission Process>

(11) Start Transmission Trigger (Reception-side→Transmission-side)

The reception-side node sends a trigger to start transmission by asserting a write request to set the transmission status to PROCESSING. The transmission-side node runs the next process after receiving this trigger. Operation is the same as for PUSH type file transmission after the transmission file information is sent.

It should be noted that steps (5) to (11) could be omitted.

Embodiment 7

Specific examples of properties for achieving the data communication methods and procedures described in the fourth and fifth embodiments above are described below.

FIG. 27 shows properties related to the data reception service.

(1) Operation Status

Denotes the operating state of the file reception service function. Set to 0x31 if not operating, 0x30 if operating normally.

(2) Object Information for PUSH Type Reception

Defines the maximum byte size of files handled for PUSH type reception, the file-providing device object, and properties. The presence of this property indicates that PUSH type file reception is possible. This property is required to receives files in the PUSH mode. If multiple instances of this service object are run on the reception-side node, each instance is installed so that the values of this property are not duplicated.

<Parameter Description>

Maximum file byte size: maximum byte size of a push-receivable file after it is divided File storing device class/property count: combined number of classes and properties able to store a push-receivable file; maximum=40.

File storing device class/property: combined class group code, class code and property code of self-nodes or other-nodes storing push-receivable files File count: number of files that can be received and stored per device class/property; 0–0xFFFE=number of files, 0xFFFF=no specific limit <Read, Write, Notification Timing>

This property is always readable.

(3) Data Division Information

Defines the maximum divisional size of receivable data. The transmission-side node compares the reported property value with the divisional size the self-node can transmit, and divides and sends the file using the smallest detected divisional size.

<Parameter Description>

Denotes the maximum receivable EDT byte count.

<Read, Write, Notification Timing>

This property is read before the transmission-side node sends the transmission data.

This property is always readable.

FIG. 28 shows the properties related to the data transmission service.

(1) Operation Status

Denotes the operating state of the file transmission service function. Set to 0x31 if not operating, 0x30 if operating normally.

(2) Object Information for PUSH Type Transmission

Defines the maximum byte size of files handled for PULL type file transmission, the file-providing device object, and properties. The presence of this property indicates that PULL type file transmission is possible. If multiple instances of this service object are run on the reception-side node, each instance is instantiated so that the values of this property are not duplicated. This property is required to send files in the PULL type.

<Parameter Description>

Maximum file byte size: maximum byte size of a PULL type transmission file before it is divided File-providing device object/property count: combined number of self-node or other-node device objects and properties able to provide files for PULL type transmission; maximum=40.

File-providing device object/property: combined property codes and device objects denoted by the class group codes, class codes, and instance codes of self-node and other-node devices providing files for PULL type reception.

File count: denotes the file count stored for each device object/property.

<Read, Write, Notification Timing>

This property is always readable regardless of the transmission status.

The file count of this property is not changed when the transmission status is set to SENDING or WRITE-PROHIBIT.

FIG. 29 shows the properties related to the data transmission service.

(3) Send/Receive Settings

This property is for writing the transmission trigger and send/receive results from the reception-side node. These property values are reflected in the transmission status property when they are written.

<Parameter Description>

Normal completion=0x00: transmission is completed normally.

Forced termination=0x01: termination forced by reception-side node.

WRITE-PROHIBIT setting=0x10: prohibits writing this property from any node other than the reception-side node that wrote to this property. With this setting files are not sent to any node other than the reception-side node that wrote to this property.

Transmission start=0x20: starts the transmission process

<Read, Write, Notification Timing>

Writing to this property is immediately reflected in the transmission status property; if this property is set to START SENDING, the transmission status is set to SENDING; if set to WRITE-PROHIBIT, the transmission status is set to WRITE-PROHIBITED; otherwise the transmission status is set to READY. If the transmission status property is set to SENDING or WRITE-PROHIBITED, this property cannot be written by any node other than the reception-side node that set this property.

The transmission process can be interrupted by setting this property to COMPLETED NORMALLY or TERMINATED DUE TO ERROR during data transmission.

(3) Transmission Status

This property denotes the transmission status of the current instance, i.e., whether the instance is sending. If this property is set to SENDING, the transmission target information, transmission file information, and transmission data cannot be changed.

<Parameter Description>

READY=0: standby mode

WRITE-PROHIBITED=0x10: protects file transmissions to nodes other than the reception-side node that wrote to the send/receive setting property.

SENDING=0x20: transmission in progress

<Read, Write, Notification Timing>

This property is always readable.

The value written to the send/receive setting property is reflected in this property.

(4) Transmission Target Information

This property identifies the file that is actually sent from among the handled object information of the transmission objects. If the file-providing device object/property count of the handled object information is 1 and the file count is also 1, this property need not be used to identify the file.

<Parameter Description>

File-providing device object/property: device object/property information to be sent from the handled object information File number: file number if multiple files are handled.

<Read, Write, Notification Timing>

For PUSH type transmission the transmission-side node reports to the reception-side node.

For PULL type transmission the reception-side node writes to the transmission-side node.

This property cannot be changed while the transmission status is SENDING.

This property can be read when the transmission status is SENDING or WRITE-PROHIBITED.

If the transmission status is not SENDING or WRITE-PROHIBITED, this property is read with no padding added to any values.

(5) Transmission File Information

This property defines the file name and attributes, date, byte size, and other information about the transmission target. This property enables getting information for selecting the files for transmission/reception for PULL type transmission/reception.

<Parameter Description>

Defines the filename, date, byte size of the file, and a check code.

Filename: filename of eight ASCII characters

Attributes: file attributes denoted with three ASCII characters

Date: file date in the format Y1Y2/MN/DD HH:MM:SS where

Y1=0x13–0x63 (19-99),

Y2=0x00–0x63 (00-99),

MN=0x01–0x0C (1-12),

DD=0x01–0x1F (1-31),

HH=0x00–0x17 (0-23),

MM=0x00–0x3B (0-59),

SS=0x00–0x3B (0-59).

If the file has no date, each date byte is set to 0.

File byte size: total number of bytes in the transmission file

Check code: twos complement of the total of each byte in the transmission file

<Read, Write, Notification Timing>

For PULL type transmission, the transmission-side node writes SENDING to the transmission state property from the reception-side node, and returns this property value to the reception-side node.

For PUSH type transmission, the transmission-side node changes the transmission state property to SENDING and then sends this property value to the reception-side node.

This property is not changed when the transmission status is SENDING.

This property is readable when the transmission status is SENDING or WRITE-PROHIBIT.

If the transmission status is not SENDING or WRITE-PROHIBITED, this property is read with no padding added to any values.

(6) Transmission Data

<Parameter Description>

Total array size: size of the array transmitted in segments divisional size: byte length of each divided data. Except for the last array element where the total array size is 2 or more, the size of each divided data is the same, and (divisional size +6) is equal to the EDT size.

Divided data: the segmented data. The last array element is padded to the same EDT size as other arrays, and the divisional size and later data is not padded.

After the transmission file information report response of the reception-side node is received, the transmission data is sent from the transmission-side node.

If the transmission status is not SENDING, this property cannot be reported or read.

An exemplary sequence using the properties in FIGS. 27, 28, and 29 for achieving the data communication methods and procedures described in the fourth and fifth embodiments above is described next.

Using the change-instance class report in the startup sequence of each node, the device startup process running on the transmission-side device gets the address (EA) of the reception-side node for PUSH type file transmissions, and for PULL type file transmissions the reception-side gets the address (EA) of the transmission-side node.

Figure 30:
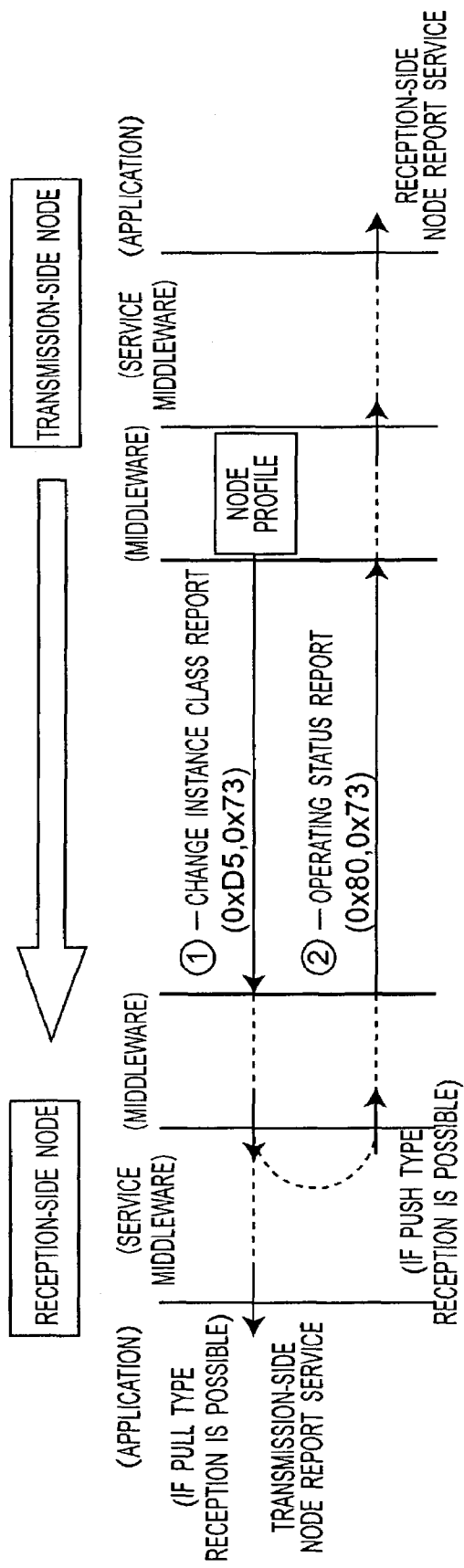
FIG. 30 and FIG. 31 show typical node startup sequences related to data communication.

FIG. 30 shows a sequence when the reception-side starts up before the transmission-side node.

<Process when the Reception-side Node Starts First and the Transmission-side Node Starts Later>

(1) Change Instance Class Report (Transmission-side→Reception-side)

A change instance class report is sent to the reception-side during the startup sequence. The reception-side node application receiving this report can get the address (EA) of the transmission-side node having a file transmission service object. (transmission-side node report service)

(2) Operation Status Report (Reception-side→Transmission-side)

If the reception-side node can receive files in the PUSH type, it receives the change instance class report and returns the operation status of the file reception service object. The transmission-side node application receiving this report can get the address (EA) of the reception-side node having a file reception service object. (reception-side node report service)

Figure 31:
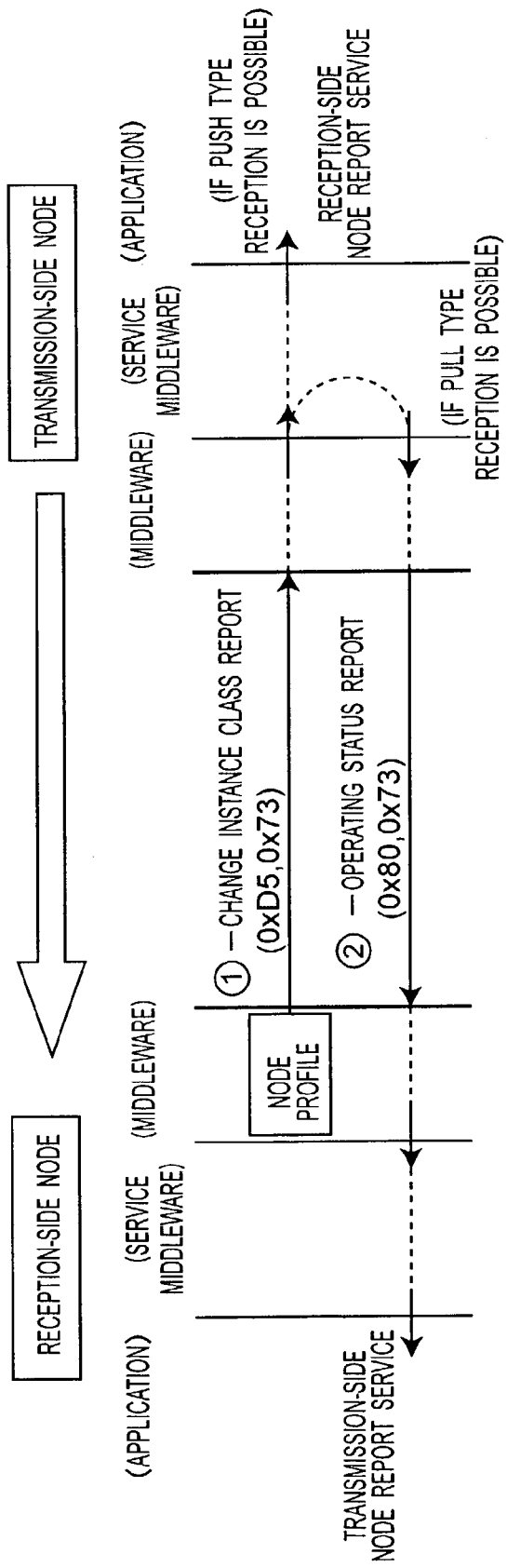

FIG. 31 is a sequence used when the transmission-side node starts up first and then the reception-side node starts up.

(1) Change Instance Class Report (Reception-side→Transmission-side)

A change instance class report is sent to the transmission-side node during the startup sequence. The application on the transmission-side node receiving this report can get the address (EA) of a device having a reception service object. (reception-side node report service)

(2) Operation Status Report (Transmission-side→Reception-side)

If the transmission-side node can send files in the PULL type, it receives the change instance class report and returns the operation status of the file transmission service object. The reception-side node application receiving this report can get the address (EA) of the transmission-side node having a file transmission-side service object. (transmission-side node report service)

In an autonomous communication process (PUSH type data communication) the transmission-side node requests the object information handled by the reception-side node for PUSH type reception, communicates the transmission target information as needed, sends the transmission file information, and then transmits the file by sending the divided data from the transmission-side node.

Figure 32:
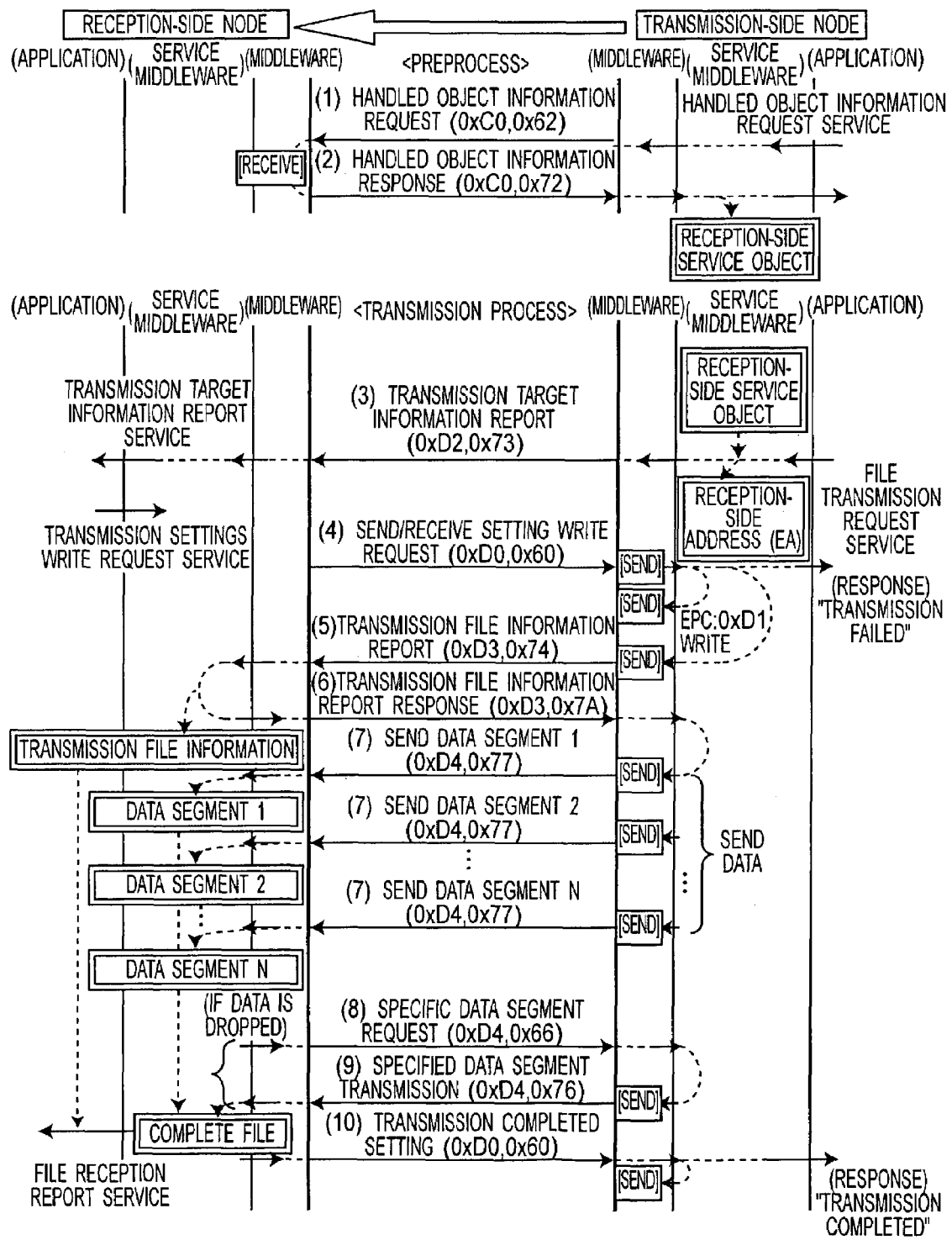
FIG. 32 shows a typical autonomous communication sequence.

FIG. 32 shows a typical communication sequence for autonomous communication.

<Preprocess>

(1) Handled Object Information Request (Transmission-side→Reception-side)

The transmission-side node application sends to the reception service object of the reception-side node a read request for the object information handled for PUSH type reception. (handled object information request service) The file transfer service middleware of the transmission-side node could broadcast to all instances on the assumption that there are multiple reception service object instances on the reception-side node.

(2) Handled Object Information Response (Reception-side→Transmission-side)

After receiving the request, the reception-side node returns the handled object information for PUSH type reception. It should be noted that steps (1) and (2) above could be omitted.

<Transmission Process>

(3) Transmission Target Information Report (Transmission-side→Reception-side)

If there are multiple instances of handled object information for reception on the reception-side node, the transmission-side node application sends the transmission target information to identify the device object to which the data will be sent. This report is triggered by a request from the application to the file transfer service middleware. (file transmission request service)

(4) Send/Receive Setting Write Request (Reception-side→Transmission-side)

The reception-side node application receives the transmission target information report, and if it can receive the data to be sent issues a write request to set the send/receive setting of the transmission service object to START SENDING. If the data to be sent cannot or will not be acquired, the write request sets the send/receive setting to 0x01 (forced quit). (transmission setting write service)

(5) Transmission File Information Report (Transmission-side→Reception-side)

After the file transfer service middleware of the transmission-side node receives the START SENDING write request from the send/receive setting write request in step (4) above, it sends the size, checksum, and other transmission file information for the transmission file to the reception-side node. It also sets the transmission status property of the transmission service object used for file transmission to 0x20, denoting SENDING.

(6) Transmission File Information Report Response (Reception-side→Transmission-side)

The reception-side node responds to the transmission-side node.

(7) Divided Data Transmission (Transmission-side→Reception-side)

The transmission-side node divides the file and sends the divided data in a continuous stream to the reception-side node.

(8) Specific Divided Data Request (Reception-side→Transmission-side)

If there is a divided data that was not correctly received either after the last divided data is received or when a timeout (=1 minute) occurs while waiting for a divided data, the reception-side node sends a transmission request specifying the array element number of the desired divided data.

(9) Specified Divided Data Transmission (Transmission-side→Reception-side)

When the transmission-side node receives a request for a specific divided data from the reception-side node, it always sends the specified array element.

It should be noted that steps (8) and (9) above could be omitted.

(10) Transmission Completed Setting (Reception-side→Transmission-side)

If the file was correctly received or if the transmission process is terminated for some reason, the file transfer service middleware of the reception-side node sets the send/receive setting to 0x00denoting normal completion or to 0x01denoting a forced quit.

There are also cases in which the transmission completion setting is not set. The transmission-side node therefore inserts a timeout of one minute in the frame reception process waiting for a specified divided data request and transmission completion setting, and resets the transmission status property to 0x00denoting READY if the process times out.

It should be noted that the file transfer service middleware of the reception-side node assembles the multiple received divided data into a single file, and passes the assembled file with the file information obtained in the transmission file information report to the application. (file reception report service)

In a request/response communication process (PULL type data communication) the reception-side node requests the object information handled by the transmission-side node for PUSH type transmission, gets the transmission file information as needed, and then sends a START SENDING trigger. When the transmission-side node receives this trigger it sends the transmission file information for the specified target object, and then transmits the file as described in the PUSH type transmission process above.

Figure 33:
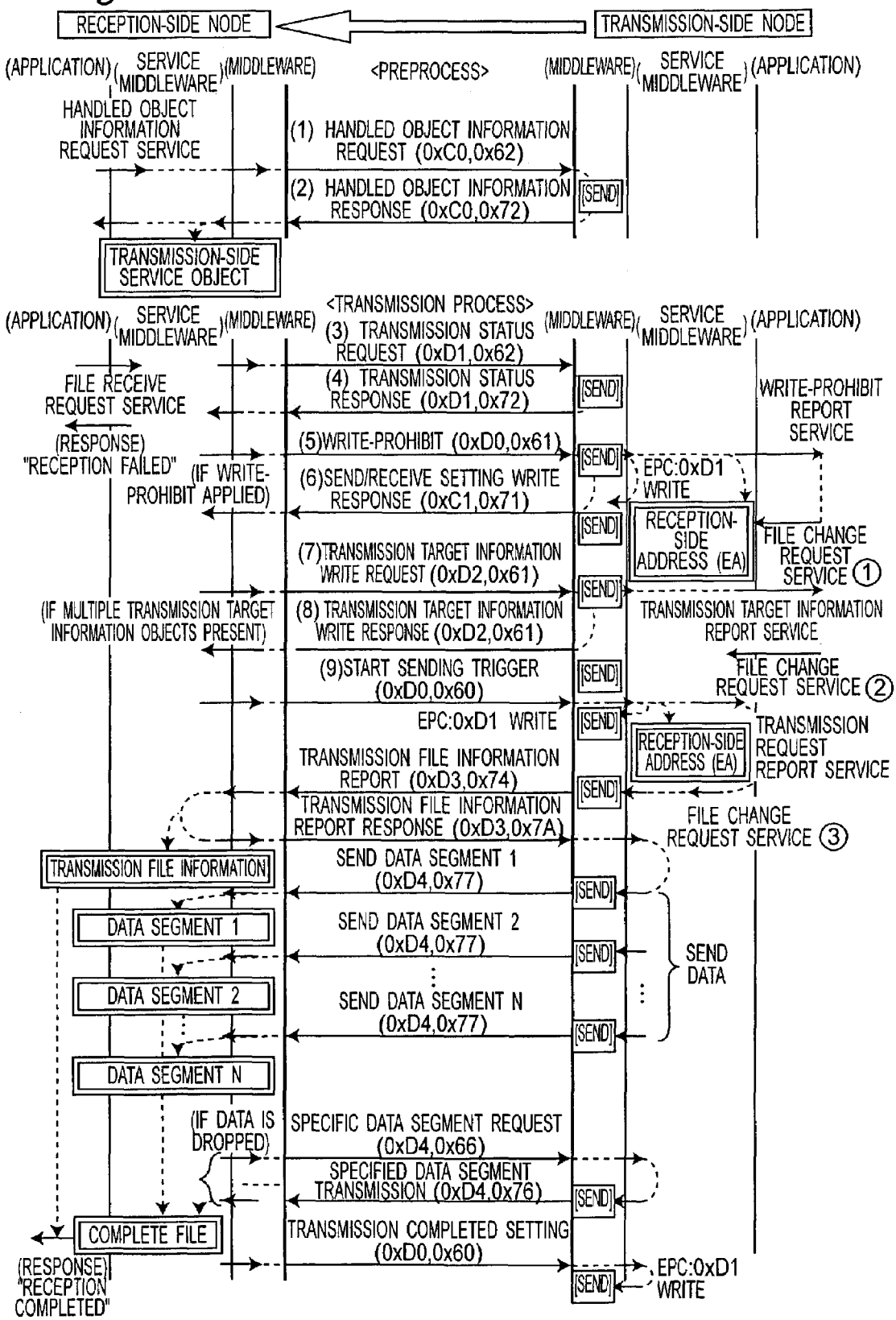
FIG. 33 shows a typical request/response communication sequence.

FIG. 33 shows a typical communication sequence for request/response communication.

<Preprocess>

(1) Handled Object Information Request (Reception-side→Transmission-side)

The reception-side node application sends a read request for the handled object information for PULL type transmission to the transmission-side node. (handled object information request service) The reception-side node file transfer service middleware could broadcast to all instances on the assumption that there are multiple transmission service object instances on the transmission-side node.

(2) Handled Object Information Response (Transmission-side→reception-side)

The transmission-side node receiving the request responds by sending the handled object information for PULL type transmission.

<File Information Collection Process>

(3) Transmission Status Request (Reception-side→Transmission-side)

The file transfer middleware of the reception-side node requests the transmission status from the transmission service object of the transmission-side node obtained by the handled object information request (1).

(4) Transmission Status Response (Transmission-side→Reception-side)

The transmission-side node sends a transmission status response to the reception-side node. If the transmission status is READY, the reception-side node sends a WRITE-PROHIBIT or START SENDING trigger.

(5) Write-Prohibit (Reception-side→Transmission-side)

To protect against a reception request from another node, a write request is asserted to write 0x02 denoting WRITE-PROHIBIT to the send/receive setting. In response to the write request, the transmission-side node sets the transmission status property to 0x02, WRITE-PROHIBIT. This write-prohibit is applied as needed.

After the send/receive setting property is set to 0x02, WRITE-PROHIBIT, the property must be set to 0x20 denoting START SENDING to start transmission or to COMPLETED.

After the write-prohibit request a 1-minute timeout is applied to all write requests from the reception-side node, and the transmission status is set to 0x00 denoting READY.

(6) Send/Receive Setting Write Response (Transmission-side→Reception-side)

The transmission-side node responds to the write request.

(7) Transmission Target Information Write Request (Reception-side Transmission-side)

A transmission target information write request is sent as needed.

(8) Transmission Target Information Write Response (Transmission-side→reception-side)

A response to the write request is sent.

Note that the above steps (3) to (8) can be omitted.

(9) START SENDING Trigger (Reception-side→Transmission-side)

The file transfer service middleware of the reception-side node sends a START SENDING trigger to the transmission-side node by means of a write request to set the send/receive setting to 0x20, START SENDING. After receiving this trigger, the file transfer service middleware of the transmission-side node sets the transmission status property to 0x20, SENDING.

The steps following the transmission file information report are the same as the steps following the transmission file information report in the autonomous communication process.

The services related to the PUSH type file transmission shown in FIG. 32 that are services of the transmission-side node are described below.

(1) Reception-side Node Report Service

This service reports the Echonet address of the reception-side node that is the destination device for PUSH type file transmission to the application. There is no input data and the response data is the Echonet address of the reception-side node.

(2) Handled Object Information Request Service

This service gets the object information handled for PUSH type reception by the reception-side node. The input data is the Echonet address of the reception-side node; response data is the object information handled for PUSH type reception.

(3) File Transmission Request Service

This service sets data in the file transmission object of the self-node and sends files in the PUSH type. Input data includes the name of the transmitted file, file attributes, file date, and a pointer to the transmission file, i.e., the transmission data. Response data is the transmission result denoting that transmission was completed or transmission failed.

Services related to PULL type transmission shown in FIG. 33 that are services of the transmission-side node are described below.

(1) Write-Prohibit Report Service

When WRITE-PROHIBIT is written from the reception-side node to the send/receive setting of the transmission-side node, this service reports the action to the application. There is no input data or response data.

(2) Transmission Target Information Report Service

When the transmission target information of the transmission-side node is written from the reception-side node, this service reports the written transmission target information to the application. There is no input data and the response data is the transmission target information.

(3) File Update Request Service

This service updates data in the file transmission object of the self-node. Updating is not possible if the transmission status of the file transmission object is set to WRITE-PROHIBIT or SENDING. Input data is the transmission target information, name of the transmitted file, file attributes, file date, and a pointer to the transmitted file, i.e., the transmission data. The response data is the transmission result, either update completed or update failed.

The services related to PUSH type file reception shown in FIG. 32 that are services of the reception-side node are described below.

(1) Transmission Target Information Report Service

When a transmission target information report is received from the transmission-side node sending files in the PUSH type, this service passes the received information to the application. There is no input data. The response data is the Echonet address of the transmission-side node and the transmission target information.

(2) Send/Receive Setting Write Request Service

When the transmission target information obtained by the transmission target information report service can be received, this service sends a START SENDING write request to the send/receive setting property of the file transmission service object of the transmission-side node. There is no input data or response data.

(3) File Reception Report Service

When receiving a file sent in the PUSH type from the transmission-side node is completed, this service reports the received file information to the application. There is no input data. The response data is the name of the transmitted file, file attributes, file date, and a pointer to the transmitted file, i.e., the transmission data.

Services related to PULL type file reception shown in FIG. 33 that are services of the reception-side node are described below.

(1) Transmission-side Node Report Service

This services reports to the application the Echonet address of the transmission-side node that is the source for transmitting files in the PULL type. There is no input data. The response data is the Echonet address of the transmission-side node.

(2) Handled Object Information Request Service

This service requests the object information handled for PULL type transmission from the file transmission object of the transmission-side node. The input data is the Echonet address on the transmission-side; response data is the object information handled for PULL type transmission.

(3) File Reception Request Service

This service requests the file transmission service object of the transmission-side node to send the specified file-provider object, properties, and file of the specified file number. The file transfer service middleware controls the sequence including confirming the transmission status of the transmission-side node, sending the START SENDING trigger, receiving the file, and writing the reception completion setting, and when file reception is completed this service returns RECEPTION COMPLETED. The input data is the Echonet address of the transmission source, transmission target information, and the write-prohibit setting, i.e., a flag declaring whether the send/receive setting of the transmission file service object is set to WRITE-PROHIBIT at the beginning of the reception process. The response data is the reception result indicating reception completed or reception failed.

Embodiment 8

Specific examples of properties for achieving a data communication method and procedure for transferring files between two terminals configured as shown in FIG. 1 are shown in FIG. 34, FIG. 35, and FIG. 36.

FIG. 34 shows properties related to the data reception service.

(1) Operation Status

Sets the operation of the file reception service function on or off, and gets the operation status. If operation is on (service provided), set to 0x30; if operation is off (service stopped), set to 0x31. If operation is off, access to other properties is not assured.

Figure 45:
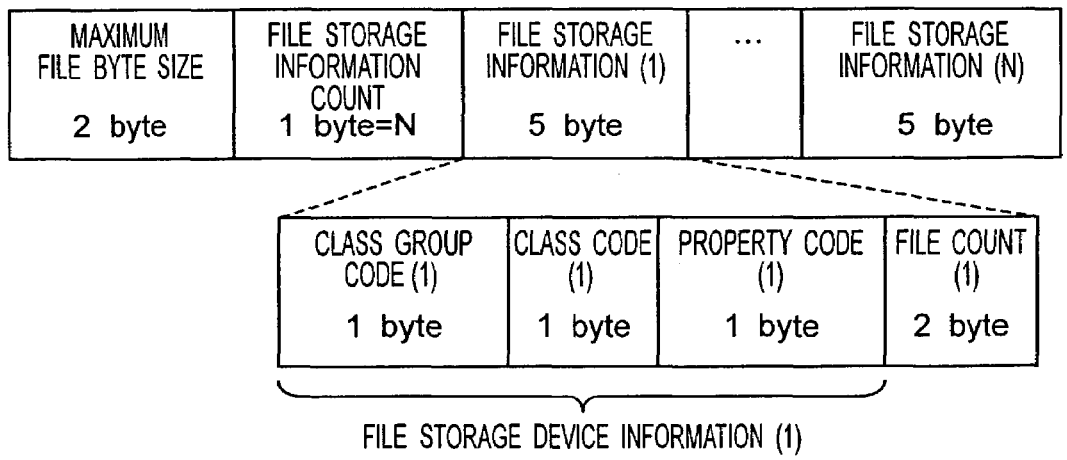
FIG. 45 shows the format of a PUSH type reception object information.

FIG. 45 shows the format of object information handled for PUSH type reception.

(2) Object Information Handled for PUSH Type Reception

This property denotes the information needed for PUSH type reception, including the maximum file byte size, file-providing device object, and properties. This property is required for PUSH type file reception. The values of the file storage device information in this property must not be duplicated in each instance.

<Parameter Description>

Maximum file byte size: maximum byte size of a push-receivable file after it is assembled File information count: the number of file storage information objects for storing files that can be received in the PUSH type; maximum=40.

File storage information: combination of file storage device information (information about devices for storing files for PUSH type reception) and the number of files that can be received by each file storage device.

File storage device information: class group code, class code, and property code of a device for storing files File count: denotes the number of files that can be received and stored per file storage device information object; 0–0xFFFE=number of files, 0xFFFF=no specific limit (3) Data Division Information This property denotes the maximum division data size that can be received. The transmission-side node compares the reported value of this property with the divisional size that it can transmit, then selects the smaller divisional size to divide and send the file.

<Parameter Description>

Denotes maximum EDT byte count that can be received.

<Read, Write, Notification Timing>

This property is read before the transmission-side node reports the transmission data.

FIG. 35 shows the properties related to the data transmission service.

(1) Operation Status

Sets the operation of the file transmission service function on or off, and gets the operation status. If operation is on (service provided), set to 0x30; if operation is off (service stopped), set to 0x31. If operation is off, access to other properties is not assured.

Figure 46:
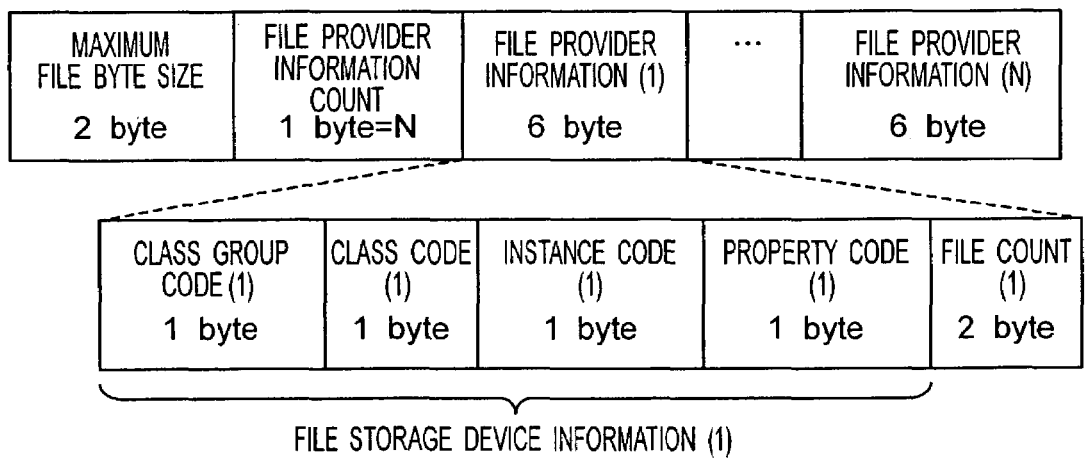
FIG. 46 shows the format of a PULL type transmission object information.

FIG. 46 shows the format of object information handled for PULL type transmission.

(2) Object Information Handled for PULL Type Transmission

This property denotes the information needed for PULL type file transmission, including the maximum file byte size, file-providing device object, and properties. The values of the file-providing device information in this property must not be duplicated in each instance.

This property is required for PULL type file transmission.
<Parameter Description>
Maximum file byte size: maximum byte size of a file before it is divided for PULL type transmission
File-provider information count: the number of file-provider information objects providing files for PULL type transmission; maximum=40.
File-provider information: stores information about the file-providing devices providing files for PULL type transmission, and the number of files that are stored for each file-providing device information object.
File-providing device information: combination of the class group code of a device providing files for PULL type transmission, class code, device object denoted by an instance code, and property code
File count: denotes the number of files stored per device object, property.
<Read, Write, Notification Timing>
The file count field of this property cannot be changed when the transmission status property is set to SENDING.

FIG. 36 shows properties related to the data transmission service.

(3) Send/Receive Setting

This property writes the transmission trigger and send/receive result from the reception-side node. This property is also reflected in the transmission status property when it is written.
<Parameter Description>
Normal termination=0x00: transmission ended normally
Forced termination=0x01: transmission was terminated unconditionally by the reception-side node
Start transmission=0x20: start the transmission process
<Read, Write, Notification Timing>
Writing to this property is reflected immediately in the transmission status property; if START SENDING is written to this property, the transmission status property is set to SENDING, and is otherwise set to READY. If the transmission status property is set to SENDING, this property can only be written by the reception-side node that wrote to this property.
The transmission process can be interrupted by writing COMPLETED or FORCED TERMINATION to this property during data transmission.

(4) Transmission Status

This property denotes the transmission status of the current instance, i.e., whether the transmission process is running. If this property is set to SENDING, the transmission file information property and the transmission data property cannot be changed.
<Parameter Description>
READY=0: standby
SENDING=0x20: transmission process is running
<Read, Write, Notification Timing>
The value written to the send/receive setting property is reflected in this property.
The transmission status can change to READY at the following times: (1) immediately after node startup, (2) immediately after the send/receive setting property is set to 0x00(normal termination) or 0x01(forced termination), (3) when transmission times out.
The transmission status property can change to SENDING at the following times: (1) immediately after the send/receive setting property is set to 0x20, START SENDING.

Figure 47:
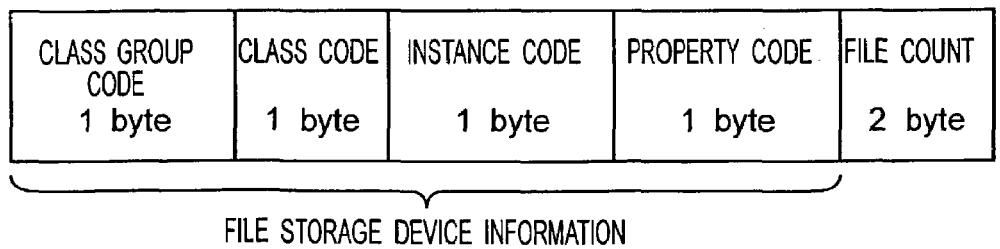
FIG. 47 shows the format of transmission target information.

FIG. 47 shows the format of the transmission target information.

(5) Transmission Target Information

This property identifies the file-providing device information that is the object of the transmission process. In the PUSH type the transmission-side node indicates intent to send a file of the file-providing device denoted by this property by sending this property value to the reception-side node.

In the PULL type, the reception-side node writes to this property on the transmission-side node to ask the transmission-side node to reserve a file of the file-providing device. The transmission-side node receiving this request sends the property value to the reception-side node regardless of whether the file reservation succeeds or fails.
<Parameter Description>
File-providing device information: file-providing device information to be sent from the handled object information
File number: file number of the file-providing device information. File number assignments are dependent on the transmission-side node. However, if the file-providing device objects/properties are handled in an array, the file number is equivalent to an array element number.
<Read, Write, Notification Timing>
In PUSH type transmission this property is sent to the file reception service object of the reception-side node.
In PULL type transmission this property is written from the reception-side node.
When this write request message is received the transmission target information is returned to he file reception service object of the reception-side node. However, if writing is not successful, the transmission target information is returned with a file number of 0xFFFF.

FIG. 48 shows the format of the transmission file information.

(6) Transmission File Information

This property declares the name, attributes, date, byte size, and other information about the file to be transmitted. This property enables the file to be sent/received to be selected in PULL type transmission/reception.
<Parameter Description>
The name of the transmitted file, date, file byte size, and check code
Name: filename of eight ASCII characters. Filenames are filled from the front and empty spaces are padded with 0x00.
Attributes: file attributes of three ASCII characters. The file attributes is filled from the front and empty spaces are padded with 0x00.
Date: file date in the format Y1Y2/MN/DD HH:MM:SS where
Y1=0x13–0x63 (19-99),
Y2=0x00–0x63 (00-99),
MN=0x01–0x0C (1-12),
DD=0x01–0x1F (1-31),
HH=0x00–0x17 (0-23),
MM=0x00–0x3B (0-59),
SS=0x00–0x3B (0-59).
If the file has no date, each date byte is set to 0. The date is invalid if Y1=0x00.
File byte size: total number of bytes in the transmission file
Check code: twos complement of the total of each byte in the transmission file <Read, Write, Notification Timing>
If the send/receive setting property is written and the transmission status property is changed to SENDING, the transmission-side node sends this property value to the reception-side node.
If the value of the transmission target information property is not contained in the file-providing device object/property of the handled object information property for PULL type transmission, the file byte size of this transmission file information property is set to 0 and posted.

FIG. 49 shows the transmission data format.

(7) Transmission Data

This property is an array of the divided data in data division size generated from the transmitted file. The array elements must be transferred in a continuous stream.

<Parameter Description>
Array element number: The transmission file is divided according to the data divisional size. The divided data are then numbered consecutively from the beginning of the file. The data divisional numbers are used as the array element numbers.
Total array size: size of the entire array transferred in segments.
Data divisional size: byte length of each divided data. Except for the last array element where the total array size is 2 or more, the size of each divided data is the same, and (divisional size +6) is equal to the EDT size.
Divided data: the data of the divided file. The last array element is padded to the same EDT size as other arrays, and the divisional size and later data is not padded.

<Read, Write, Notification Timing>
After the transmission file information report response of the reception-side node is received, the transmission-side node sends the transmission data.
If the transmission status property is not SENDING, CANNOT RESPOND is returned.

A sequence using the properties shown in FIG. 34, FIG. 35, and FIG. 36 for achieving a data communication method and procedure for transferring files between two terminals configured as shown in FIG. 1 is described next. In this embodiment, the PUSH type is used as the method for sending a file by autonomous communication, the PULL type is used as the method for sending a file by request/response communication, and the respective file transfers are referred to PUSH type file transfer and PULL type file transfer.

Using the change-instance class report in the startup sequence of each node, the device startup process running on the transmission-side device gets the address (EA) of the reception-side node for PUSH type file transfers, and for PULL type file transfers the reception-side gets the address (EA) of the transmission-side node.

Figure 37:
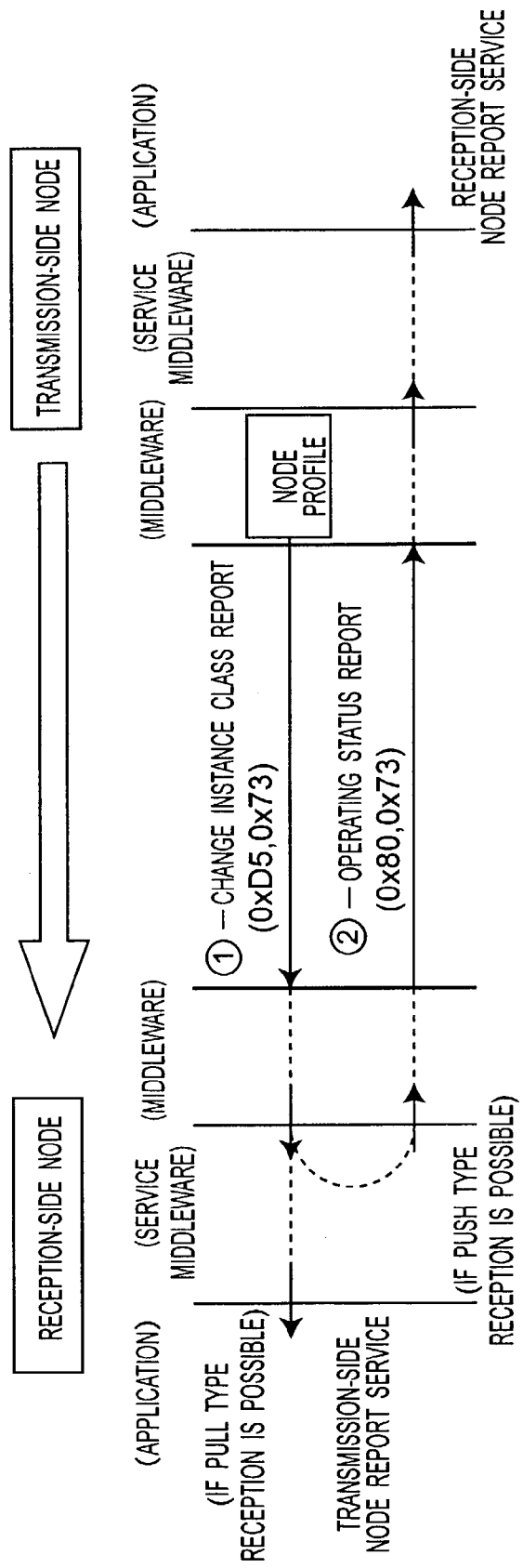
FIG. 37 and FIG. 38 show typical node startup sequences related to data communication.

FIG. 37 shows a sequence for when the reception-side node starts up before the transmission-side node.

<Process when the Reception-side Node Starts First and the Transmission-side Node Starts Later>

(1) Change Instance Class Report (Transmission-side→Reception-side)

[Transmission Node Process]
Sends a change instance class report to the reception-side node according to the startup sequence.

[Reception Node Process]
When the file transfer service middleware of the reception-side node receives this message from the transmission-side node, it passes the address (EA) of the transmission-side node having a file transfer service object to the application. (transmission-side node report service) The reception-side node application manages the addresses (EA) of the transmission-side nodes.

(2) Operation Status Report (Reception-side→Transmission-side)

[Reception Node Process]
When the change instance class report (1) is received, the file transfer service middleware of the reception-side node must report the operation status of all file reception service objects that can receive files in the PUSH type to the transmission-side node. This report is required.

[Transmission Node Process]
When the file transfer service middleware of the transmission-side node receives this report message, it passes the address (EA) of the reception-side node having the file reception service object to the application (reception-side node report service). The transmission-side node application manages the addresses (EA) of the reception-side nodes.

Figure 38:
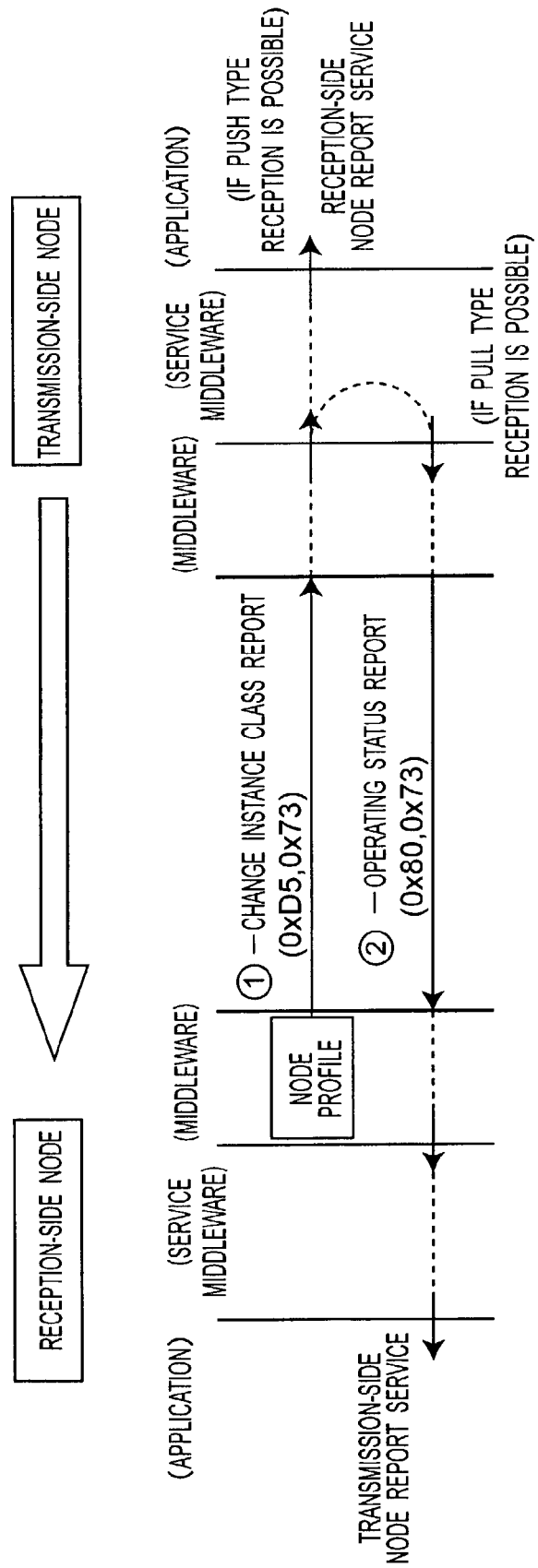

FIG. 38 shows a sequence for when the transmission-side node starts up before the reception-side node.

<Process when the Transmission-side Node Starts First and the Reception-side Node Starts Later>

(1) Change Instance Class Report (Reception-side→Transmission-side)

[Reception Node Process]
Sends a change instance class report to the transmission-side node according to the startup sequence.

[Transmission Node Process]
When the file transfer service middleware of the transmission-side node receives this message from the reception-side node, it passes the address (EA) of the reception-side node having a file reception service object to the application. (reception-side node report service) The transmission-side node application manages the addresses (EA) of the reception-side nodes.

(2) Operation Status Report (Transmission-side→Reception-side)

[Transmission Node Process]
When the change instance class report (1) is received, the file transfer service middleware of the transmission-side node must report the operation status of all file transmission service objects that can send files in the PULL type to the reception-side node. This report is required.

[Reception Node Process]
When the file transfer service middleware of the reception-side node receives this report message, it passes the address (EA) of the transmission-side node having the file transmission service object to the application (transmission-side node report service). The reception-side node application manages the addresses (EA) of the transmission-side nodes.

For file transfers by autonomous communication from the transmission-side node, the handled object information for PUSH type reception property of the reception-side node is requested and the transmission target information property is passed as needed. Then after sending the transmission file information property, the target data is divided and sent to transfer the file.

Figure 39:
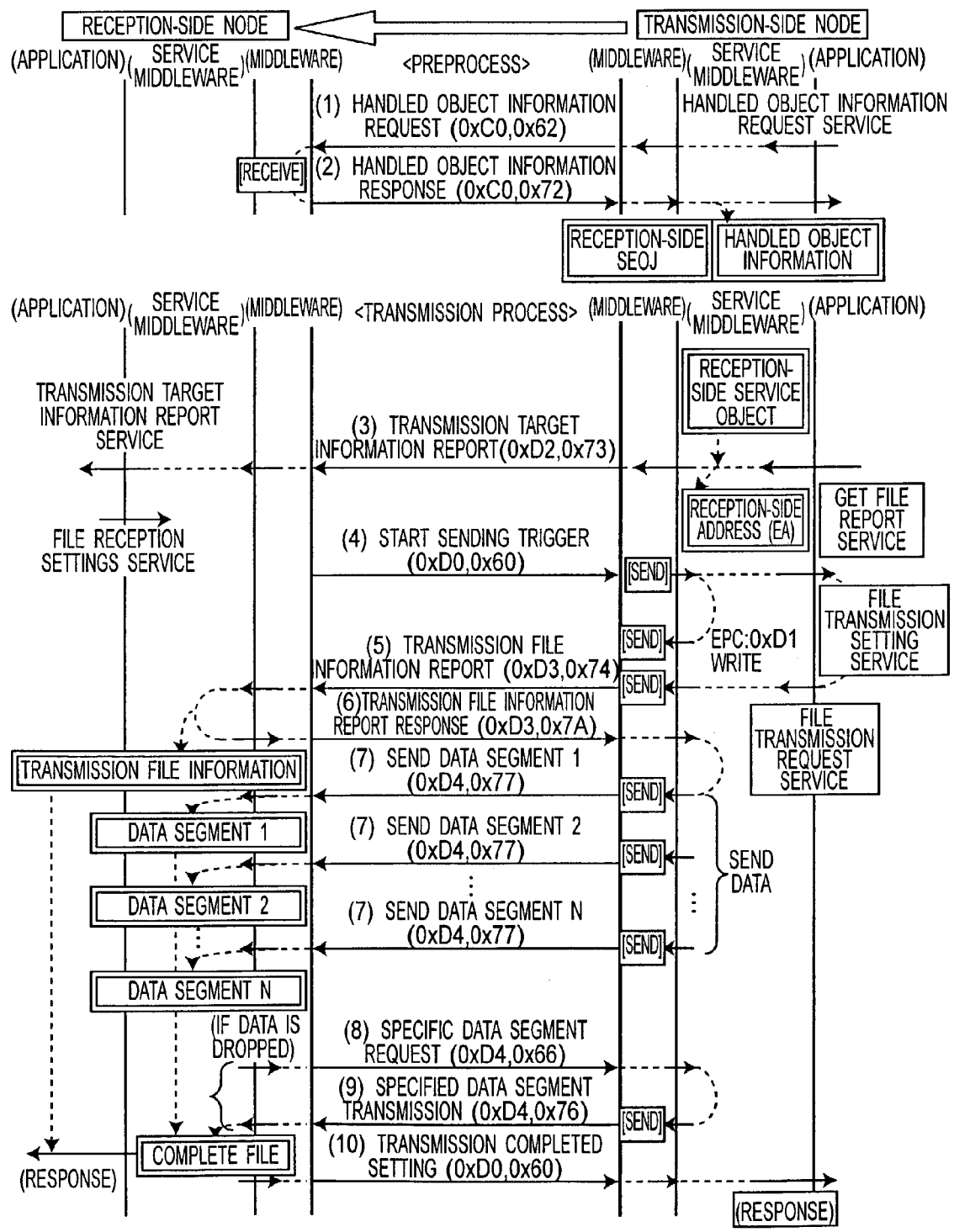
FIG. 39 shows an exemplary autonomous communication sequence.
Figure 41:
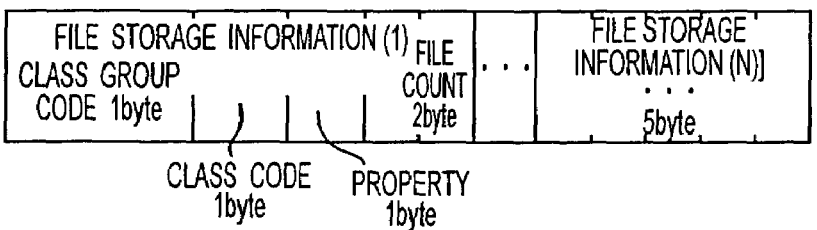

FIG. 39 is a typical communication sequence for autonomous communication. FIG. 41 and FIG. 42 show examples of the messages used in the autonomous communication sequence.

<Preprocess>

(1) Handled Object Information Request (Transmission-side→Reception-side)

[Transmission Node Process]

The transmission-side node application sends a read request to the reception service object of the reception-side node to get the handled object information for PUSH type reception property. (handled object information request service) The file transfer service middleware of the transmission-side node can broadcast to the all instances on the assumption that there are multiple reception service objects on the reception-side nodes.

(2) Handled Object Information Response (Reception-side→Transmission-side)

[Reception Node Process]

The reception-side node receives the handled object information request (1) and all reception service objects of the reception-side nodes return the handled object information for PUSH type reception property.

[Transmission Node Process]

The file transfer service middleware of the transmission-side node receives the response message, stores the SEOJ in the message as the file transfer service object of the reception-side node linked to the handled object information, and returns a response to the handled object information request service to the application.

<Transmission Process>

(3) Transmission Target Information Report (Transmission-side→Reception-side)

[Transmission Node Process]

The transmission-side node application sets the transmission target information to the file transfer service middleware (get file report service). The file transfer service middleware of the transmission-side node then sends the transmission target information report to the reception-side node. (This is required.) The file transfer service middleware determines the SEOJ and DEOJ of the message at this time as follows.

SEOJ freely selects the file transfer service object as a communication port. Of the file transfer service objects for the reception-side nodes obtained in step (2), DEOJ selects an object that can handle file-providing device information received by the get-file report service.

[Reception Node Process]

The file transfer service middleware of the reception-side node stores the SEOJ in this message as the file transfer service object of the transmission-side node (transmission target information report service).

(4) START SENDING Trigger (Reception-side→Transmission-side)

[Reception Node Process]

The reception-side node application receives the transmission target information report and sets the result of determining if file reception is possible to the file transfer service middleware (file reception setting service). When receiving a file the file transfer service middleware of the reception-side node sends a START SENDING trigger for setting the send/receive setting property to 0x20 (denoting START SENDING) tot he file transfer service object at the source of the transmission target information report. If the file specified in the transmission target information cannot be acquired or is not acquired, the write request setting the send/receive setting property to 0x01 (denoting FORCED TERMINATION) is sent (required).

[Transmission Node Process]

The file transfer service middleware of the transmission-side node passes the result of writing to the send/receive setting property of the reception-side node to the application (file transmission setting report service). It should be noted that the file transfer service middleware of the transmission-side node writes the transmission status property according to the write data to the send/receive setting property (required).

(5) Transmission File Information Report (Transmission-side→Reception-side)

[Transmission Node Process]

The application on the transmission-side node gets the file transmission setting service and sets the transmission file and transmission file information to the file transfer service middleware (file transmission request service) The file transfer service middleware receiving this sends the transmission file information to the file reception service object of the reception-side node (required).

(6) Transmission File Information Report Response (Reception-side→Transmission-side)

[Reception Node Process]

The reception-side node returns a report response to the transmission-side node.

(7) Divided Data Transmission (Transmission-side→Reception-side)

[Transmission Node Process]

The transmission-side node file transfer service middleware receiving the transmission file information report response (6), divides the transmission file based on the defined data divisional size, specifies the address (EA) of the reception-side node and the file reception service object, and then consecutively sends the divided data in low to high array element number order (required).

(8) Specified Divided Data Request (Reception-side→Transmission-side)

[Reception Node Process]

If there is a divided data that was not correctly received, the file transfer service middleware of the reception-side node sends a transmission request specifying the array element number of the missing divided data to the transmission-side node.

(9) Specified Divided Data Transmission (Transmission-side→Reception-side)

[Transmission Node Process]

The transmission-side node middleware sends the divided data for the specific array element when the specified divided data request (8) is received from the reception-side node.

(10) Transmission Completion Setting (Reception-side→Transmission-side)

[Reception Node Process]

The file transfer service middleware of the reception-side node sets the send/receive setting property of the file transfer service object in the transmission-side node to 0x00 (normal completion) if the file was correctly received, and to 0x01 (forced termination) if the transmission process was interrupted for any reason (required).

It should be noted that the reception-side node file transfer service middleware assembles a single file from the multiple divided data received in the divided data transmission step (7), and sends the assembled file together with the file information acquired from the transmission file information report (5) to the application (file reception setting service response).

The file transfer service middleware of the transmission-side node passes the transmission completion setting (10) (normal completion or forced termination) to the application when it is received from the reception-side node. If file reception failed, the application is so informed. (file transmission service response)

[Transmission Node Process]

When the transmission-side node receives the transmission completion setting from the reception-side node, it sets the transmission status property to 0x00 (READY).

Because there are also cases in which the transmission completion setting is not set, the transmission-side node inserts a timeout of one minute in the frame reception process waiting for a specific divided data request and transmission completion setting, and resets the transmission status property to 0x00 denoting READY if the process times out. It should be noted that the transmission-side node accepts resend requests from the reception-side node during this one-minute timeout period (required).

Furthermore, the file transfer service middleware of the transmission-side node passes the transmission completion setting (10) (normal completion or forced termination) to the application when it is received from the reception-side node. (file transmission service response)

If a file transmission request from the reception-side node is received in the request/response communication (PULL type data communication) process, the handled object information for PUSH type transmission property is requested from the transmission-side node and the transmission file information is confirmed. The transmission file information is then obtained if needed, and a START SENDING trigger is sent to the reception-side node. When this trigger is received the transmission-side node returns the transmission file information for the specified target object, and then proceeds with the same transmission processed used for PUSH type communication.

Figure 40:
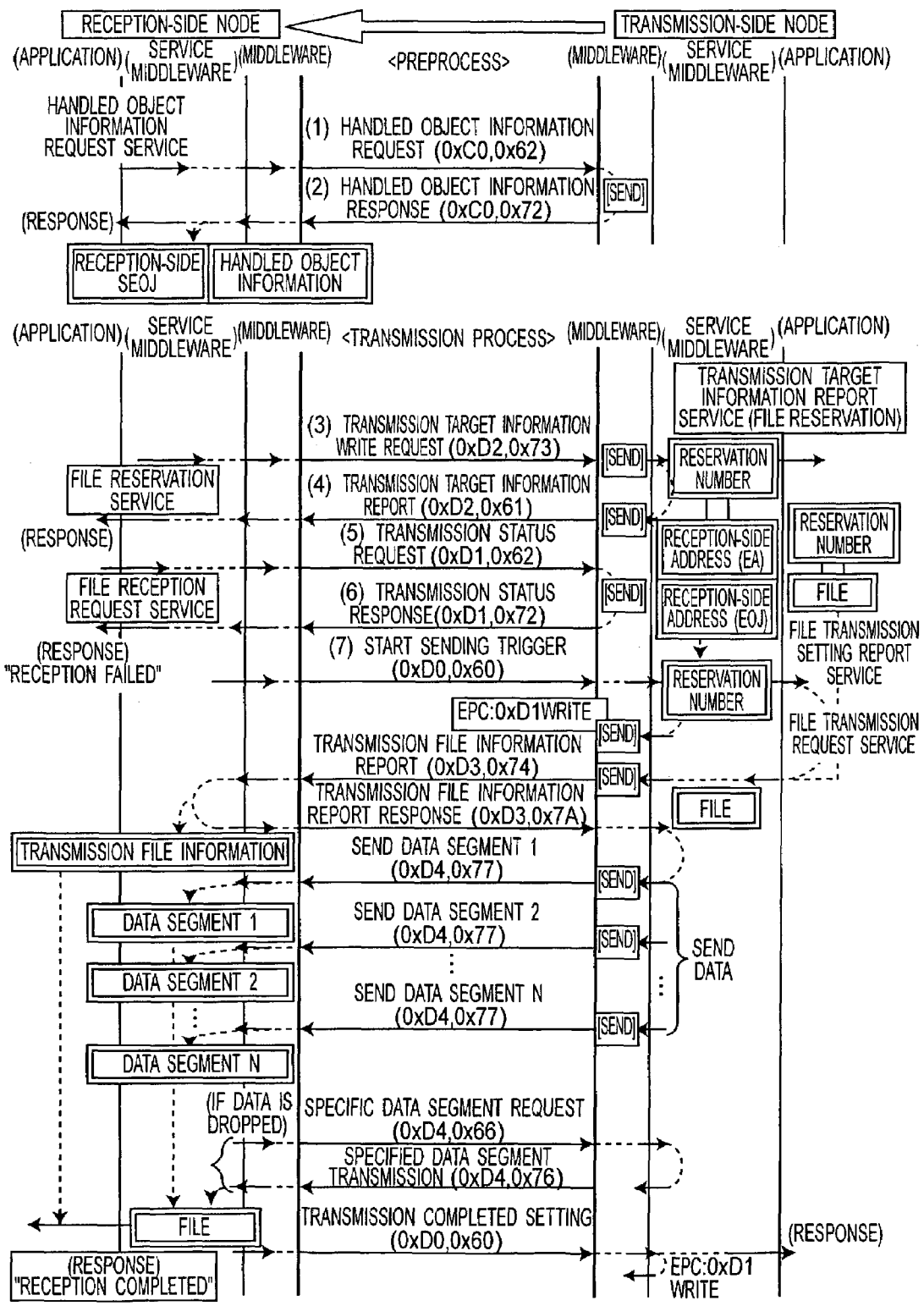
FIG. 40 shows a typical request/response communication sequence.
Figure 43:
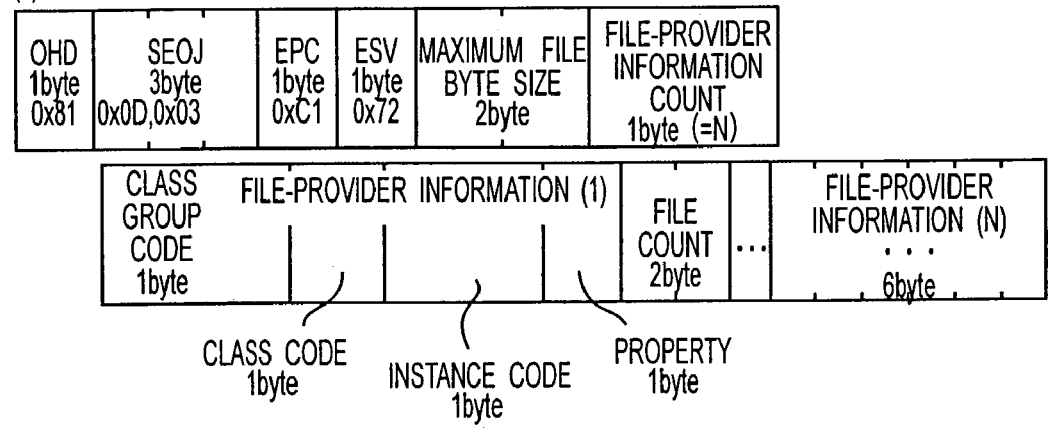

FIG. 40 shows a typical communication sequence for request/response communication, and FIGS. 43 and 44 show sample messages used in a request/response communication sequence.

<Preprocess>

(1) Handled Object Information Request (Reception-side→Transmission-side)

[Reception Node Process]

The reception-side node application sends a read request for the handled object information for PULL type transmission to the transmission-side node. (handled object information request service) The reception-side node file transfer service middleware could broadcast to all instances on the assumption that there are multiple transmission service object instances on the transmission-side node.

(2) Handled Object Information Response (Transmission-side→Reception-side)

[Transmission Node Process]

Receiving the handled object information request (1), transmission service objects of the transmission-side nodes return the handled object information for PULL type transmission property.

[Reception Node Process]

The file transfer service middleware of the reception-side node receives the response message, stores the SEOJ in the message as the file transfer service object of the transmission-side node linked to the handled object information, and returns a response to the handled object information request service to the application.

<Transmission Process>

The reception-side node application transfer the file through the following sequence by sending a file reception request to the file transfer service middleware.

(3) Transmission Target Information Write Request (Reception-side→Transmission-side)

[Reception Node Process]

To reserve a file from the file-providing device of the transmission-side node, the reception-side node application sets the address (EA) of the reception-side node for the reserved file and the transmission target information to the file transfer service middleware (file reservation service). The file transfer service middleware receiving this request sends a transmission target information property write request to the file transfer service object of the transmission-side node (required).

The file transfer service middleware then determines the SEOJ and DEOJ values of the write request message as follows.

SEOJ freely selects the file transfer service object as a reception port. Of the file transfer service objects for the transmission-side nodes obtained in step (2), DEOJ selects an object that can handle the file-providing device information received by the file reservation service.

[Transmission Node Process]

When the file transfer service middleware of the transmission-side node receives the transmission target information write request message, it stores the SEA, SEOJ, and DEOJ values in the message as the address (EA) of the reception-side node, file reception service object, and its own file transfer service object.

Furthermore, it issues and sends a file reservation number with the transmission target information to the application (transmission target information report service). The reservation number is uniquely assigned for the SEA, SEOJ, DEOJ combination. The transmission-side node application gets the transmission target information report service, reserves the file specified by the device object and properties specified in the transmission target information, and manages the file in conjunction with the reservation number received in the transmission target information report service. If consecutive transmission target information report service having the same reservation number are received, only the last received service is valid. The reserved file is destroyed after a timeout passes. The timeout is application-dependent.

(4) Transmission Target Information Report (Transmission-side→Reception-side)

[Transmission Node Process]

The file transfer service middleware of the transmission-side node checks if the transmission target information written by the transmission target information write request (3) is contained in the file-providing device information of the handled object information for PULL type transmission property of the file transfer service object. If it is (the transmission target information is appropriate), the transmission target information is returned; if it is not (the transmission target information is not appropriate), or of it is (the transmission target information is appropriate) but the file cannot be reserved, transmission target information with the file number set to 0xFFFF is returned (required).

[Reception Node Process]

The file transfer service middleware of the reception-side node gets this report and then returns a response to the application (file reservation service response).

(5) Transmission Status Request (Reception-side→Transmission-side)

[Reception Node Process]

If the reception-side node application knows from the file reservation service response that the transmission-side node was able to reserve the file, it tells the file transfer service middleware that a file will be received (file reception setting service).

The file transfer service middleware of the reception-side node then requests the transmission status property from the file transfer service object of the transmission-side node acquired by the handled object information request (1).

(6) Transmission Status Response (Transmission-side→Reception-side)

[Transmission Node Process]

A response to the read request is sent.

(7) START SENDING Trigger (Reception-side→Transmission-side)

[Reception Node Process]

When the file reception service or a transmission status response of READY is received, the file transfer service middleware sends to the file transfer service object of the transmission-side node a START SENDING trigger writing 0x20 (START SENDING) to the send/receive setting property (required).

[Transmission Node Process]

The file transfer service middleware of the transmission-side node gets the START SENDING trigger from the reception-side node and changes the transmission status property to 0x20 (SENDING) (required). It also finds the file reservation number from the SEA, SEOJ, DEOJ in the START SENDING trigger message, and passes the reservation number to the application (file transfer setting report service).

The sequence after the transmission file information report is the same as the steps after the transmission file information report in request/response communication.

Services related to PUSH type file transmission that are services of the transmission-side node shown in FIG. 39 are described below.

(1) Reception-side Node Report Service

This service reports the Echonet address of the reception-side node that is the destination device for PUSH type file transmission to the application.

The input data is the Echonet address of the reception-side node and there is no response data.

(2) Handled Object Information Request Service

This service gets the object information handled for PUSH type reception by the reception-side node. The input data is the Echonet address of the reception-side node; response data is the object information handled for PUSH type reception.

(3) Get File Report Service

The reception-side node is requested to report the transmission target information property. Input data is the transmission target information; there is no response data.

(4) File Transmission Setting Report Service

The application is notified that there was a send/receive setting write request from the reception-side node. Input data is the send/receive setting information indicating the start of transmission or force termination; there is no response data.

(5) File Transmission Request Service

Data is set to the file transfer service object of the self-node and the file transfer process is run. The input data is the name of the transmitted file, attributes, date, file byte size, and pointer to the transmitted file. Response data is the transmission result (transmission completed or transmission failed).

The services related to PUSH type file reception shown in FIG. 39 that are services of the reception-side node are described below.

(1) Transmission Target Information Report Service

When the transmission target information property is reported from the transmission-side node running PUSH type file transmission, the received data is passed to the application. The input data is the Echonet address of the transmission-side node and the transmission target information; there is no response data.

(2) File Reception Setting Service

When the transmission target information gotten by the transmission target information report service can be received, a START SENDING trigger write request is sent to the send/receive setting property of the transmission-side node file transfer service object, and the file is received. The input data is the send/receive setting, transmission source Echonet address, file-providing device information, and file number. The response data is the reception result, filename, attributes, date, file byte size, and pointer to the received file.

The services related to the PULL type file transmission shown in FIG. 40 that are services of the transmission-side node are described below.

(1) Transmission Target Information Report Service (File Reservation)

If the transmission target information property of the transmission-side node is written from the reception-side node, the written transmission target information property values are passed to the application. The input data is the reservation number of the registered transmission target information and the transmission target information; there is no response data.

(2) File Transmission Setting Report Service

This service tells the application when a START SENDING trigger is received from the reception-side node. Input data is the reservation number and send/receive setting (indicating START SENDING or forced termination); there is no response data.

(3) File Transmission Request Service

This service sets the data to the file transfer object of the self-node and then sends the file. Input data is the reservation number, name of the transmitted file, attributes, date, file byte size, and pointer to the transmission file. Response data is the transmission result denoting transmission completion or failure.

The services shown in FIG. 40 relating to the PULL type file reception that are services of the reception-side node are described next.

(1) Transmission-side Node Report Service

This service sends the Echonet address of the transmission-side node that is the transmission source for the sending files in the PUSH type to the application. Input data is the Echonet address of the transmission-side node; there is no response data.

(2) Handled Object Information Request Service

Requests the handled object information for PULL type transmission property from the file transmission object of the transmission-side node. Input data is the Echonet address of the transmission-side node, and the response data is the handled object information for PULL type transmission.

(3) File Reservation Service

Reserves the specified file-providing device object, properties, and file of the specified file number with the file transfer service object of the transmission-side node for transmission. The file transfer service middleware writes the specified information to the transmission-side node by means of a transmission target information write request, and gets the transmission target information report from the transmission-side node. Input data is the Echonet address of the transmission-side node and transmission target information. Response data is the reservation result, i.e., whether the reservation is confirmed or reservation failed.

(4) File Reception Setting Service

Requests the file transfer service object of the transmission-side node to send the file reserved by the file reservation service. The file transfer service middleware controls the sequence of confirming the transmission status of the transmission-side node, sending the START SENDING trigger, receiving the file, and setting the reception completion result, and returns RECEPTION COMPLETED when file reception is completed. Input data is the send/receive setting denoting if reception is permitted or reception is not possible, the Echonet address of the transmission source, and the transmission target information. The response data is the reception result (reception completed or reception failed), the name of the received file, attributes, date, file byte size, and pointer to the received file.

It should be noted that if the communication device is a controller, for example, that communicates with multiple terminal devices, the communication device could store multiple data communication function tables so that communication parameters common to the one communication device and multiple terminal devices can be stored once and later used for subsequent data communication.

Furthermore, it will be obvious that a recording medium storing a program implementing the data communication method of the invention should be any kind of computer-readable medium, including ROM, RAM, floppy disk, CD-ROM, DVD, memory card, or hard disk.

Further, communication medium of the invention also extends to such communication media as telephone lines and other carriers.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A data transmission device for transmitting data to a data reception device in a home network, wherein:
   the data reception device stores a data receiving object containing push reception data relating to a push reception to receive data transmitted on the initiative of the data transmission device,
   said push reception data containing maximum size information denoting the maximum amount of data that can be received and then reassembled in the case of the push reception, and data storage information relating to storing the received data; and
   the data transmission device comprises a push reception data request unit for requesting the push reception data from the data reception device before transmitting data on the initiative of the data transmission device;
   wherein the data receiving object contains operating status information indicating whether a data reception service function for receiving data is enabled or disabled, and
   the data transmission device comprises
   a notification data transmission unit for sending notification data to the data reception device when the data transmission device turns on, and
   an operating status information receiving unit for receiving the operating status information from the data reception device when the data reception device can receive data in the case of the push reception.

2. A data transmission device according to claim 1, wherein the data storage information contains information identifying a property of a device object for storing data that can be received in the case of the push reception, and
   the device object defines information relating to a device on the network.

3. A data transmission device for transmitting data to a data reception device in a home network, comprising:
   a data transmission object storage unit for storing a data transmission object containing pull transmission data relating to a pull transmission for sending data when a data transmission request is received from the data reception device;
   a request receiving unit for receiving a pull transmission data request from the data reception device; and
   a pull transmission data transmission unit for sending the pull transmission data to the data reception device when the request receiving unit receives a pull transmission data request;
   wherein the pull transmission data contains maximum size information denoting the maximum amount of data that can be segmented and transmitted in the case of the pull transmission, and data provider information relating to providing data;
   wherein the data transmission object contains operating status information indicating whether a data transmission service function for transmitting data is enabled or disabled, and
   the data transmission device comprises:
   a notification data reception unit for receiving notification data from the data reception device when the data reception device turns on; and
   an operating status information transmission unit for sending the operating status information to the data reception device when the pull transmission is enabled and the notification data is received.

4. A data transmission device according to claim 3, wherein the data provider information contains information identifying a property of a device object corresponding to data that can be transmitted in the case of the pull transmission, and
   the device object defines information relating to a device on the network.

5. A data reception device for receiving data from a data transmission device in a home network, comprising:
   a data receiving object storage unit for storing a data receiving object containing push reception data relating to a push reception to receive data transmitted on the initiative of the data transmission device;
   a request receiving unit for receiving from the data transmission device a request to send the push reception data; and
   a push reception data transmission unit for sending the push reception data to the data transmission device when the request to send the push reception data is received;
   wherein the push reception data contains maximum size information denoting the maximum size of receivable data after reassemble in the case of the push reception, and data storage information relating to storing the received data;
   wherein the data receiving object contains operating status information indicating whether a data reception service function for receiving data is enabled or disabled; and the data reception device comprises:

a notification data reception unit operable to receive notification data from the data transmission device when the data transmission device turns on, and an operating status information transmission unit operable to for sending the operating status information to the data transmission device when the push reception is enabled and the notification data is received.

6. A data reception device according to claim 5, wherein the data storage information contains information identifying a property of a device object for storing data that can be received in the case of the push reception, and the device object defines information relating to a device on the network.

7. A data reception device for receiving data from a data transmission device on a home network, wherein:

the data transmission device stores a data transmission object containing pull transmission data relating to a pull transmission for sending data when a data transmission request is received from the data reception device, and the pull transmission data contains maximum size information denoting the maximum amount of data that can be segmented and transmitted in the case of the pull transmission, and data provider information relating to providing data; and the data reception device comprises:

a pull transmission data request unit for requesting the pull transmission data from the data transmission device; and a pull transmission data receiving unit for receiving the pull transmission data from the data transmission device;

wherein the data transmission object contains operating status information indicating whether a data transmission service function for transmitting data is enabled or disabled, and the data reception device comprises:

a notification data transmission unit for sending notification data to the data transmission device when the data reception device turns on; and an operating status information reception unit for receiving the operating status information from the data transmission device when the pull transmission is enabled on the data transmission device and the data transmission device receives the notification data.

8. A data reception device according to claim 7, wherein the data provider information contains information identifying a property of a device object corresponding to data that can be transmitted in the case of the pull transmission, and the device object defines information relating to a device on the network.

* * * * *

UNITED STATES PATENT AND TRADEMARK OFFICE
CERTIFICATE OF CORRECTION

PATENT NO.         : 7,295,550 B2                                                Page 1 of 1
APPLICATION NO.    : 10/388358
DATED              : November 13, 2007
INVENTOR(S)        : Noriko Shimba and Masaru Matsui It is certified that error appears in the above-identified patent and that said Letters Patent is hereby corrected as shown below:

On the Cover Page, please insert item (30) entitled "Foreign Application Priority Data", and list the following references:

Mar. 13, 2002     [JP]     Japan     2002-068651
    Jul. 19, 2002     [JP]     Japan     2002-211453
    Aug. 5, 2002     [JP]     Japan     2002-227869
    Sep. 11, 2002     [JP]     Japan     2002-265663

Signed and Sealed this

Twenty-seventh Day of May, 2008

JON W. DUDAS
*Director of the United States Patent and Trademark Office*